US012770306B2

(12) United States Patent
Ogasawara et al.

(10) Patent No.: US 12,770,306 B2
(45) Date of Patent: Oct. 20, 2026

(54) INFORMATION PROCESSING APPARATUS, CONTROL METHOD THEREFOR, AND STORAGE MEDIUM FOR CREATING A POSTER THAT EXPRESSES AN IMPRESSION INTENDED BY A USER

(71) Applicant: CANON KABUSHIKI KAISHA, Tokyo (JP)

(72) Inventors: Kazuya Ogasawara, Kanagawa (JP); Takayuki Yamada, Kanagawa (JP); Kouta Murasawa, Kanagawa (JP); Shinjiro Hori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 425 days.

(21) Appl. No.: 18/342,285

(22) Filed: Jun. 27, 2023

(65) Prior Publication Data

US 2024/0020075 A1 Jan. 18, 2024

(30) Foreign Application Priority Data

Jul. 15, 2022 (JP) ................................ 2022-113842

(51) Int. Cl.
*G06F 3/14* (2006.01)
*G06T 11/60* (2026.01)

(52) U.S. Cl.
CPC ............ *G06F 3/1423* (2013.01); *G06T 11/60* (2013.01)

(58) Field of Classification Search
None
See application file for complete search history.

(56) References Cited

U.S. PATENT DOCUMENTS

2003/0137541 A1 7/2003 Massengale
2004/0075669 A1 4/2004 Bronstein
(Continued)

FOREIGN PATENT DOCUMENTS

EP 4538957 A1 4/2025
JP 2003132359 A 5/2003
(Continued)

OTHER PUBLICATIONS

Saito (JP-2010-183477A) English Translation (Year: 2010).*
(Continued)

*Primary Examiner* — Miya J Cato
(74) *Attorney, Agent, or Firm* — Canon U.S.A., Inc. IP Division

(57) ABSTRACT

An information processing apparatus includes a first display unit configured to display a plurality of poster images having different impressions, a first acceptance unit configured to accept specifying a poster image from the plurality of poster images having different impressions displayed on the first display unit, a second display unit configured to display a plurality of poster images having differently arranged one or more objects, and a second acceptance unit configured to accept specifying a poster image from the plurality of poster images having the differently arranged one or more objects displayed on the second display unit. The first display unit displays the plurality of poster images based on the second acceptance unit, or the second display unit displays the plurality of poster images based on the first acceptance unit.

25 Claims, 35 Drawing Sheets

(56) References Cited

U.S. PATENT DOCUMENTS

| | | | | |
|---|---|---|---|---|
| 2006/0181736 | A1 | 8/2006 | Quek | |
| 2008/0222560 | A1 | 9/2008 | Harrison | |
| 2011/0016385 | A1 | 1/2011 | Kasuga | |
| 2015/0278163 | A1 | 10/2015 | Kinkoh | |
| 2015/0348249 | A1 | 12/2015 | Yamamoto | |
| 2016/0063746 | A1 | 3/2016 | Furuya | |
| 2016/0173944 | A1 | 6/2016 | Kilar | |
| 2017/0032218 | A1* | 2/2017 | Arai | G06V 10/761 |
| 2017/0352083 | A1 | 12/2017 | Ruck | |
| 2018/0217743 | A1* | 8/2018 | Ishida | G06F 3/1201 |
| 2018/0220098 | A1* | 8/2018 | Hayakawa | H04N 7/04 |
| 2018/0268586 | A1 | 9/2018 | Furuya | |
| 2019/0213238 | A1* | 7/2019 | Batra | G06F 40/106 |
| 2019/0325626 | A1* | 10/2019 | Tao | G06T 11/60 |
| 2019/0371027 | A1 | 12/2019 | Noguchi | |
| 2020/0143514 | A1* | 5/2020 | Yadav | G06T 11/60 |
| 2021/0242976 | A1* | 8/2021 | Shi | H04L 1/1896 |
| 2023/0070390 | A1 | 3/2023 | Weng | |
| 2023/0080407 | A1 | 3/2023 | Kumar | |
| 2025/0329134 | A1* | 10/2025 | Minegishi | G06V 10/762 |

FOREIGN PATENT DOCUMENTS

| | | | | |
|---|---|---|---|---|
| JP | 2006113910 | A | | 4/2006 |
| JP | 2006221601 | A | | 8/2006 |
| JP | 2008299365 | A | | 12/2008 |
| JP | 2010033551 | A | | 2/2010 |
| JP | 2010183477 | A | * | 8/2010 |
| JP | 2015162850 | A | | 9/2015 |
| JP | 2015200983 | A | | 11/2015 |
| JP | 2016048408 | A | | 4/2016 |
| JP | 2018120338 | A | | 8/2018 |
| JP | 6537419 | B2 | | 7/2019 |
| JP | 2020046994 | A | | 3/2020 |
| JP | 6958096 | B2 | | 11/2021 |
| KR | 20200080577 | A | | 7/2020 |
| WO | 2015129328 | A1 | | 9/2015 |

OTHER PUBLICATIONS

Takanobu Obata, et al., A Color Poster Creating Support System to Reflect Kansei, Information Processing Society of Japan Journal, Mar. 2000, vol. 41 No.3.

* cited by examiner

| OBJECT | METADATA | VALUE (OR ATTRIBUTE) |
|---|---|---|
| Graphic | type | Rect<br>Ellipse<br>... |
| | color_no | Integer |
| Image | type | Rect<br>Ellipse<br>... |
| Text | type | Title<br>Subtitle<br>Text |
| | text_alignment | Right<br>Center<br>Left |
| | orientation | Horizontal<br>Vertical |
| | font size (pt) | Decimal |
| Skeleton | purpose_category | Restaurant<br>Sports<br>School<br>... |

FIG. 4

| COLOR SCHEME ID | COLOR #1 | COLOR #2 | COLOR #3 | COLOR #4 |
|---|---|---|---|---|
| 1 | (0, 0, 0) | (12, 66, 113) | (10, 129, 171) | (249, 223, 220) |
| 2 | (0, 48, 63) | (205, 172, 129) | (202, 228, 219) | (245, 244, 244) |
| 3 | (0, 168, 204) | (12, 123, 147) | (39, 73, 109) | (20, 40, 80) |
| 4 | (2, 2, 5) | (228, 58, 25) | (242, 244, 247) | (17, 31, 77) |

| SKELETON NAME | LUXURY | FAMILIARLY | DYNAMISM | STATELINESS |
|---|---|---|---|---|
| SKELETON #1 | −1 | −1 | −2 | 0 |
| SKELETON #2 | −1 | +2 | +1 | −2 |
| SKELETON #3 | 0 | −1 | +2 | +1 |
| SKELETON #4 | +1 | −2 | −2 | +2 |

| SKELETON NAME | DISTANCE |
|---|---|
| SKELETON #1 | 2.8 |
| SKELETON #2 | 4.7 |
| SKELETON #3 | 4.2 |
| SKELETON #4 | 1 |

FIG. 11A

| COLOR SCHEME ID | COLOC #1 | COLOR #2 | COLOR #3 | COLOR #4 | LUXURY | FAMILIARLY | DYNAMISM | STATELINESS |
|---|---|---|---|---|---|---|---|---|
| 1 | (0, 68, 69) | (44, 120, 108) | (250, 245, 228) | (248, 180, 0) | −1 | +1 | −2 | +2 |
| 2 | (157, 37, 3) | (223, 133, 67) | (241, 241, 176) | (127, 169, 151) | −2 | 0 | +2 | +1 |
| 3 | (245, 176, 203) | (213, 151, 206) | (116, 92, 151) | (57, 55, 91) | +2 | 0 | −1 | −1 |
| 4 | (255, 255, 199) | (169, 241, 223) | (30, 174, 152) | (35, 62, 139) | +1 | +2 | −1 | −2 |

⋮

FIG. 11B

| FONT ID | TITLE FONT | TEXT FONT | LUXURY | FAMILIARLY | DYNAMISM | STATELINESS |
|---|---|---|---|---|---|---|
| 1 | FONT #5 | FONT #2 | −1 | +2 | +2 | −1 |
| 2 | FONT #8 | FONT #1 | +2 | +2 | +1 | −2 |
| 3 | FONT #12 | FONT #1 | +1 | +1 | −1 | +1 |
| 4 | FONT #6 | FONT #1 | +1 | −1 | 0 | 0 |

⋮

| SETTING ITEM | SETTING CONTENT |
|---|---|
| TITLE | GREAT SUMMER SALE |
| SUBTITLE | BLOW OFF THE MIDSUMMER HEAT |
| TEXT | (NOTHING IS SET) |
| IMAGE |  1401 |

| COLOR SCHEME ID | COLOR #1 | COLOR #2 | COLOR #3 | COLOR #4 |
|---|---|---|---|---|
| 1 | (0, 68, 69) | (44, 120, 108) | (250, 245, 228) | (248, 180, 0) |
| 4 | (255, 255, 199) | (169, 241, 223) | (30, 174, 152) | (35, 62, 139) |

| FONT ID | TITLE FONT | TEXT FONT |
|---|---|---|
| 2 | FONT #8 | FONT #1 |
| 3 | FONT #12 | FONT #1 |

FIG. 16A
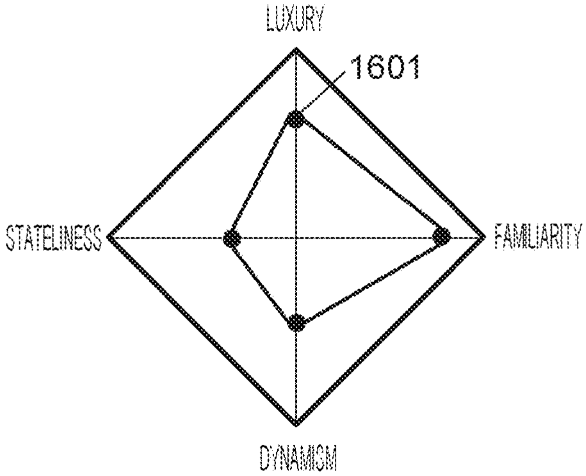
FIG. 16B
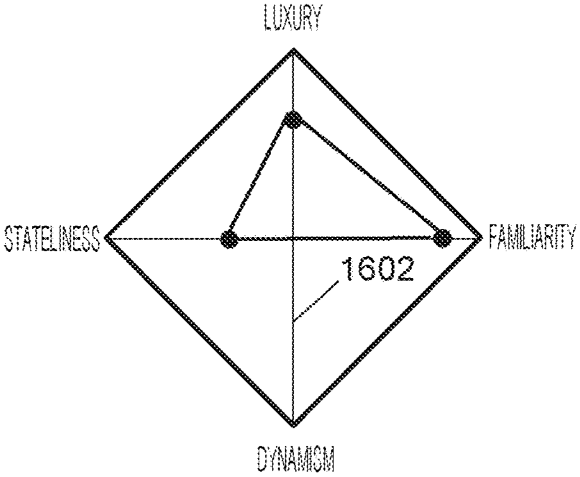
FIG. 16C
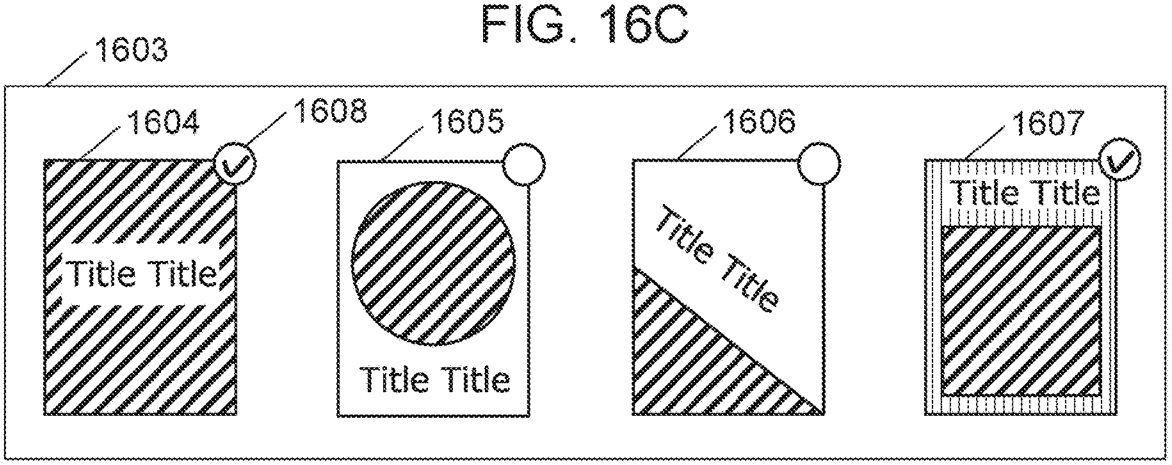
FIG. 16D
| POSTER | SELECTION STATE | LUXURY | FAMILIARITY | DYNAMISM | STATELINESS |
|---|---|---|---|---|---|
| 1604 | ✓ | +2 | −0.5 | −0.1 | +0.1 |
| 1605 | | 0 | +2 | +0.1 | −0.2 |
| 1606 | | +0.4 | −0.1 | +2 | +0.2 |
| 1607 | ✓ | −0.1 | 0 | +0.3 | +2 |
| TARGET IMPRESSION | | +2 | −0.5 | +0.3 | +2 |

| TARGET IMPRESSION ID | LUXURY | FAMILIARITY | DYNAMISM | STATELINESS |
|---|---|---|---|---|
| 1 | +2 | 0 | −1 | +1 |
| 2 | 0 | +2 | +2 | −2 |
| 3 | +1 | +1 | 0 | −2 |
| 4 | −1 | +2 | +1 | 0 |

⋮

INFORMATION PROCESSING APPARATUS, CONTROL METHOD THEREFOR, AND STORAGE MEDIUM FOR CREATING A POSTER THAT EXPRESSES AN IMPRESSION INTENDED BY A USER

BACKGROUND OF THE DISCLOSURE

Field of the Disclosure

The present disclosure relates to an information processing apparatus, a control method therefor, and a storage medium.

Description of the Related Art

Traditionally, a method has been proposed to create a poster by preparing a template including information about shapes and positions of images, texts, and graphics that make up the poster, and automatically arranging the images, texts, and graphics according to the template.

Japanese Patent Laid-Open No. 2010-33551 proposes a design editing apparatus that slightly changes a basic design of a poster selected by a user to create a derivative design that does not greatly differ in impression from the basic design.

SUMMARY OF THE DISCLOSURE

In view of the above, the present disclosure provides a technique to appropriately create a poster that expresses an impression intended by a user.

In an aspect, the present disclosure provides an information processing apparatus including a first display unit configured to display a plurality of poster images having different impressions, a first acceptance unit configured to accept specifying a poster image from the plurality of poster images having different impressions displayed on the first display unit, a second display unit configured to display a plurality of poster images having differently arranged one or more objects, and a second acceptance unit configured to accept specifying a poster image from the plurality of poster images having the differently arranged one or more objects displayed on the second display unit, wherein the first display unit displays the plurality of poster images based on the second acceptance unit, or the second display unit displays the plurality of poster images based on the first acceptance unit.

Further features of the present disclosure will become apparent from the following description of exemplary embodiments with reference to the attached drawings.

BRIEF DESCRIPTION OF THE DRAWINGS

FIG. 4 is a diagram illustrating color scheme patterns.

FIG. 11A is a diagram illustrating color scheme patterns, and FIG. 11B is a diagram illustrating a font selection method.

FIGS. 16A to 16D are diagrams for illustrating examples of setting a target impression by a target impression specification unit.

DESCRIPTION OF THE EMBODIMENTS

Embodiments of the present disclosure are described in detail below with reference to the drawings. The following embodiments are not intended to limit the scope of disclosure, which is defined in the claims, and not all of the combinations of features described in the embodiments are essential to the disclosure. The same reference numbers are used for the same constituent elements, and duplicated descriptions thereof are omitted.

First Embodiment

In a first embodiment, by way of example, a method is disclosed for automatically creating a poster by operating a poster creation application on a poster creation apparatus. In the following description, unless otherwise specified, an "image" refers to a still image or a frame image extracted from a moving image. A "poster" refers to a poster image created by a poster creation application.

Figure 1:
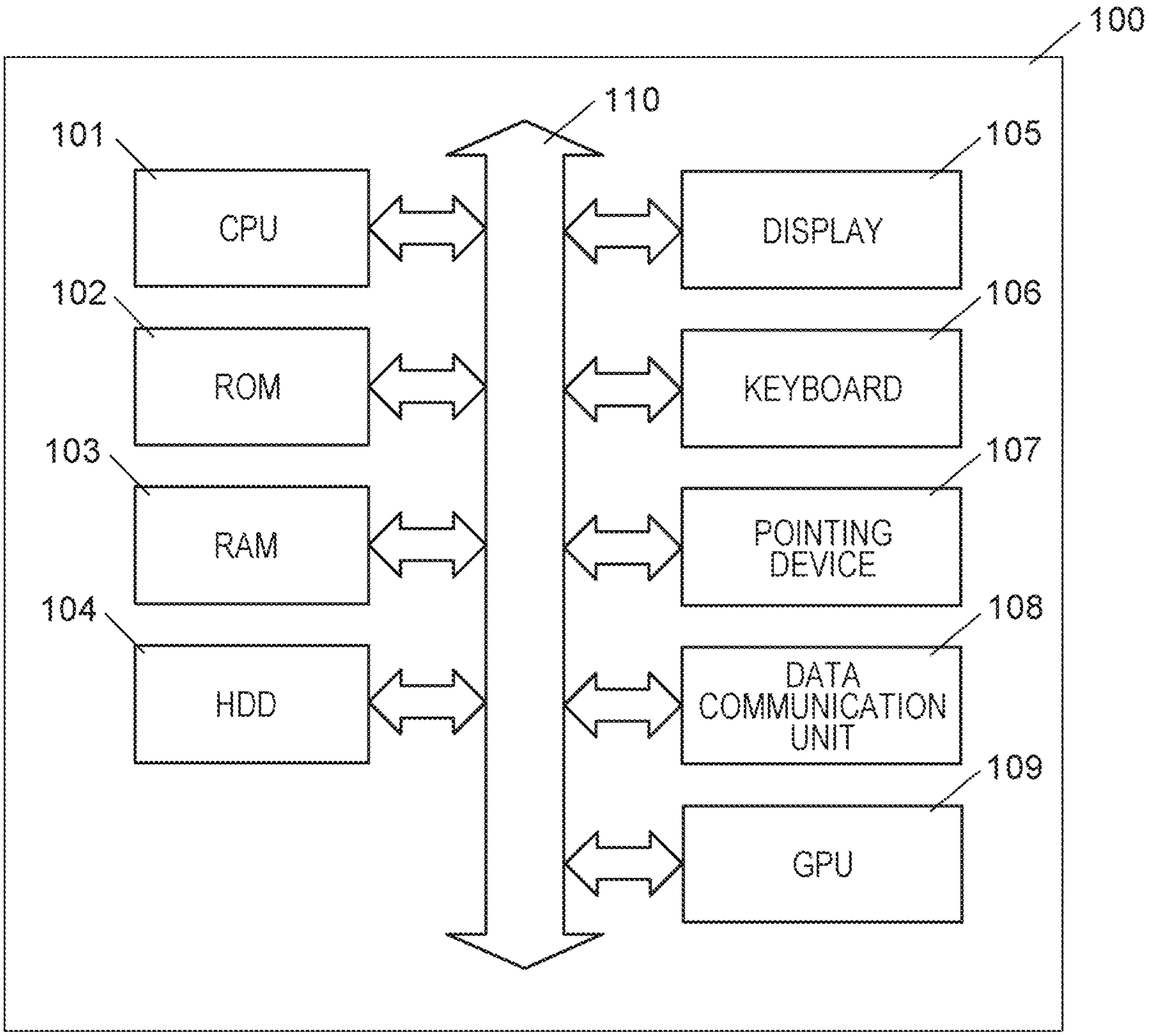
FIG. 1 is a block diagram illustrating a hardware configuration of a poster creation apparatus.

FIG. 1 is a block diagram illustrating a hardware configuration of a poster creation apparatus 100. The poster creation apparatus 100 may be an information processing apparatus such as a personal computer (hereinafter referred to as "PC"), a smartphone, or the like. In the following description of the present embodiment, it is assumed that the poster creation apparatus is a PC. The poster creation apparatus 100 includes a CPU 101, a ROM 102, a RAM 103, an HDD 104, a display 105, a keyboard 106, a pointing device 107, and a data communication unit 108.

The CPU (central processing unit/processor) 101 comprehensively controls the poster creation apparatus 100 and realizes operations according to the present embodiment, for example, by reading a program stored in the ROM 102 into the RAM 103 and executing it. Although only one CPU is shown in FIG. 1, there may be a plurality of CPUs.

The ROM 102 is a general-purpose ROM and stores, for example, a program to be executed by the CPU 101. The RAM 103 is a general-purpose RAM and is used, for example, as a working memory to temporarily store various information when a program is executed by the CPU 101.

The HDD (Hard Disk Drive) 104 is a storage medium (a storage unit) for storing image files, a database of results of image analysis and other processing, and skeletons used by the poster creation application.

The display 105 is a display unit that displays a user interface (UI) according to the present embodiment and also displays image data (hereinafter, also referred to as an "image") as a layout result of an electronic poster to the user. The keyboard 106 and the pointing device 107 accept instruction operations from the user. The display 105 may have a touch sensor function.

The keyboard 106 is used, for example, by the user to enter the number of double-page poster sheets to be created, on the UI shown on the display 105.

The pointing device 107 is used, for example, by the user to click a button on the UI displayed on the display 105.

The data communication unit 108 communicates with an external apparatus via a wired or wireless network. For example, the data communication unit 108 transmits data laid out by an automatic layout function to a printer or a server that can communicate with the poster creation apparatus 100.

The data bus 109 connects the blocks shown in FIG. 1 such that they can communicate with each other.

Note that the configuration shown in FIG. 1 is only an example and is not limited to this. For example, the poster creation apparatus 100 may not have the display 105 and may display the UI on an external display.

In the present embodiment, the poster creation application is stored in the HDD 104. The poster creation application is started when the user performs an operation such as clicking or double-clicking on an application icon displayed on the display 105 with the pointing device 107.

Figure 2:
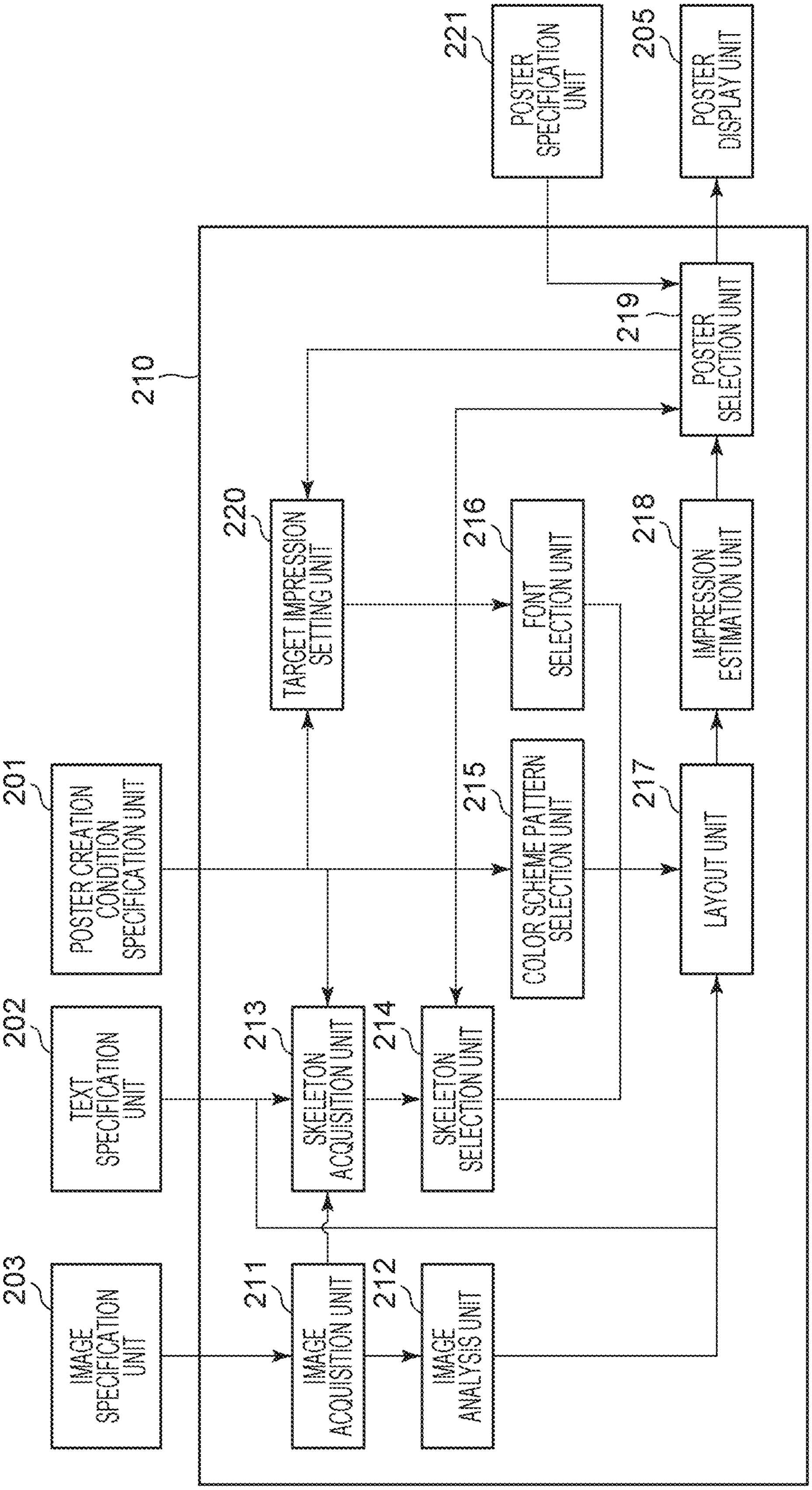
FIG. 2 is a software block diagram of a poster creation application.

FIG. 2 is a software block diagram of a poster creation application. The poster creation application includes a poster creation condition specification unit 201, a text specification unit 202, an image specification unit 203, a poster display unit 205, a poster specification unit 221, and a poster creation unit 210. The poster creation unit 210 includes a target impression setting unit 220, an image acquisition unit 211, an image analysis unit 212, a skeleton acquisition unit 213, a skeleton selection unit 214, a color scheme pattern selection unit 215, a font selection unit 216, a layout unit 217, an impression estimation unit 218, and a poster selection unit 219.

When the poster creation application is installed in the poster creation apparatus 100, a start icon is displayed on a top screen (desktop) of the OS (operating system) running on the poster creation apparatus 100. When the user performs an operation (for example, double-clicking) on the start icon displayed on the display 105 with the pointing device 107, the poster creation application program stored in the HDD 104 is loaded into the RAM 103 and executed by the CPU 101. As a result, the poster creation application starts.

Program modules corresponding to the respective components shown in FIG. 2 are included in the poster creation application described above. By executing these program modules, the CPU 101 realizes the functions of the components shown in FIG. 2. In the following description of the respective components shown in FIG. 2, it is assumed that the corresponding components execute various processes. FIG. 2 shows a software block diagram related, among various units, the poster creation unit 210 that provides the automatic poster creation function.

The poster creation condition specification unit 201 specifies poster creation conditions to the poster creation unit 210 according to UI operations with the pointing device 107. In the present embodiment, the poster size, the number of posters to be created, and the purpose category are specified as the poster creation conditions. The poster size may be specified by actual width and height values, or by a paper size such as A1, A2, or the like. The purpose category indicates what the poster will be used for, such as a restaurant, a school event, sales, etc.

The text specification unit 202 specifies text information to be placed on the poster by a UI operation using the keyboard 106. The text information placed on the poster includes a character string representing, for example, the title, the date and time, the location, and the like. The text specification unit 202 outputs each piece of text information to the skeleton acquisition unit 213 and the layout unit 217 such that each piece of text information is associated with type information indicating a type of the text information such as "title", "date and time", "location", or the like.

The image specification unit 203 specifies an image group to be placed on the poster from images stored in the HDD 104. The specifying of the image group may be performed by specifying a device or a directory or other similar file system structure where one or more images are stored. Alternatively, the specifying may be performed by specifying accompanying information of individual images such as shooting date and time or attribute information. The image specification unit 203 outputs the file path of the specified image to the image acquisition unit 211.

The target impression setting unit 220 sets the target impression of the poster to be created. The target impression refers to an impression that the created poster is finally required to have. Note that the target impression is also referred to simply as an "impression". The impression specified by the user in the second embodiment described later is also referred to as a "target impression". The target impression setting unit 220 acquires a plurality of target impressions from the HDD 104 and sets them. Alternatively, the target impression setting unit 220 acquires from the poster selection unit 219 an estimated impression associated with (related to) a poster specified by the poster specification unit 221, and sets it as the target impression. The details of the impression will be described later. The target impression setting unit 220 also acquires the number of poster images to be created from the poster creation condition specification unit 201. The target impression setting unit 220 outputs the set target impression to the skeleton selection unit 214, the color scheme pattern selection unit 215, and the font selection unit 216.

Next, the configuration of the poster creation unit 210 is described in detail below.

The image acquisition unit 211 acquires one or more pieces of image data specified by the image specification unit 203 from the HDD 104. The image acquisition unit 211 outputs the acquired image data to the image analysis unit 212, and outputs the number of acquired images to the skeleton acquisition unit 213. Examples of images stored in the HDD 104 are still images and frame images extracted from moving images. The still images and the frame images are obtained from an imaging device such as a digital camera, a smart device or the like. The imaging device may be included in the poster creation apparatus 100 or may be included in an external apparatus. Note that when the imaging device is an external apparatus, images are acquired via the data communication unit 108. Alternatively, the still image may be an illustration image created by image editing software or a CG image created by CG creation software. The still image and the extracted image may be obtained from a network site or a server via the data communication unit 108 and a network. An example of the image obtained from a network site or a server is a social networking service image (hereinafter referred to as "SNS image"). The program executed by the CPU 101 analyzes the data attached to each image to determine the storage source where the image is stored. For example, SNS images may be acquired from SNS via the application, and acquisition sources may be managed in the application. The images are not limited to those described above, and other types of images may be obtained.

The image analysis unit 212 analyzes the image data acquired from the image acquisition unit 211 by a method described later to acquire information indicating an image feature value described later. More specifically, the image analysis unit 212 executes an object recognition process, which will be described later, and acquires information indicating the image feature value of the image data. The image analysis unit 212 outputs the image data to the layout unit 217 such that the information indicating the acquired image feature value is associated with the image data.

The skeleton acquisition unit 213 acquires from the HDD 104 one or more skeletons that meet the conditions specified by the poster creation condition specification unit 201, the text specification unit 202, and the image acquisition unit 211. In the present embodiment, the skeleton is information representing the placement of character strings, images, graphics, etc., to be placed on the poster.

Figures 3A, 3B:
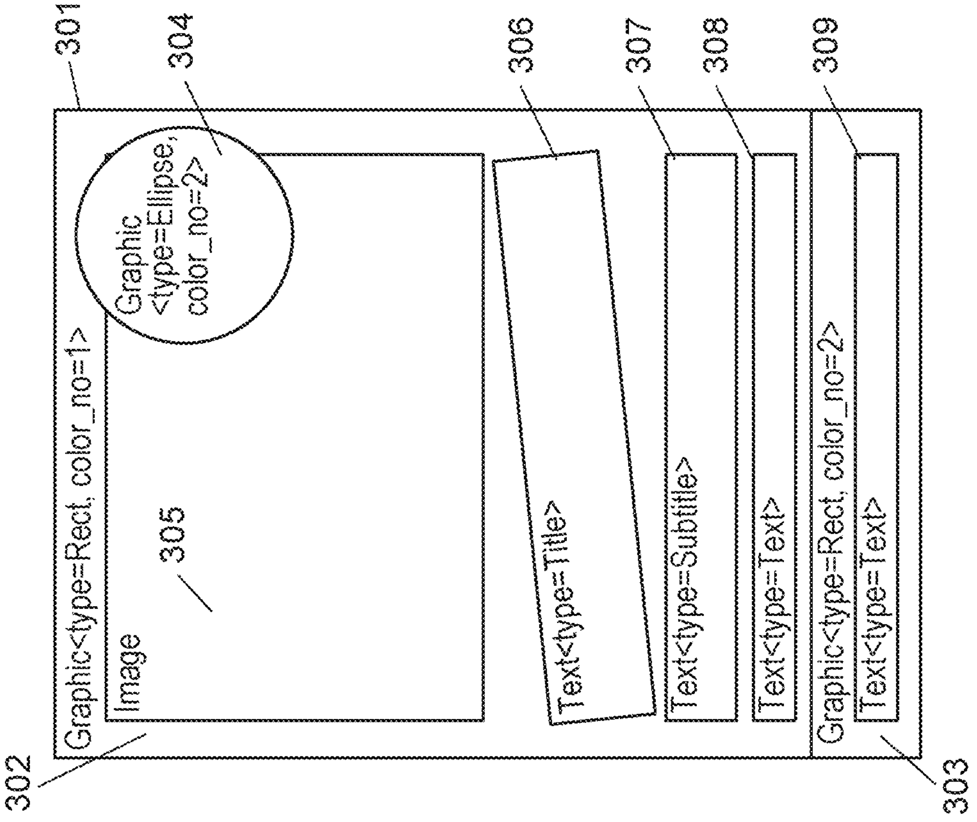
FIG. 3A is a diagram illustrating an example of a skeleton.
FIG. 3B is a diagram illustrating an example of metadata.

FIGS. 3A and 3B are diagrams illustrating an example of a skeleton. Three graphic objects 302 to 304, one image object 305, and four text objects 306 to 309 on which text information is placed are placed on the skeleton 301 shown in FIG. 3A. Each object includes data indicating the position, the size, and the angle, and also metadata required to create a poster. FIG. 3B is a diagram illustrating an example of metadata. For example, text objects 306 to 309 hold metadata of attributes indicating types of text information placed on the respective text objects. In this example, the metadata indicates that a title is placed on the text object 306, a subtitle is placed on the text object 307, and main texts are placed on the text objects 308 and 309. The text objects 306 to 309 each hold metadata indicating a font size. The graphic objects 302 to 304 hold metadata of attributes indicating shapes of the graphics and color scheme numbers (color scheme IDs) indicating color scheme patterns. In this example, the metadata indicates that the graphic objects 302 and 303 are rectangles, and the graphic object 304 is an ellipse. It is assumed that the graphic object 302 is assigned the color scheme number 1, and the graphic objects 303 and 304 are assigned the color scheme number 2. The color scheme number is information to be referred to when a color scheme is assigned, which will be described later. Different colors are assigned to different color scheme numbers. Note that the types of objects and metadata are not limited to those described above. For example, there may be a map object for placement of a map, a barcode object for placement of a QR code (registered trademark) or a barcode. As for metadata of text objects, there may be metadata representing the space between lines and the space between characters.

Metadata indicating a placement angle may be used as metadata of a text object and/or a graphic object. The purpose of the skeleton may be described in the metadata and may be used to control whether or not the skeleton is allowed to be used according to the purpose.

The skeleton may be stored in, for example, a CSV format in the HDD 104, or may be stored in a DB format such as SQL. The skeleton acquisition unit 213 outputs the one or more skeletons acquired from the HDD 104 to the skeleton selection unit 214.

The skeleton selection unit 214 selects one or more skeletons that match the target impression specified by the target impression setting unit 220 from the skeletons acquired from the skeleton acquisition unit 213, and outputs the selected skeletons to the layout unit 217. Since the layout of the entire poster is determined by the skeleton, it is possible to increase the variations of the created posters by preparing a wide variety of types of skeletons in advance. The skeleton selection unit 214 may acquire from the poster selection unit 219 the skeleton ID associated with the poster specified by the poster specification unit 221.

The color scheme pattern selection unit 215 acquires, from the HDD 104, one or more color scheme patterns that match the target impression specified by the target impression setting unit 220, and outputs the acquired color scheme patterns to the layout unit 217. Note that the color scheme pattern refers to a combination of colors used in a poster.

FIG. 4 is a diagram illustrating an example of a table of color scheme patterns. In the present embodiment, the color scheme pattern indicates a combination of four colors. In a color scheme ID column in FIG. 4, IDs each uniquely identifying a color scheme pattern are described. In color #1 to color #4 columns, colors are specified by RGB color values of 0 to 255 wherein the respective RGB color values are described in parentheses in the order of R, G, B ((R, G, B)=(0 to 255, 0 to 255, 0 to 255)). In the present embodiment, each color scheme pattern is given by a combination of four colors, but the number of colors included in each color scheme pattern is not limited to four. Furthermore, the number of colors may vary depending on specific color scheme patterns.

The color scheme pattern selection unit 215 may acquire from the poster selection unit 219 the color scheme pattern ID associated with the poster specified by the poster specification unit 221.

The font selection unit 216 selects and acquires, from the HDD 104, one or more font patterns that match the target impression specified by the target impression setting unit 220, and outputs the acquired font patterns to the layout unit 217. The font pattern refers to a combination of at least one of a title font, a subtitle font, and a text font.

The font selection unit 216 may acquire from the poster selection unit 219 the font ID associated with the poster specified by the poster specification unit 221.

The layout unit 217 creates one or more pieces of poster data by laying out various data on each skeleton of one or more skeletons acquired from the skeleton selection unit 214 such that the number of pieces of created data is equal to or greater than the specified number of posters to be created. The layout unit 217 places, on each skeleton, the text acquired from the text specification unit 202 and the image data acquired from the image analysis unit 212, and applies the color scheme pattern and the font pattern respectively acquired from the color scheme pattern selection unit 215 and the font selection unit. The layout unit 217 outputs the created one or more pieces of poster data to the impression estimation unit 218.

The impression estimation unit 218 estimates the impression of each piece of poster data of the plurality of pieces of poster data acquired from the layout unit 217, and associates the estimated impression with each piece of poster data. The impression estimation unit 218 outputs one or more pieces of poster data associated with the estimated impression to the poster selection unit 219.

The poster selection unit 219 compares the estimated impression of each of the plurality of pieces of poster data associated with the estimated impression acquired from the impression estimation unit 218 with the target impression specified by the target impression setting unit 220, and selects the poster data with which the estimated impression closest to the target impression is associated. The selection result is stored in the HDD 104. The poster selection unit 219 outputs the selected poster data to the poster display unit 205.

In addition, the poster selection unit 218 acquires from poster specification unit 221 information identifying the poster specified by the poster specification unit 221. The poster selection unit 218 then outputs the estimated impression associated with the specified poster to the target impression setting unit 220, the skeleton ID to the skeleton selection unit 214, the color scheme pattern ID to the color scheme pattern selection unit 215, and the font ID to the font selection unit 216.

The poster display unit 205 outputs a poster image to be displayed on the display 105 according to the poster data acquired from the poster selection unit 219. For example, the poster image is represented in bitmap data. The poster display unit 205 displays the poster image on the display 105.

The poster specification unit 221 specifies a poster displayed on the display 105 according to a UI operation using the pointing device 107. The poster specification unit 221 outputs information identifying the specified poster to the poster selection unit 219.

When the poster creation application is installed in the poster creation apparatus 100, a start icon is displayed on a top screen (desktop) of the OS (operating system) running on the poster creation apparatus 100. When the user double-clicks the start icon displayed on the display 105 with the pointing device 107, the application program stored in the HDD 104 is loaded into the RAM 103 and executed by the CPU 101, and thus the application is started.

Although not shown in the figure, the poster creation application may have a function of editing the created poster after the creation result is displayed on the poster display unit 205 such that the layout, the colors, the shapes, etc. of the images, the texts, and the graphics are edited according to a user operation so as to achieve a design desired by the user.

When a function is provided that allows it to print poster data stored in the HDD 104 using a printer according to the conditions specified by the poster creation condition specification unit 201, the user can obtain the created poster in the printed form.

Examples of Display Screens

Figure 5:
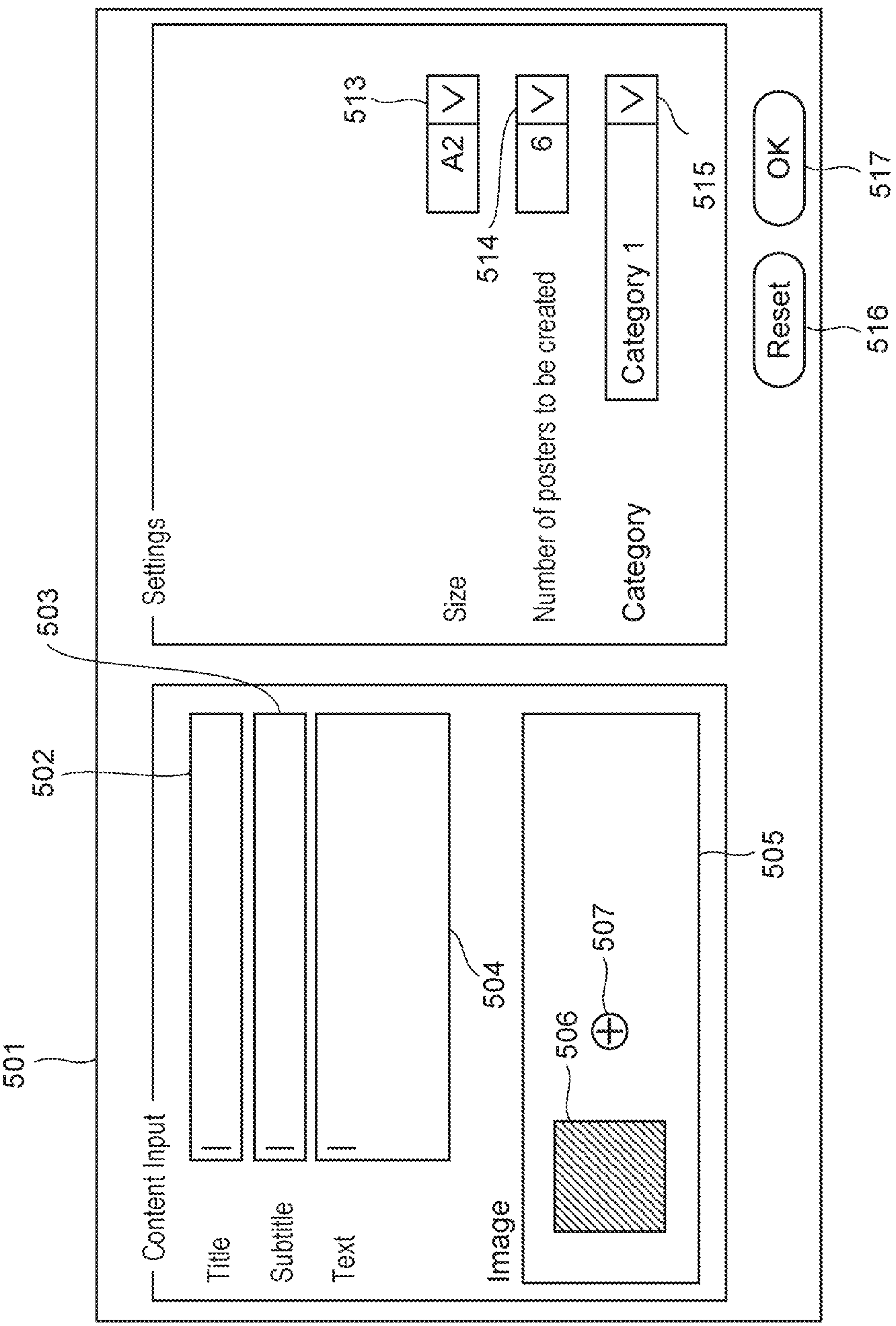
FIG. 5 is a diagram illustrating a display screen provided by a poster creation application.

FIG. 5 is a diagram illustrating an example of an application start screen 501 provided by the poster creation application. The application start screen 501 is displayed on the display 105. When the user sets poster creation conditions, texts, and images, which will be described later, via the application start screen 501, the contents of the setting made by the user via this screen are acquired by the poster creation condition specification unit 201, the image specification unit 203, and the text specification unit 202.

A title box 502, a subtitle box 503, and a main text box 504 accept specifying of text information to be placed on the poster. Three types of text information are accepted in the present embodiment, but this is by way of example and not limitation. For example, additional text information indicating a location, date and time, or the like may be accepted. It is not necessary that all types are specified, and some specification boxes may be blank.

An image specification area 505 is an area in which images to be placed on the poster are displayed. An image 506 indicates a thumbnail of a specified image. An image addition button 507 is a button for adding an image to be placed on the poster. When the user presses the image addition button 507, the image specification unit 203 displays a dialog screen for selecting a file stored in the HDD 104 and accepts a selection of an image file from the user. A thumbnail of the selected image is added to the image specification area 505.

A size list box 513 is a list box for setting the size of the poster to be created. In response to a clicking operation by the user with the pointing device 107, a list of available poster sizes is displayed and the user is allowed to select a desired size.

A box 514 is for setting the number of posters to be created.

A category list box 515 is used to set the purpose category of the poster to be created. Note that the purpose category may not be set.

A reset button 516 is a button for resetting the setting information on the application start screen 501.

When the user presses an OK button 517, the poster creation condition specification unit 201, the text specification unit 202, and the image specification unit 203 output the contents of the settings made on the application start screen 501 to the poster creation unit 210. As a result, the poster creation condition specification unit 201 acquires the size of the poster to be created specified in the size list box 513, the number of posters to be created specified in the box 514 for specifying the number of posters to be created, and the purpose category of the poster to be created specified in the category list box 515. The text specification unit 202 acquires text information to be placed on the poster from the title box 503, the subtitle box 503, and the main text box 504. The image specification unit 203 acquires the image file path of the image, to be placed on the poster, which is specified in the image specification area 505. The target impression setting unit 220 acquires the number of posters to be created specified in the box 514 for specifying the number of posters to be created from the poster creation condition specification unit 201. Note that the poster creation condition specification unit 201, the text specification unit 202, and the image specification unit 203 may modify the values set on the application start screen 501. For example, the text specification unit 202 may remove unnecessary leading or trailing blank characters from the input text information.

Figure 6:
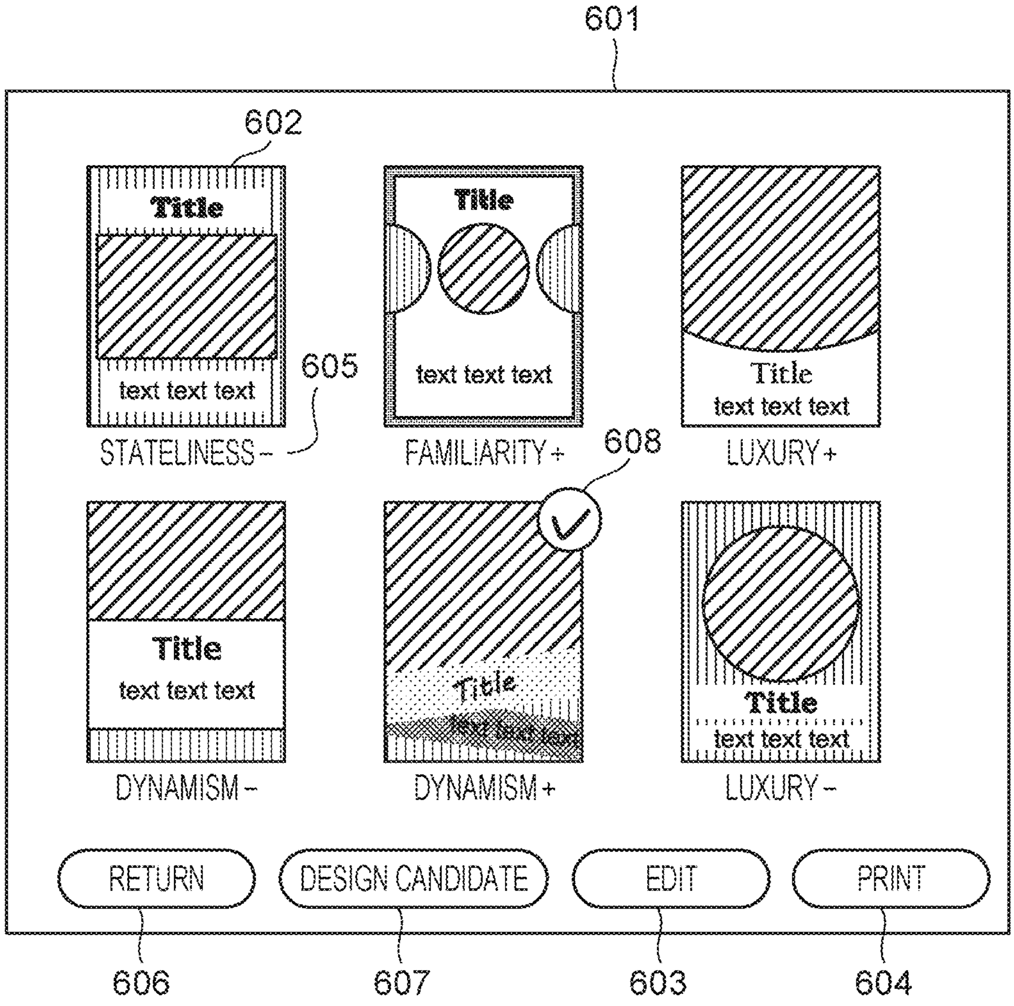
FIG. 6 is a diagram illustrating a display screen provided by a poster creation application.

FIG. 6 is a diagram illustrating an example of a primary poster preview screen on which the created poster images are displayed on the display 105 by the poster display unit 205. When the OK button 517 on the application start screen 501 is pressed and the poster creating is completed, the screen displayed on the display 105 transitions to the primary poster preview 601.

A poster image 602 is a poster image output by the poster display unit 205. The poster creation unit 210 creates posters such that the number of created posters is equal to or larger than the number of posters to be created specified by the poster creation condition specification unit 201, and the created posters are displayed in a list as poster images 602 on the primary poster preview screen 601. When the user clicks a poster with the pointing device 107, the clicked poster is selected.

An impression label 605 is a label that expresses an estimated impression associated with the corresponding poster. The impression label 605 expresses an estimated impression associated with the poster image 602. In the present embodiment, the strongest impression among the estimated impressions of the corresponding poster is displayed. For example, when the impression of the poster image 602 is estimated such that luxury is −1.2, familiarity is +0.9, dynamism is +0.2, and stateliness is −1.3, the largest absolute value among them is −1.3 of stateliness, and therefore the strongest impression is stateliness. Therefore, the poster image 602 is given the impression label "stateliness −". Note that the manner of displaying the impression label 605 is not limited to this example. For example, the numerical value of each estimated impression may be directly displayed, or the numerical value of the estimated impression may be displayed in a graph such as a radar chart. Note that the impression label 605 may be omitted.

A check mark 608 indicates that a poster image to which a check mark is added is an image selected by a user. In FIG. 6, a poster image with an impression label 605 "dynamism+" is selected. When the user selects one of the poster images, a check mark 608 is added to the selected poster image. In this state, if the user selects again the same poster image, the selection thereof is canceled and the check mark 608 disappears. In the present embodiment, it is assumed that only one poster image is allowed to be selected. That is, the check mark 608 is added to only one poster image at most. In this example, the poster image in the selected state is indicated by the check mark 608, but this is merely by way of example and not limitation. For example, the selection of the poster may be indicated by adding a decoration such as a border, a shadow, and/or a glow around the selected poster image. Alternatively, the selection of the poster may be indicated by enlarging the selected poster image. The check mark may be placed on the upper left instead of the upper right of the poster image, as long as it indicates that the poster image is selected. That is, the check mark 608 may be displayed in any manner as long as the poster image selected by the user is identified.

When the user presses a return button 606, the screen displayed on the display 105 transitions to the application start screen 501, on which the poster creation conditions can be set again.

When a design candidate button 607 is pressed by the user, information associated with the poster image selected on the primary poster preview screen 601 is output to the poster creation unit 210. In this process, the target impression setting unit 220 acquires an estimated impression associated with the selected poster image.

Note that the design candidate button 607 is enabled when any poster image displayed on the primary poster preview screen 601 is selected, and it becomes possible to operate the design candidate button 607. On the other hand, the design candidate button 607 is disabled and cannot be operated when no poster is selected. In this case, for example, the design candidate button 607 may be grayed out or not be displayed on the primary poster preview screen 601.

An edit button 603 is a button for enabling editing of a selected poster image using a UI (not shown) that provides an edit function. Like the design candidate button 607, the edit button 603 is enabled only when there is a poster image in the selected state.

A print button 604 is a button for instructing to print one or more selected poster images via a control UI (not shown) of the printer. Like the design candidate button 607, the print button 604 is enabled only when there is a poster image in the selected state.

Figure 17A:
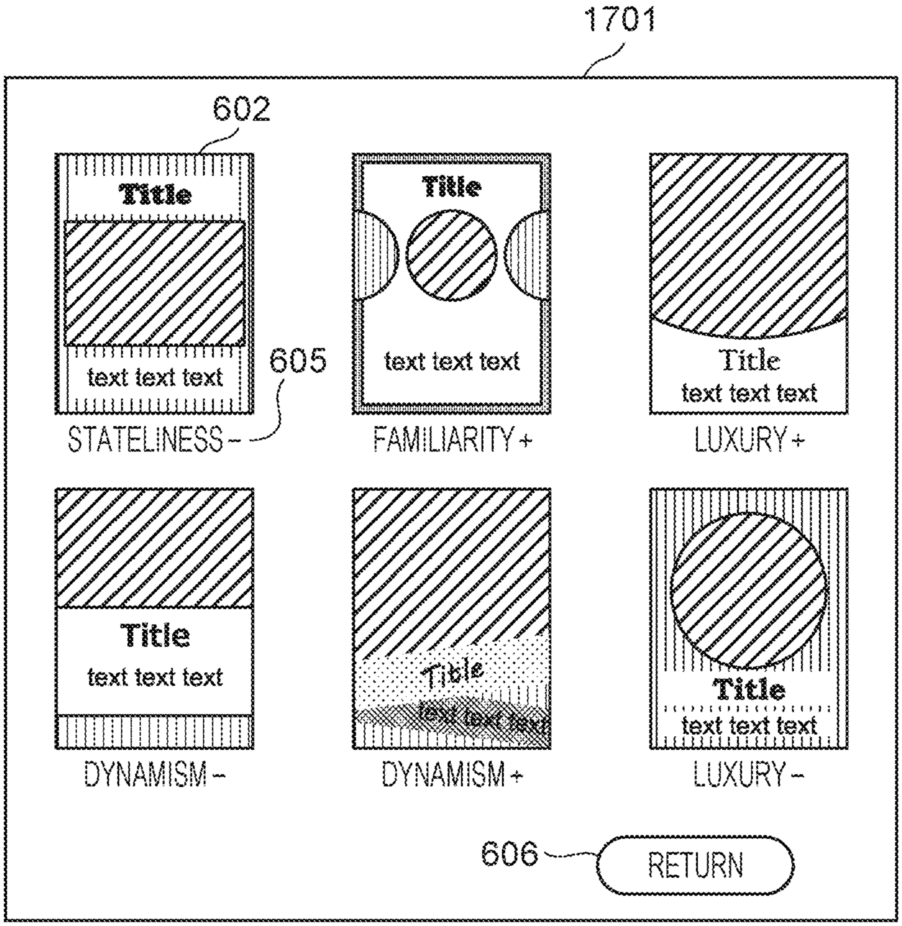
FIGS. 17A and 17B are diagrams each illustrating a display screen provided by a poster creation application.
Figure 17B:
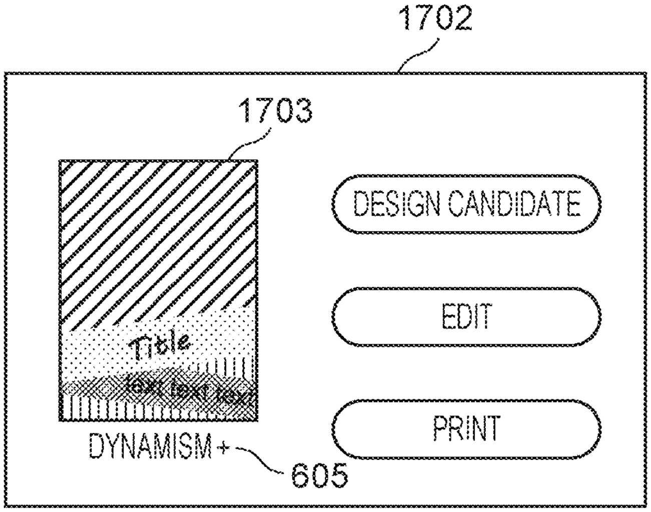

In the present embodiment, the design candidate button 607, the edit button 603, and the print button 604, for determining the process to be performed on the selected poster image, are arranged on the primary poster preview screen 601, but this is merely by way of example and not limitation. For example, when a poster image is selected, a new screen for determining a process to be performed on the selected poster image may be created and displayed. FIGS. 17A and 17B are diagrams each illustrating an example of a primary poster preview screen, different from that shown in FIG. 6. The elements denoted by the same reference numbers as those shown in FIG. 6 are similar to those described above according to the first embodiment, and therefore a duplicate description thereof is omitted.

FIG. 17A is a diagram showing an example of a primary poster preview screen. FIG. 17B is a diagram showing an example of a selected poster display screen 1702 for specifying a process to be performed on a poster selected on the primary poster preview screen 1701. When a poster is selected on the primary poster preview screen 1701, the selected poster display screen 1702 is displayed on the display 105 so as to overlap the primary poster preview screen 1701.

A poster image 1703 is a poster image selected on the primary poster preview screen 1701. Unlike selectable poster images 602 displayed on the primary poster preview screen 1701, the poster image 1703 is already selected and is not allowed to be selected further.

Therefore, as shown in FIG. 17, it is not necessary to display poster images and specify a process for a selected poster image via one screen, but a plurality of operation screens may be displayed. The primary poster preview screen has been described above.

Figure 18:
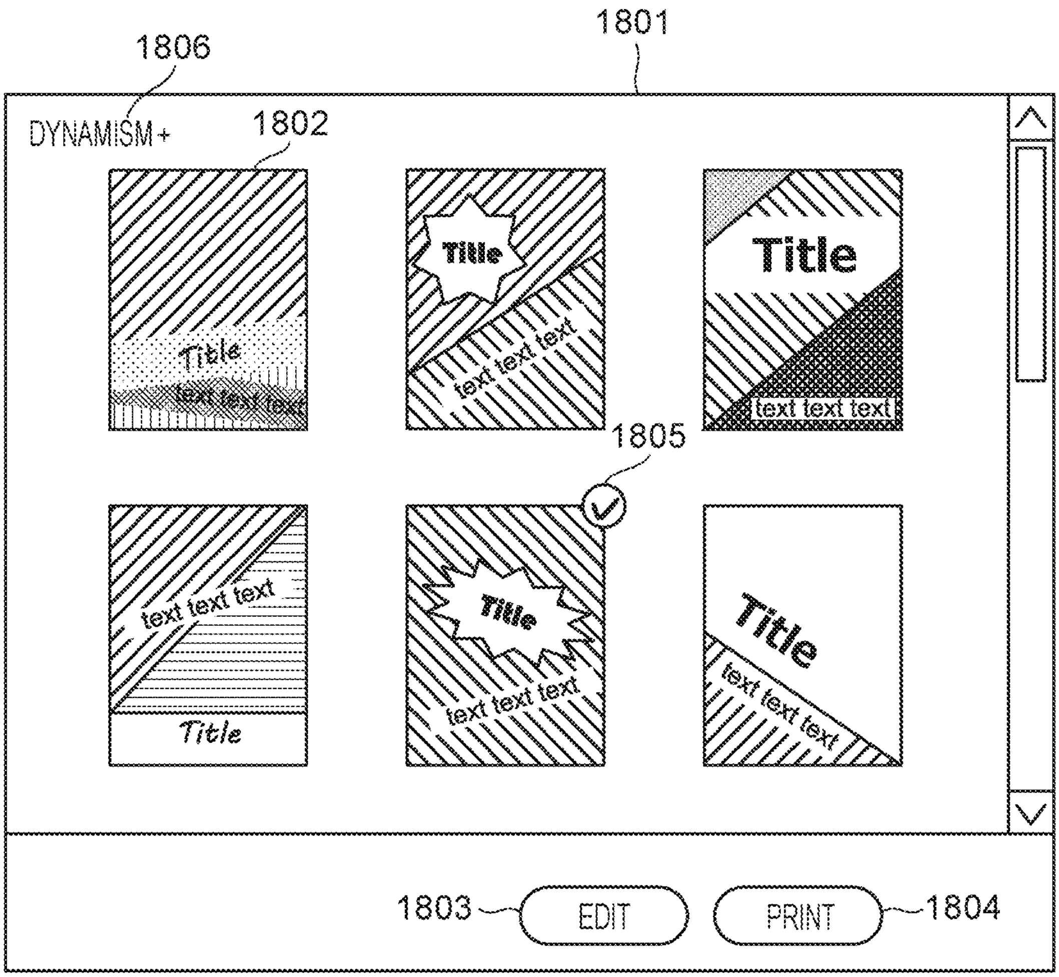
FIG. 18 is a diagram illustrating a display screen provided by a poster creation application.

FIG. 18 is a diagram illustrating an example of a secondary poster preview screen 1801 displayed on the display 105 on which created poster images are displayed by the poster display unit 205. When the design candidate button 607 on the primary poster preview screen 601 is pressed and the poster creation is completed, the screen displayed on the display 105 transitions to the secondary poster preview screen 1801.

A poster image 1802 displayed on the secondary poster preview screen 1801 in FIG. 18 has an impression similar to the poster image 602 selected by the user on the primary poster preview screen 601 in FIG. 6. More specifically, when the design candidate button 607 is pressed, the target impression setting unit 220 has already acquired information associated with the poster image specified by the poster specification unit 221. The poster creation unit 210 has already created a poster image 1802 to be displayed on the secondary poster preview screen 1801 in FIG. 18 based on the information associated with the selected poster image.

The poster image 1802 is a poster image output by the poster display unit 205. The poster creation unit 210 creates as many or more posters as specified by the poster creation condition specification unit 201, and the created posters are displayed in the form of a list on the secondary poster preview screen 1801. The user can select a poster by clicking the poster with the pointing device 107.

A check mark 1805 indicates that a poster image to which a check mark is added is in the state being selected by a user.

An edit button 1803 is a button for enabling editing of a selected poster image using a UI (not shown) that provides an edit function. Like the design candidate button 607, the edit button 1803 is enabled only when there is a poster in the selected state.

A print button 1804 is a button for instructing to print the selected poster image via a control UI (not shown) of the printer. Like the design candidate button 607, the print button 1804 is enabled only when there is a poster in the selected state.

An impression label 1806 is a label that expresses an estimated impression associated with the poster selected on the primary poster preview screen 601. As with the impression label 605 on the primary poster preview screen 601, the manner of displaying the impression label 1806 is not limited to this example. The impression label 605 may be omitted.

Quantification of Poster Impression

A method for quantifying the impression of a poster is described below. This quantification process is necessary for the poster creation process performed in S1905 in FIG. 19. This quantification process is performed as preprocessing of the impression estimation process in S909 in FIG. 9, which will be described later. The process of quantifying the impression of the poster is performed at the stage of developing the poster creation application by a vendor or the like that develops the poster creation application. The process of quantifying the impression of the poster may be executed by the poster creation apparatus 100 or may be executed by an information processing apparatus different from the poster creation apparatus 100. Note that in a case where the process is performed by an information processing apparatus different from the poster creation apparatus 100, the process is executed by a CPU of this information processing apparatus.

The poster impression quantification process involves quantifying impressions that people have for various posters. At the same time, the correspondence between the poster image and the impression of the poster is derived. This makes it possible to estimate the impression of the poster from the created poster image. If the impression can be estimated, it becomes possible to control the impression of the poster image by correcting the poster image, or to search for a poster image having a certain target impression. Note that the poster impression quantification process is executed, for example, by operating an impression learning application for learning the poster image impression in advance prior to the poster creation process in the poster creation apparatus.

Figure 7:
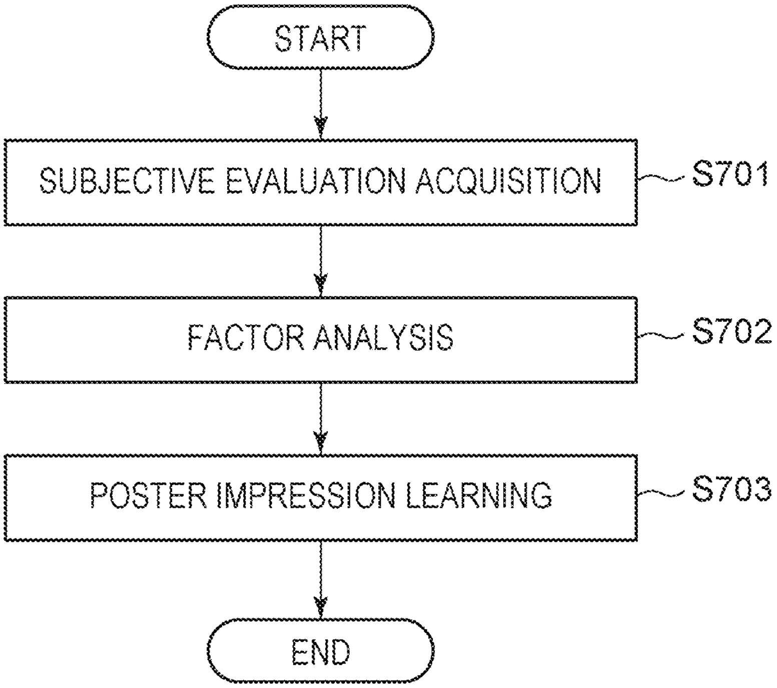
FIG. 7 is a flowchart illustrating a process of quantifying a poster impression in a poster creation process.

FIG. 7 is a flowchart illustrating a poster impression quantification process. The flowchart shown in FIG. 7 is realized, for example, by the CPU 101 loading a program stored in the HDD 104 into the RAM 103 and executing the program. The poster impression quantification process is performed according to the flowchart shown in FIG. 7. Note that the symbol "S" in the description of each process indicates a step in the flowchart (the same applies hereinafter in this specification).

In S701, the CPU 101 acquires a subjective evaluation of the impression of a poster.

Figure 8:
FIG. 8 is a diagram illustrating a subjective evaluation of a poster.

FIG. 8 is a diagram for explaining an example of a method of a subjective evaluation of an impression of a poster. The CPU 101 presents the poster to a human evaluator and obtains from the human evaluator a subjective evaluation of the impression of the poster. In the evaluation, a measurement method such as an SD (Semantic Differential) method or a Likert scale method can be used. FIG. 8 illustrates an example of a questionnaire using the SD method, in which adjective pairs expressing impressions are presented to a plurality of human evaluators, and adjective pairs evoked by the target poster are scored. After the subjective evaluation results for a plurality of posters are acquired from a plurality of human evaluators, the CPU 101 calculates the average value of the responses to each adjective pair, thereby obtaining a representative score value for the corresponding adjective pair. The subjective impression evaluation may be performed by a method other than the SD method, as long as words expressing impressions and the score values corresponding to them can be determined.

In S702, the CPU 101 performs factor analysis on the subjective evaluation result acquired by the subjective evaluation acquisition unit. If subjective evaluation results are directly used, the number of dimensions is given by the number of adjective pairs, which results in complicate control. Therefore, it is desirable to reduce the number of dimensions to a small value using an analysis technique such as principal component analysis, factor analysis, or the like such that efficient analysis becomes possible. In the following description of the present embodiment, it is assumed that the dimensions are reduced such that the number of factors is reduced to four as a result of the factor analysis. Note that the number of factors varies depending on the selection of adjective pairs in the subjective evaluation and the method of factor analysis. It is also assumed that the output of factor analysis is standardized. That is, each factor is scaled to have a mean of 0 and a variance of 1 in the posters used for analysis. As a result, −2, −1, 0, +1, and +2 of the impressions specified by the target impression specification unit 204 can be directly corresponded to −2σ, −1σ, mean value, +1σ, and +2σ in each impression, which makes it easy to calculate the distance (the difference) between the target impression and the estimated impression, as will be described in further detail later. In the present embodiment, the four factors are luxury, familiarity, dynamism, and stateliness shown in FIG. 5. The names of these factors are given for convenience to convey impressions to the user via the user interface, and each factor is composed of a plurality of adjective pairs that influence each other.

In S703, the CPU 101 associates each poster image with the impression thereof. The quantification can be performed for posters subjected to subjective evaluation by the above-described method. However, as for posters that will be created, it is necessary to estimate the impressions of posters without subjective evaluation. The correspondence between the poster image and the impression can be achieved by learning a model for estimating the impression from the poster image using, for example, a deep learning method using the convolution neural network (CNN) or a machine learning method using a decision tree, or the like. In the present embodiment, the impression learning unit performs supervised deep learning using the CNN with the poster image as input and the four factors as output. That is, subjectively evaluated poster images and corresponding impressions are learned as correct answers to create a deep learning model, and impressions are estimated by inputting an unknown poster image into the learning model.

The deep learning model created above is stored in, for example, the HDD 104, and the impression estimation unit 218 loads the deep learning model stored in the HDD 104 into the RAM 103 and executes it.

The impression estimation unit 218 converts the poster data acquired from the layout unit 217 into an image of the poster and estimates the impression of the poster by causing the CPU 101 or the GPU 109 to operate the deep learning model loaded in the RAM 103. Although the deep learning method is used in the present embodiment, the method is not limited to the deep learning. For example, in a case where a machine learning method such as a decision tree is used, feature values such as an average luminance value, an edge value, and/or the like are extracted from the poster image using image analysis, and a machine learning model may be created which estimates the impression based on these feature values.

Processing Flow

Figure 19:
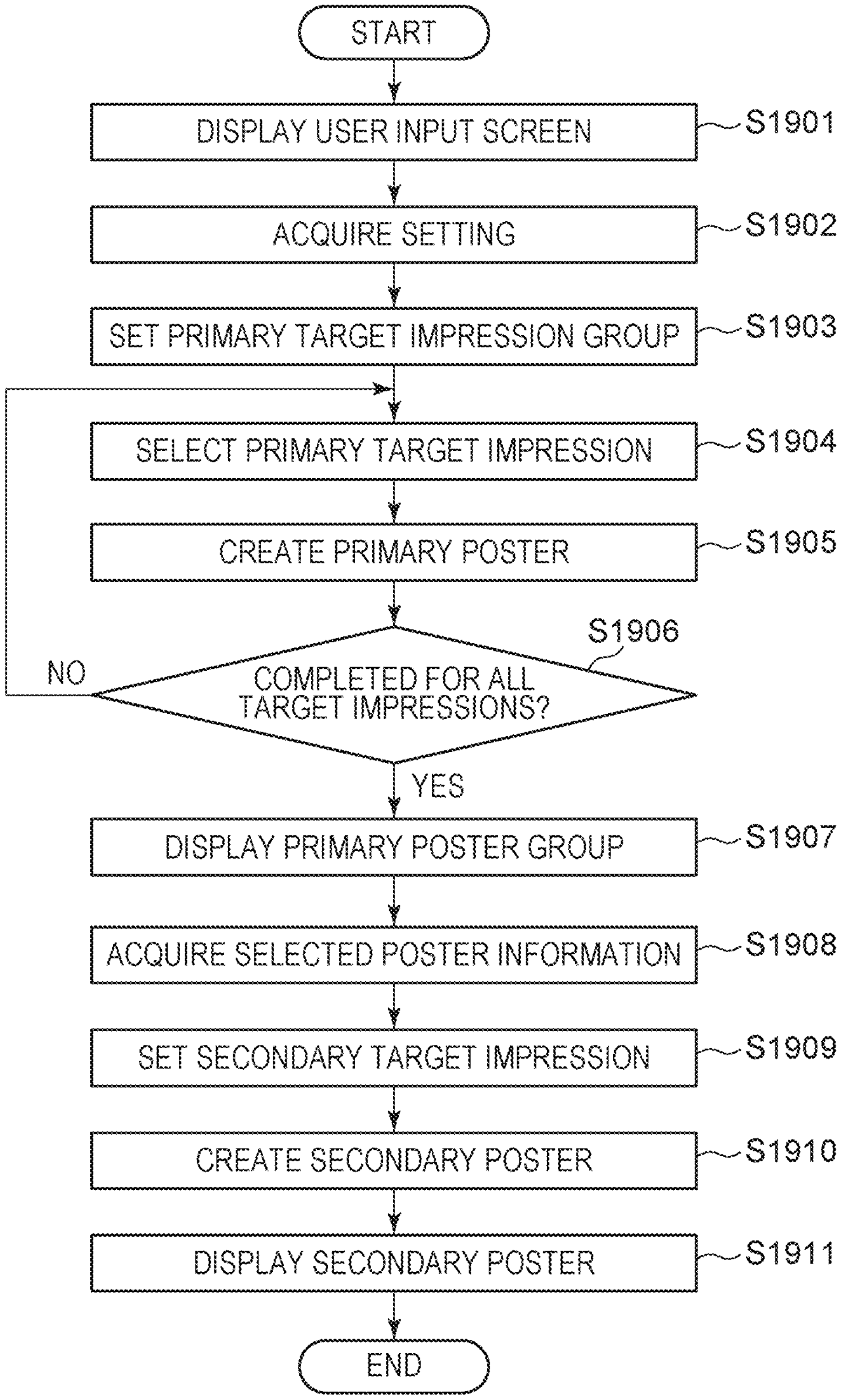
FIG. 19 is a flowchart illustrating a poster creation process.

FIG. 19 is a flowchart illustrating a poster creation process performed by the poster creation application. The flowchart shown in FIG. 19 is realized, for example, by the CPU 101 loading a program stored in the HDD 104 into the RAM 103 and executing the program. In the following description of the process shown in FIG. 19, it is assumed that each step of the flow is executed by components shown in FIG. 2 which are realized by the CPU 101 by executing the poster creation application. Referring to FIG. 19, the poster creation process is described below. Note that the symbol "S" in the description of each process indicates a step in the flowchart (the same applies hereinafter in this specification).

In S1901, the poster creation application displays the application start screen 501 on the display 105. The user inputs each setting on the UI screen shown in FIG. 5 using the keyboard 106 or the pointing device 107 via a UI screen of the application start screen 501.

In S1902, the poster creation condition specification unit 201, the text specification unit 202, the image specification unit 203, and the target impression setting unit 220 respectively acquire corresponding settings from the application start screen 501.

Figures 20, 21:
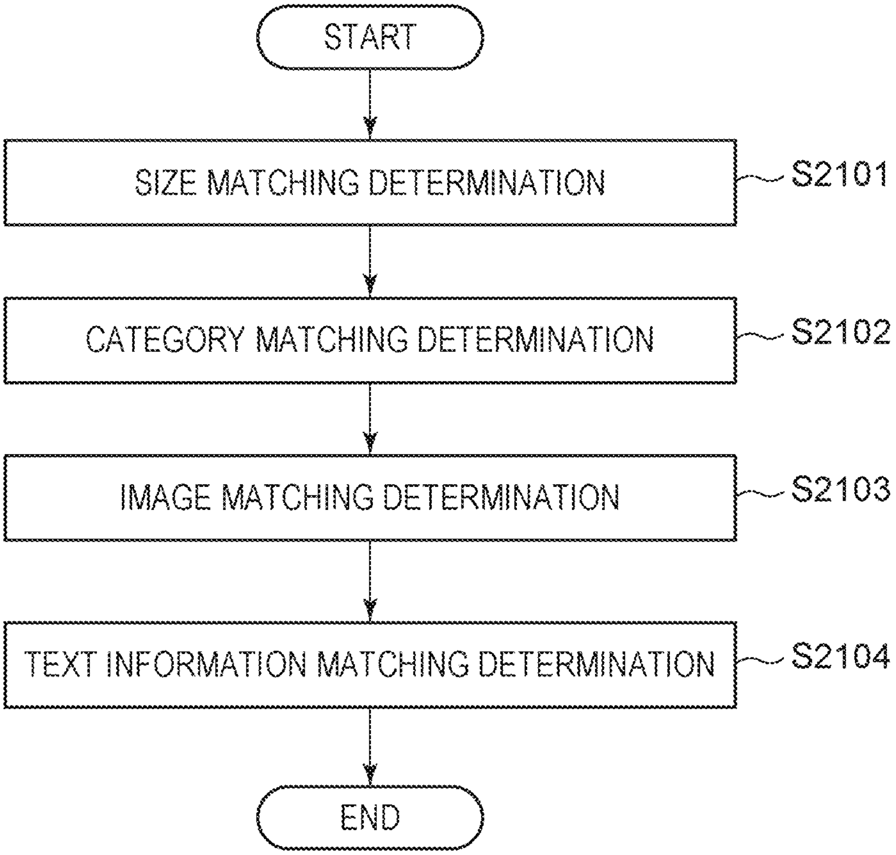
FIG. 20 is a diagram illustrating a target impression selection method.
FIG. 21 is a flowchart illustrating a skeleton acquisition method.

In S1903, the target impression setting unit 220 sets a plurality of target impression impressions with variations as the target impressions of the posters. Here, variations in impressions (hereinafter also referred to as "impression variations") refer to a state in which there are a plurality of posters having various different target impressions. That is, in this state, for example, there are a mixture of posters with different impressions, such as strong luxury, weak luxury, a high dynamism, and/or the like. FIG. 20 is a diagram showing a target impression table that defines a plurality of target impressions. In FIG. 20, the target ID column describes IDs that uniquely identify target impressions. The luxury, familiarity, dynamism, and stateliness columns describe target impression values of the respective impressions. In the present embodiment, each target impression value is given by an integer value between −2 and +2.

In the present embodiment, the target impression setting unit 220 acquires the target impression table from the HDD 104, and randomly acquires from the target impression table as many target impressions as the number of posters to be created specified by the user acquired in S1902. If the acquired target impressions are close to each other, target impressions are randomly acquired again from the target impression table. More specifically, if the average value of the distances of the acquired target impressions is smaller than or equal to a threshold value, the target impression setting unit 220 again randomly acquires target impressions from the target impression table. Hereinafter, in the present embodiment, the plurality of acquired target impressions is referred to as a "primary target impression group". Note that the method of setting the primary target impression group is not limited to the above. For example, the target impression setting unit 220 may predefine a combination of a plurality of target impressions that give a wide variety of impressions. In the process of randomly acquiring target impressions one by one, if the difference between a newly acquired target impression and the target impressions that have already been acquired is equal to or less than a threshold value, the target impression setting unit 220 may discard the newly target impression and may again randomly acquire an impression. Note that any acquisition method may be used as long as a primary target impression group including a variety of impressions can be set.

In S1904, the target impression setting unit 220 selects one target impression from the primary target impression group set in S1903. The selected one target impression is also referred to as a primary target impression.

Figure 9:
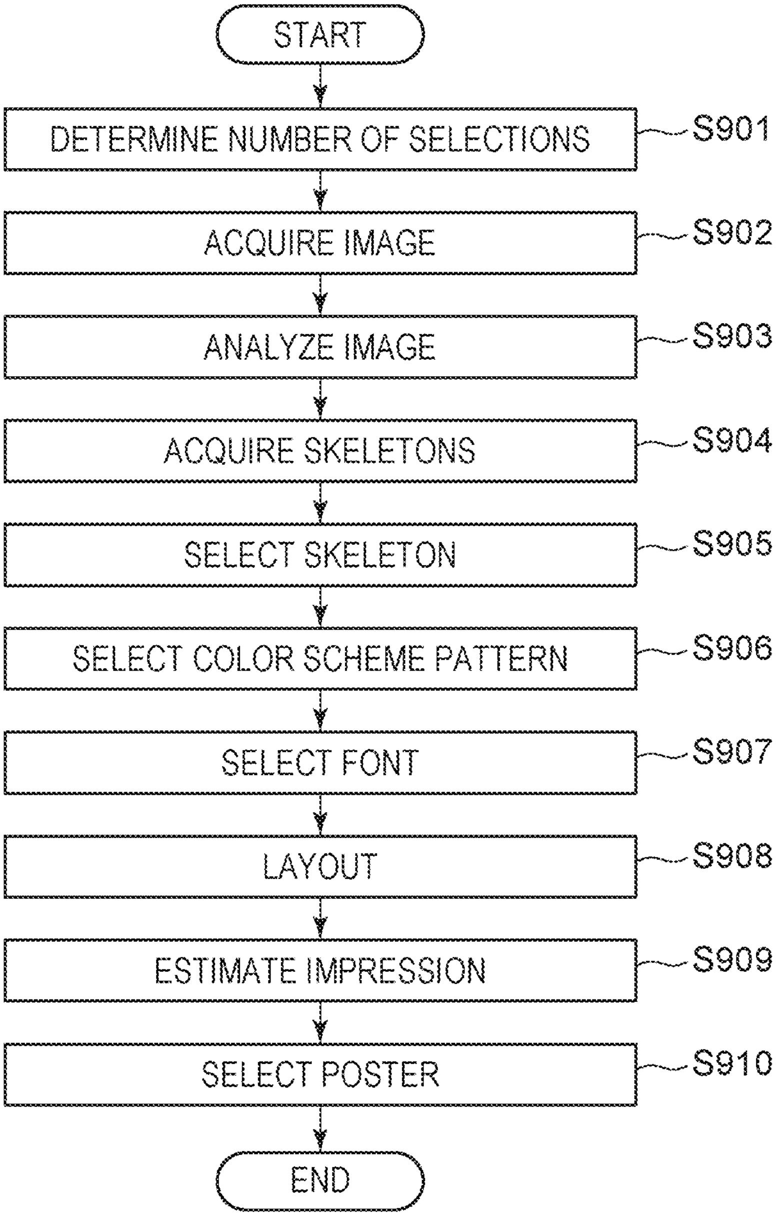
FIG. 9 is a flowchart illustrating a poster creation process.

In S1905, the poster creation unit 210 creates a poster having the primary target impression selected in S1904 (in the present embodiment, hereinafter, this poster is referred to as a "primary poster"). The process in S1905 is described in further detail below with reference to FIG. 9. FIG. 9 is a flowchart illustrating the details of a poster creation process in S1905.

In S901, the skeleton selection unit 214, the color scheme pattern selection unit 215, and the font selection unit 216 respectively determine the number of skeletons, the number of color scheme patterns, and the number of fonts, to be selected. In the present embodiment, using a method described later, the layout unit 217 creates poster data for the specified number of skeletons×the specified number of color scheme patterns×the specified number of fonts. The number of skeletons, the number of color scheme patterns, and the number of fonts are selected such that the number of posters created here is equal to or greater than the number of posters specified to be created. In the present example, it is assumed that the number of posters specified to be created is 6, the number of skeletons is 2, the number of color scheme patterns is 2, and the number of fonts is 2. That is, 8 pieces of poster data are created by the layout unit 217, and one of them is selected by the poster selection unit 219.

Thus, the poster selection unit 219 can select a poster whose overall impression better matches the primary target impression from the created poster data the number of which is greater than or equal to the number of posters specified to be created. In this example, it is assumed that the number of skeletons, the number of color scheme patterns, and the number of fonts are each 2, but the number of skeletons, the number of color scheme patterns, and the number of fonts may be any number equal to or greater than 1.

In S902, the image acquisition unit 211 acquires the image data. More specifically, the image acquisition unit 211 reads the image file specified by the image specification unit 203 from the HDD 104 into the RAM 103.

In S903, the image analysis unit 212 executes an analysis process on the image data acquired in S902 to acquire information indicating a feature value. Examples of information indicating a feature value include meta information stored in an image and information indicating an image feature value that can be obtained by analyzing the image. These pieces of information are used in an object recognition process performed as the analysis process.

Note that in the present embodiment, the object recognition is performed as the analysis process, but the analysis process is not limited to the object recognition process, and other analysis processes may be executed. Note that the process in S905 may be omitted.

Details of the process performed in S903 by the image analysis unit 212 are described below.

The image analysis unit 212 executes the object recognition process on the image acquired in S902. Here, a known method can be used for the object recognition process. In the present embodiment, an object is recognized by a discriminator generated by deep learning. The discriminator outputs a likelihood value of 0 to 1 as to whether a certain pixel constituting the image is a pixel constituting each object, and recognizes that an object exists in the image when the likelihood value exceeding a certain threshold value. By recognizing the object image, the image analysis unit 212 can acquire the types and positions of objects such as faces, pets such as dogs and cats, flowers, food, buildings, ornaments, and landmarks.

In S904, the skeleton acquisition unit 213 acquires skeletons that meet various setting conditions. In the present embodiment, it is assumed that one skeleton is described in one file and stored in the HDD 104. The skeleton acquisition unit 213 sequentially reads skeleton files from the HDD 104 into the RAM 103, while keeping skeletons that meet the conditions in the RAM 103 and deleting skeletons that do not meet the conditions from the RAM 103. FIG. 21 shows a flowchart of a condition judgement process performed by the skeleton acquisition unit 213. The condition judgement process performed by the skeleton acquisition unit 213 is described below with reference to FIG. 21.

In S2101, the skeleton acquisition unit 213 determines whether the size of each poster stored into the RAM 103 matches the poster size specified by the poster creation condition specification unit 201. Although in this example it is checked whether the sizes match, it may be checked only whether aspect ratios match. In this case, the skeleton acquisition unit 213 acquires a skeleton whose size matches the poster size specified by the poster creation condition specification unit 201 when the coordinate system of the read skeleton is properly increased or reduced.

In S2102, the skeleton acquisition unit 213 determines whether the purpose category specified by the poster creation condition specification unit 201 matches the category of the skeleton. For skeletons that are used only for a specific purpose, the purpose categories thereof are described in the skeleton files such that the skeletons are not acquired unless the corresponding purpose category is selected. When a skeleton is designed for a specific purpose, for example, as in a case where a graphic image representing school is drawn on a skeleton or as in a case where a graphic image of sports equipment or the like is drawn on a skeleton, such a skeleton is allowed to be used only for the specific purpose and is prevented from being used for other purpose categories. Note that in a case where no purpose category is set on the application start screen 501, S2102 is skipped.

In S2103, the skeleton acquisition unit 213 determines whether the number of read-in image objects of the skeleton is equal to the number of images acquired by the image acquisition unit 211.

In S2104, the skeleton acquisition unit 213 determines whether the text object of the read-in skeleton is matches the text information specified by the text specification unit 202. More specifically, it is determined whether the type of the text information specified by the text specification unit 202 exists on the skeleton. For example, assume that character strings are specified in the title box 502 and the main text box 504 on the application start screen 501, and a blank is specified in the subtitle box 503. In this case, all text objects in the skeleton are searched, and if a text object whose type is set as "title" in the metadata and a text object whose type is set as "text" in the metadata are both found, it is determined that the skeleton is a match (suitable), but otherwise it is determined that the skeleton is a mismatch (unsuitable).

As described above, the skeleton acquisition unit 213 keeps in the RAM 103 skeletons that match all set conditions in terms of the skeleton size, the purpose category, the number of image objects, and the type of the text object. Although the skeleton acquisition unit 213 checks all skeleton files stored in the HDD 104 in the present embodiment, this is only by way of example and not limitation. For example, the poster creation application may store in the HDD 104 a database that associates file paths of skeleton files with search conditions (the skeleton size, the number of image objects, and types of text objects). In this case, the skeleton acquisition unit 213 searches the database for skeleton files that match the conditions, and the skeleton acquisition unit 213 reads only skeleton files found in the search from the HDD 104 into the RAM 103, which allows it to acquire the skeleton files at a high speed. Referring again to FIG. 9, the following processing is described below.

Figures 10A, 10B, 10C:
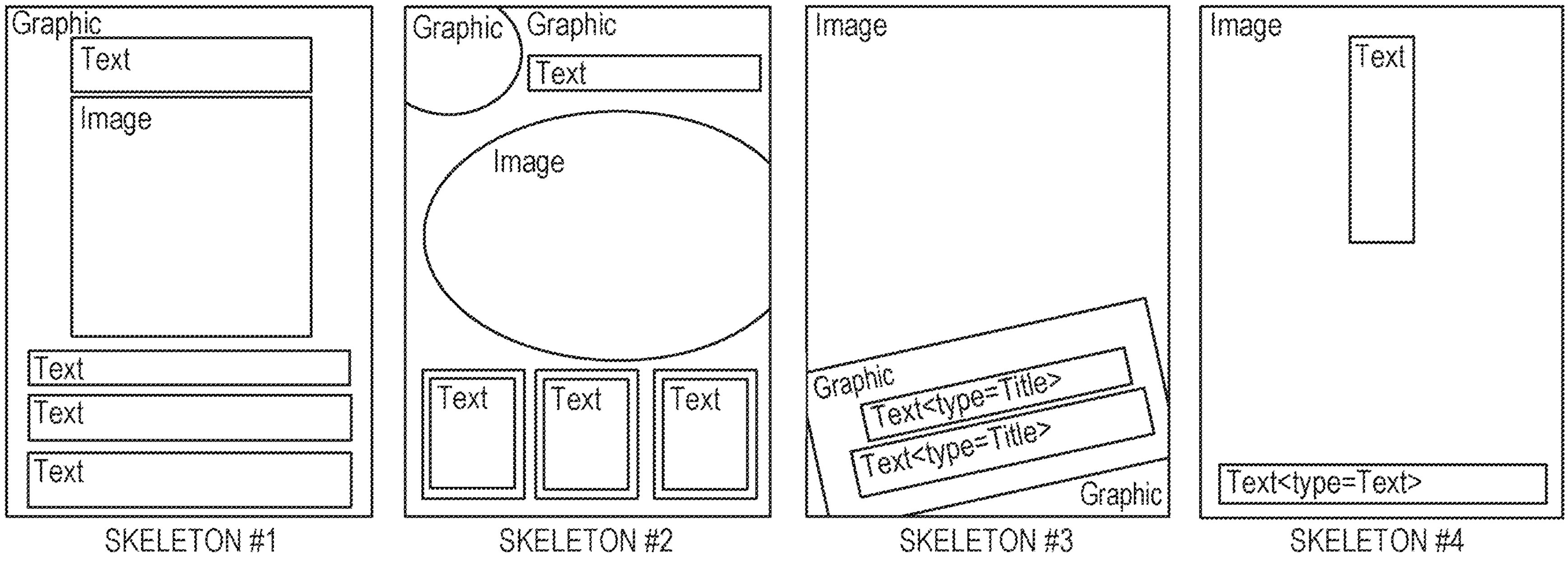
FIGS. 10A to 10C are diagrams illustrating a skeleton selection method.

In S905, the skeleton selection unit 214 selects, from the skeletons acquired in S904, a skeleton that matches the primary target impression selected in S1904. FIGS. to 10C are diagrams illustrating a method of selecting the skeleton by the skeleton selection unit 214. FIG. 10A is a diagram illustrating an example of a table that associates skeletons with impressions. In FIG. 10A, skeleton file names are described in a skeleton name column. The luxury, familiarity, dynamism, and stateliness columns describe numerical values that indicate the degree to which the respective skeletons contribute to the respective impressions. The values correspond to impressions such that −2 corresponds to "low", −1 to "rather low", 0 to "neutral", +1 to "rather high", and +2 to "high". First, the skeleton selection unit 214 calculates the distance between the target impression acquired from the target impression specification unit 204 and each impression described in a skeleton impression table shown in FIG. 10A. For example, in a case where the target impression is specified as "luxury=+1, familiarity=−1, dynamism=−2, and stateliness=+2", the distances are calculated by the skeleton selection unit 214 as shown in FIG. 10B. Note that in the present embodiment, the distance is expressed in the Euclidean distance (note that hereinafter, the distance is expressed in the Euclidean distance unless otherwise specified). The smaller the distance, the closer the estimated impression is to the target impression.

Next, the skeleton selection unit 214 selects the top N skeletons with the shortest distance values shown in FIG. 10B. In the present embodiment, the skeleton selection unit 214 selects the top two skeletons. That is, the skeleton selection unit 214 selects the skeleton #1 and the skeleton #4.

Note that N may be set to a fixed value, or may be variable according to the condition specified by the poster creation condition specification unit 201. For example, in a case where the number of posters to be created is specified as 6 in the box 514 for specifying the number of posters to be created on the application start screen 501, the poster creation unit 210 creates 6 posters. The layout unit 217, which will be described later, creates a poster by combining a skeleton, a color scheme pattern, and a font respectively selected by the skeleton selection unit 214, the color scheme pattern selection unit 215, and the font selection unit 216. For example, in a case where two skeletons, two color scheme patterns, and two fonts are selected, a total of as many posters as 2×2×2=8 are created, which satisfies the condition that the number of posters to be created is 6. As described above, the number of skeletons to be selected may be determined according to the conditions specified by the poster creation condition specification unit 201.

Note that the value range of each impression in the skeleton impression table shown in FIG. 10A does not necessarily need to be equal to the value range of the primary target impression selected in S1904. In the present embodiment, the value range of the primary target impression selected in S1904 is from −2 to +2, but the value range of the skeleton impression table may be different from this value range. In this case, the distance described above is calculated after the value range of the skeleton impression table is scaled to match that of the target impression. The distance calculated by the skeleton selection unit 214 is not limited to the Euclidean distance, and any distance such as the Manhattan distance, the cosine similarity, or the like may be used as long as it is possible to calculate the distance between vectors. In a case where the radio button 517 is set such that the target impression is set to OFF, the calculation of the distance is not performed.

The skeleton impression table is generated in advance by estimating the impressions of poster images created for various skeletons while fixing the color scheme pattern, the font, and the image and text data placed on each skeleton, and the generated skeleton impression table is stored in the HDD 104. That is, by estimating the impressions of poster images that use the same colors, images, etc., but are different in the layout of the characters, the images, or the like, it is possible to describe the characteristics relative to other skeletons in the table. In the describing of the characteristics in the table, it is desirable to standardize the impressions based on the overall impression. That is, it is desirable to perform a process to cancel the effects of the used color scheme patterns, images, etc. on the impressions by averaging the impressions of a plurality of poster images created using the plurality of color scheme patterns, images, etc. from the one skeleton. This makes it possible to tabulate the impact of the positions on the impression. For example, it is possible to describe that in the case of the skeleton with a small image, the impression is determined by graphic elements or text elements independent of images, or that the tilted placement of images or text provides strong dynamism. FIG. 10C illustrates examples of skeletons respectively corresponding to skeletons #1 to #4 shown in FIG. 10A. For example, in skeleton #1, image objects and text objects are regularly arranged, and the area of the image is small, and thus the dynamism is low. In skeleton #2, the graphic object and the image object are circular, and thus the familiarity is high but the stateliness is low. In skeleton #3, a large image object is placed over a large area and a tilted graphic object is superimposed on the image object, and thus a high dynamism is obtained. In skeleton #4, an image is placed over the entire skeleton, and a text object is placed in a minimized area, and thus a high stateliness is obtained but dynamism is low. As described above, in a case where a poster image includes characters or images, poster images with different target impressions are created depending on how the characters or images are arranged. Note that the method of generating the skeleton impression table is not limited to that described above. The impressions may be estimated from features of placement information such as areas and/or coordinates of images or title text. Furthermore, the impressions may be manually adjusted. The skeleton impression table is stored in the HDD 104, and the skeleton selection unit 214 reads out the skeleton impression table from the HDD 104 into the RAM 103 and refers to it.

In S906, the color scheme pattern selection unit 215 selects a color scheme pattern that matches the primary target impression selected in S1904. The color scheme pattern selection unit 215 refers to the impression table corresponding the color scheme pattern, as in S904, and selects a color scheme pattern according to the target impression. FIG. 11A illustrates an example of a color scheme pattern impression table that associates color scheme patterns with impressions. The color scheme pattern selection unit 215 calculates the distance between the target impression and the impressions described in the luxury to stateliness columns of the table in FIG. 11A for each color scheme pattern, and selects the top N color scheme patterns with the smallest distance. In this example, the top two color scheme patterns are selected. Like the skeleton impression table, the color scheme pattern impression table is obtained by creating posters with various color scheme patterns while fixing the skeleton, the fonts, and the image and estimating the impressions of the created posters and tabulating the impression tendencies of the color scheme patterns.

In S907, the font selection unit 216 selects a combination of fonts that match the primary target impression selected in S1904. The font selection unit 216 refers to the impression table corresponding to the fonts, as in S904, and selects a font according to the target impression. FIG. 11B illustrates an example of a front impression table that associates fonts with impressions. The font selection unit 216 calculates the distance between the target impression and the impressions described in the luxury to stateliness columns in FIG. 11B for each font, and selects the top N fonts with the smallest distance. Like the skeleton impression table, the font impression table is obtained by creating posters using various fonts while fixing the skeleton, the color scheme pattern, and the image and estimating the impressions of the resultant posters and tabulating the impression tendencies of the fonts.

In S908, the layout unit 217 sets text information, images, color schemes, and fonts for the skeleton selected by the skeleton selection unit 214, and creates a poster.

Figure 12:
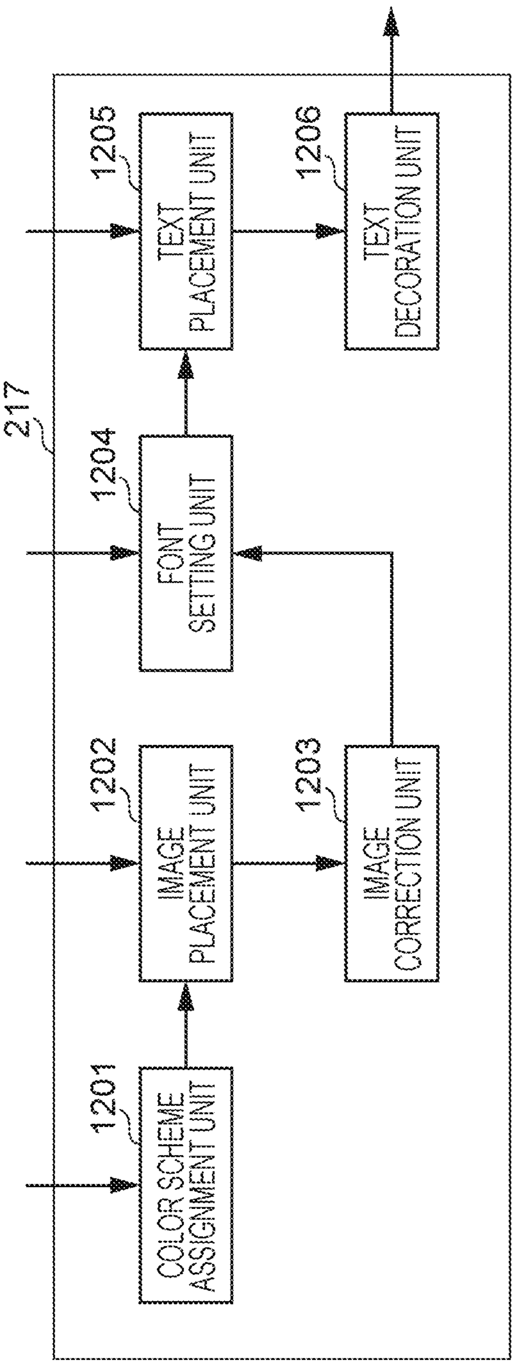
FIG. 12 is a software block diagram illustrating details of a layout unit.
Figure 13:
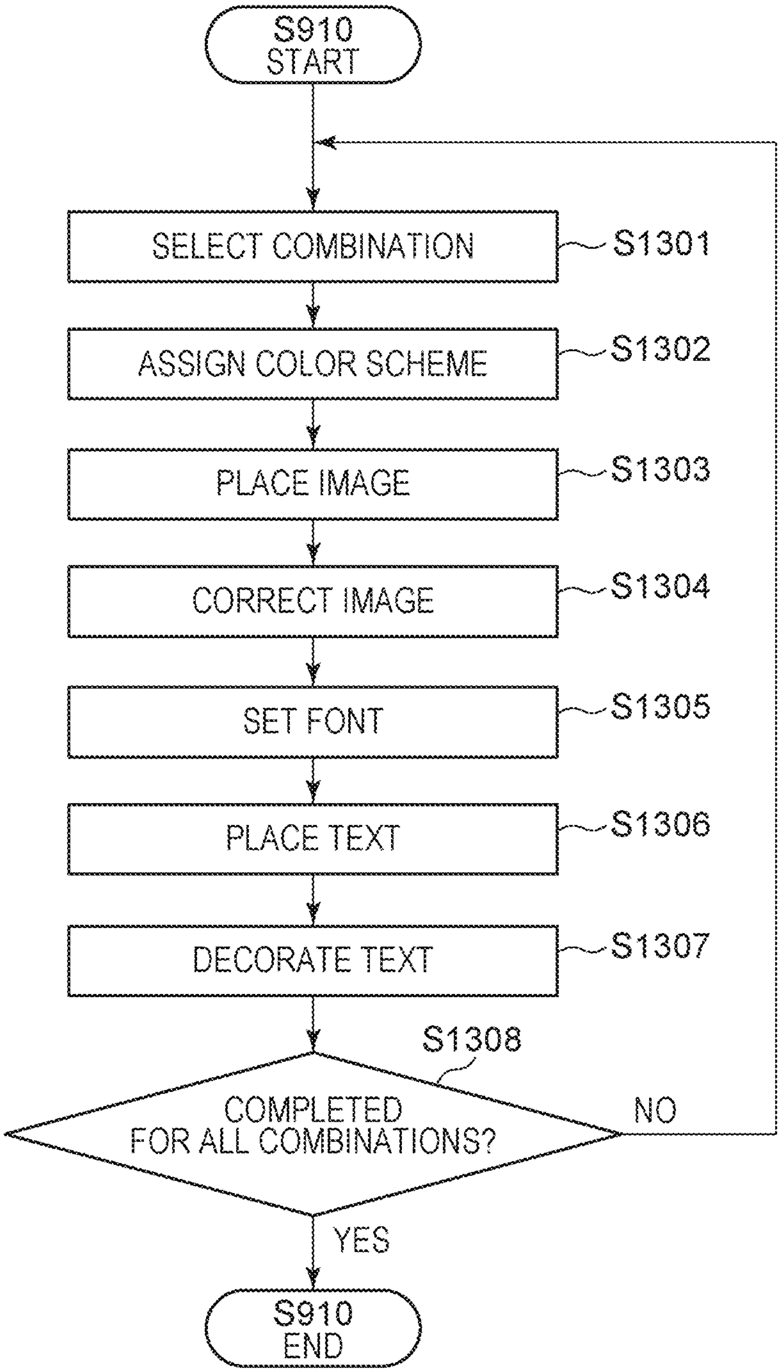
FIG. 13 is a flowchart illustrating a layout process.

The layout unit 217 and the process in S908 are described in detail below with reference to FIG. 12, FIG. 13, FIGS.

Figures 14A, 14B, 14C:
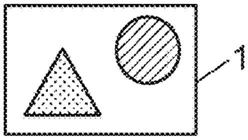
FIGS. 14A to 14C are diagrams illustrating inputs to a layout unit.
Figures 15A, 15B, 15C:
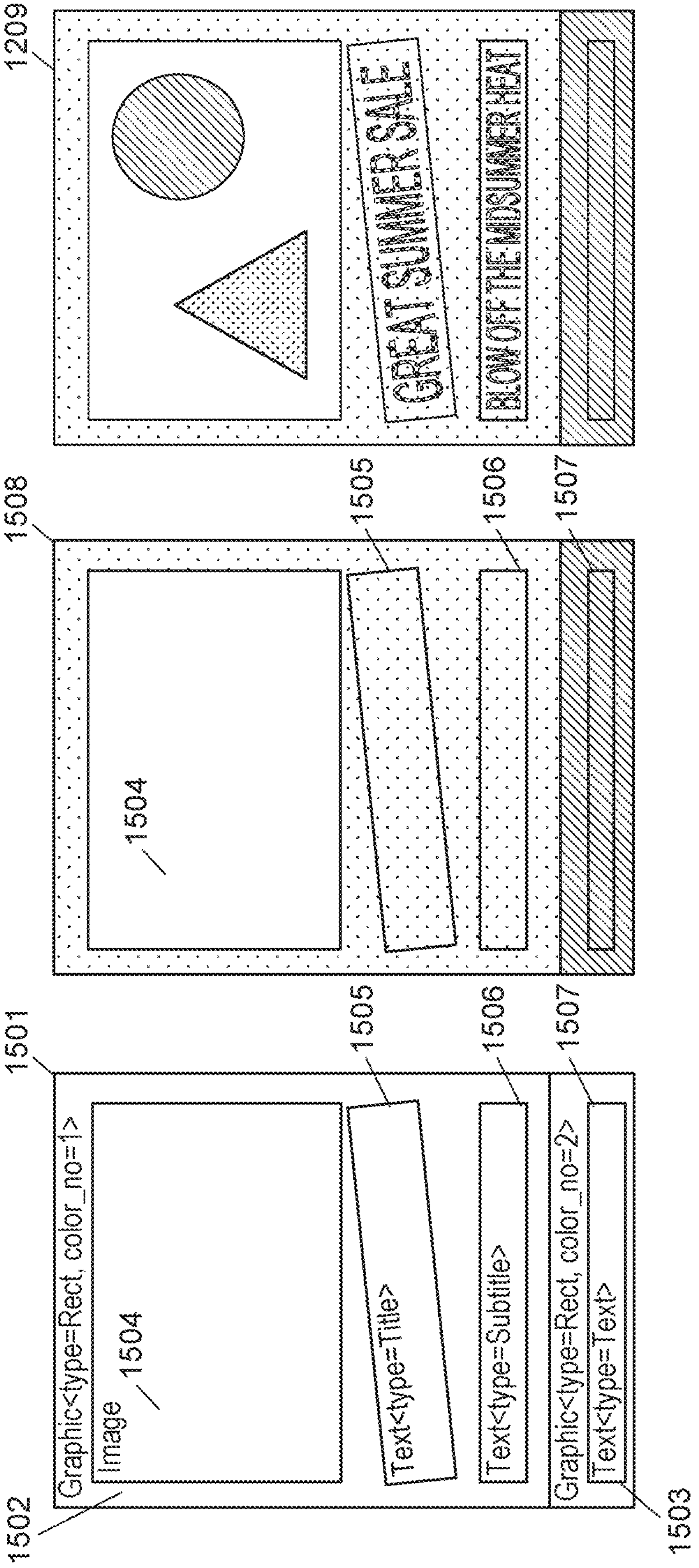
FIGS. 15A to 15C are diagrams illustrating an operation of a layout unit.

14A to 14C, and FIGS. 15A to 15C. FIG. 12 is a software block diagram illustrating details of the layout unit 217. The layout unit 217 includes a color scheme assignment unit 1201, an image placement unit 1202, an image correction unit 1203, a font setting unit 1204, a text placement unit 1205, and a text decoration unit 1206. FIG. 13 is a flowchart illustrating the details of the process in S908. FIGS. 14A to 14C are diagrams illustrating information input to the layout unit 217. FIG. 14A is a table summarizing text information specified by the text specification unit 202 and images specified by the image specification unit 203. FIG. 14B illustrates an example of a table indicating color scheme patterns acquired by the color scheme pattern selection unit 215. FIG. 14C illustrates examples of fonts acquired from the font selection unit 216. FIGS. 15A to 15C are diagrams illustrating processing steps performed by the layout unit 217.

First, referring to FIG. 13, the process in S908 is described in detail below.

In S1301, the layout unit 217 lists all combinations of skeletons acquired from the skeleton selection unit 214, color scheme patterns acquired from the color scheme pattern selection unit 215, and fonts acquired from the font selection unit 216. The layout unit 217 sequentially creates poster data for each combination in following layout processing. For example, in a case where the number of skeletons acquired from the skeleton selection unit 214 is 3, the number of color scheme patterns acquired from the color scheme pattern selection unit 215 is 2, and the number of fonts acquired from the font selection unit 216 is 2, the layout unit 217 creates as many pieces of poster data as 3×2×2=12. Next, in S1301, the layout unit 217 selects one combination from the list of combinations, and executes the processes in S1302 to S1307.

In S1302, the color scheme assignment unit 1201 assigns color scheme patterns acquired from the color scheme pattern selection unit 215 to the skeletons acquired from the skeleton selection unit 214. FIG. 15A is a diagram illustrating an example of a skeleton. In the following description of the present embodiment, it is assumed by way of example that a color scheme pattern with a color scheme ID of 1 shown in FIG. 14B is assigned to a skeleton 1501 shown in FIG. 15A. The skeleton 1501 in FIG. 15A includes two graphic objects 1502 and 1503, one image object 1504, and three text objects 1505 to 1507. First, the color scheme assignment unit 1201 assigns color schemes to the graphic objects 1502 and 1503. More specifically, based on a color scheme number described in metadata of each graphic object, a color of a color scheme pattern is assigned. Next, of the text objects, a text object whose type is specified as "title" in the metadata of the text object is assigned, for example, the last color in the color scheme pattern. That is, in the present example, the color #4 is assigned to the text object 1505. Next, of the text objects, a text object whose type is specified as other than "title" in the metadata of the text object is assigned a color determined based on the brightness of the background of the text object. In the present embodiment, if the brightness of the background of the text object is lower than or equal to a threshold value, white is assigned to the text color, but otherwise black is assigned to the text color. FIG. 15B is a diagram showing the state of the skeleton 1508 after the color scheme assignment described above is performed. The color scheme assignment unit 1201 outputs the color-assigned skeleton data to the image placement unit 1202.

In S1303, the image placement unit 1202 places the image data acquired from the image analysis unit 212 on the skeleton data acquired from the color scheme assignment unit 1201 based on the accompanying analysis information. In this example, the image placement unit 1202 assigns the image data 1401 to the image object 1504 on the skeleton. In a case where the image object 1504 and the image data 1401 have different aspect ratios, the image placement unit 1202 performs trimming such that the aspect ratio of the image data 1401 is equal to the aspect ratio of the image object 1504. More specifically, based on the face position and the object position obtained as a result of analyzing the image data 1401 by the image analysis unit 212, the trimming is performed so as to minimize the reduction in the face area and the object area caused by the trimming. Note that the trimming method is not limited to this, and other trimming methods may be used. For example, the center of the image may be trimmed, or a composition is devised such that the face position is in a triangular composition, or the like. The image placement unit 1202 outputs the resultant image-assigned skeleton data to the image correction unit 1203.

In S1304, the image correction unit 1203 acquires the image-assigned skeleton data from the image placement unit 1202, and corrects the images placed on the skeleton. In the present embodiment, when the image resolution is insufficient, upsampling is performed using super-resolution processing. First, the image correction unit 1203 confirms whether the images placed on the skeleton satisfy a predetermined resolution. For example, in a case where an image of 1600 pixels×1200 pixels is assigned to an area of 200 mm×150 mm on the skeleton, the print resolution of the image that will be obtained when the image is printed can be calculated according to equation 1.

$$\frac{1600}{200 \div 25.4} \approx 203[dpi] \tag{1}$$

Next, in a case where it is determined that the print resolution of the image is lower than a threshold value, the image correction unit 1203 increases the resolution by performing super-resolution processing. However, in a case where it is determined that the print resolution of the image is greater than or equal to the threshold value and thus the resolution is sufficient, no particular image correction is performed. In the present embodiment, the super-resolution processing is performed when the print resolution is lower than 300 dpi.

In S1305, the font setting unit 1204 sets the font acquired from the font selection unit 216 to the image-corrected skeleton data acquired from the image correction unit 1203. FIG. 14C shows an example of a combination of fonts selected by the font selection unit 216. In the following description of the present example, it is assumed that the font with a font ID of 2 shown in FIG. 14C is assigned to the image-corrected skeleton data. In this example, fonts are set for the text objects 1505, and 1506, and 1507 of the skeleton 1508. As for fonts of posters, in many cases, a conspicuous font is used for titles to provide high visual attractiveness, while an easy-to-read font is used for other types of text to provide high visibility. Therefore, in the present embodiment, the font selection unit 216 selects two types of fonts, that is, a title font and a text font. The font setting unit 1204 sets the title font for the text object 1505 whose type is title, and sets the text font for the other text objects 1506 and 1507. The font setting unit 1204 outputs the font-set skeleton data to a text placement unit 1205. In the present embodiment, the font selection unit 216 selects two types of fonts, but this is only by way of example and not limitation. For example, only the title font may be selected. In this case, the font setting unit 1204 uses a font corresponding to the title font as the text font. That is, for example, in a case where a Gothic family font is used for the title, a Gothic family font that is highly readable may be used for other types of text objects, while in a case where a Mincho family font is used for the title, a Mincho family font may be used for other types of text objects, and so on. Of course, the title font and the text font may be the same. Alternatively, different fonts may be used depending on how prominent the text objects are to be. For example, the title font is used for the title text object and subtitle text objects, the text font is used for the other text objects, the title font is used for text objects described in fonts with a size greater than or equal to a predetermined value.

In S1306, the text placement unit 1205 places the text specified by the text specification unit 202 on the font-set skeleton data acquired from the font setting unit 1204. In the present embodiment, each text shown in FIG. 14A is assigned according to the attribute described in the metadata of each text object of the skeleton. More specifically, "GREAT SUMMER SALE" whose attribute is title is assigned to the text object 1505, and "BLOW OFF THE MIDSUMMER HEAT" whose attribute is subtitle is assigned to the text object 1506. Nothing is set to the main text, and thus nothing is assigned to the text object 1507. FIG. 15C shows a skeleton 1509, which is an example of skeleton data processed by the text placement unit 1205. The text placement unit 1205 outputs the skeleton data to which the text has been placed to a text decoration unit 1206.

In S1307, the text decoration unit 1206 decorates the text object in the text-placed skeleton acquired from the text placement unit 1205. In the present embodiment, if the color difference between the characters of the title and its background area is smaller than or equal to a threshold value, a process is performed to border the characters of the title. This improves the readability of the title. The text decoration unit 1206 outputs the decorated skeleton data, that is, the poster data that has been completely laid out to the impression estimation unit 218.

In S1308, the layout unit 217 determines whether all poster data has been created. In a case where the layout unit 217 determines that poster data has been created for all combinations of skeletons, color scheme patterns, and fonts, the layout unit 217 ends the layout processing and advances the processing flow to S911. In a case where it is determined that the poster data has not been created for all combinations, the processing flow returns to S1301 to create poster data for a combination that has not yet been subjected to the creation.

In S909, the impression estimation unit 218 renders each piece of poster data acquired from the layout unit 217, and associates the estimated impression obtained by estimating the impression of the rendered poster image with the poster data. Note that the rendering process is a process of converting poster data into image data. For example, even if the color scheme pattern is the same, the layout can change depending on the skeleton, and thus which color is actually used in how large an area is different depending on the skeleton. Therefore, it is necessary to evaluate the final overall impression of the poster as well as the individual impressions of the color scheme patterns and skeletons. Therefore, this process is performed at this timing.

This makes it possible to evaluate not only the impression of individual elements of the poster such as color schemes and positions, but also the impression of the final poster including laid images and characters.

In S910, the poster selection unit 219 selects a poster to be output to the display 105 (thereby being presented to the user) based on the poster data and the associated estimated impression acquired from the impression estimation unit 218. In the present embodiment, the poster selection unit 219 selects one poster that has the smallest distance between the target impression and the estimated impression of the poster.

Note that in the present embodiment, the distance is expressed in the Euclidean distance. The smaller the Euclidean distance, the closer the estimated impression is to the target impression. The distance calculated by the poster selection unit 219 is not limited to the Euclidean distance, and any distance such as the Manhattan distance, the cosine similarity, or the like may be used as long as it is possible to calculate the distance between vectors.

Thus, the poster creation process in S1905 shown in FIG. 9 is completed. Referring again to FIG. 19, the following processing is described.

In S1906, the target impression setting unit 220 determines whether posters corresponding to all target impressions included in the primary target impression group have been created. In a case where it is determined that posters have been created for all target impressions, the processing flow proceeds to S1907. In a case where it is determined that posters have not been created for all target impressions, the processing flow returns to S1904 to create poster data according to a target impression that has not been used in the poster creation.

In S1907, the poster display unit 205 performs rendering on all the created primary posters and outputs poster images to the display 105. More specifically, in the present example, the primary poster preview screen 601 in FIG. 6 is displayed.

In S1908, the poster specification unit 221 outputs, to the poster selection unit 219, information identifying a poster that is in the selected state when the design candidate button 607 is pressed on the primary poster preview screen 601. The poster selection unit 219 then outputs the estimated impression associated with the selected poster to the target impression setting unit 220.

In S1909, the target impression setting unit 220 sets a new target impression based on the estimated impression acquired in S1908. Hereinafter, in the present embodiment, the newly set target impression is referred to as a "secondary target impression". In this example, the estimated impression is directly set as the secondary target impression. Note that the method of setting the secondary target impression is not limited to this. For example, the target impression setting unit 220 may round the estimated impression to an integer value, and may set the resultant value as the secondary target impression, or may set the primary target impression used in creating the selected posters as the secondary target impression.

Any target impression that is associated with the impression expressed by the selected poster may be used.

In S1910, the poster creation unit 210 creates a poster having the secondary target impression set in S1909 (in the present embodiment, hereinafter, this poster is referred to as a "secondary poster"). The poster creation process executed in S1910 by the poster creation unit 210 is similar to the poster creation process executed in S1905, the details of which are described above with reference to FIG. 9 except for some differences, and therefore, only the differences are described below.

In S901, the skeleton selection unit 214, the color scheme pattern selection unit 215, and the font selection unit 216 determine the number of skeletons, the number of color scheme patterns, and the number of fonts to be selected according to the number of posters to be created specified by the poster creation condition specification unit 201. In the present embodiment, using a method described later, the layout unit 217 creates poster data for the specified number of skeletons×the specified number of color scheme patterns× the specified number of fonts. The number of skeletons, the number of color scheme patterns, and the number of fonts are selected such that the number of posters created here is equal to or greater than the number of posters specified to be created. In this example, the number of skeletons is set to the same value as the number of posters to be created, and the number of color scheme patterns, and the number of fonts are each determined according to equation 2 shown below.

$$\text{The number of selections} = \left\lceil \sqrt[3]{\text{Thenumberofcreations} \times 2} \right\rceil \quad (2)$$

For example, if the number of posters to be created specified by the poster creation condition specification unit 201 is 6, then the number of skeletons to be selected is set to 6, and the number of color scheme patterns and fonts to be selected are each set to 3. The layout unit 217 creates 54 pieces of poster data, and the poster selection unit 219 selects six of them. Thus, the poster selection unit 219 can select a poster whose overall impression better matches the secondary target impression from the created poster data the number of which is greater than or equal to the number of posters specified to be created. S902 to S904 in the secondary poster creation process are the same as S902 to S904 in the primary poster creation process, and therefore a duplicate description thereof is omitted.

Figure 22:
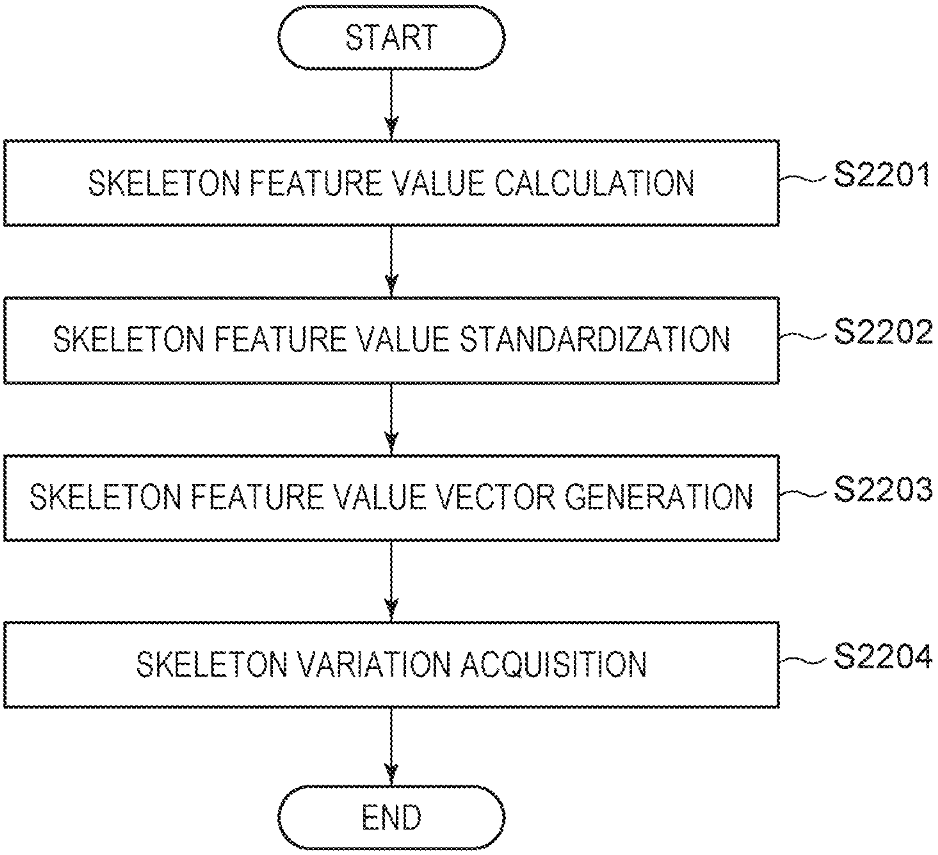
FIG. 22 is a flowchart illustrating a skeleton selection process.

In S905, the skeleton selection unit 214 selects skeletons having variations from the skeletons acquired in S904. Here, the existence of variations of skeletons (hereinafter referred to as "skeleton variations") refers to a state in which a plurality of skeletons having a wide variety of skeleton features exist. More specifically, there is a wide variety of skeletons in terms of the type, the arrangement, the number, the size, and the slant of text objects, and the arrangement, the shape, and the size of graphic objects and image objects, and relative positions between objects. Referring to FIG. 22, the details of the process in S905 according to the present embodiment are described below. FIG. 22 is a flowchart illustrating the details of the process in S905.

In S2201, the skeleton selection unit 214 calculates a plurality of feature values representing features of the skeleton (hereinafter referred to as "skeleton feature values") for each skeleton acquired in S904. The skeleton feature values calculated according to the present embodiment are described below.

The skeleton selection unit 214 calculates relative coordinates indicating the position of the center of the text object whose type is specified as "title" in the metadata positioned on the skeleton 301.

In the present embodiment, the coordinates represent the horizontal position (hereinafter referred to as the "X coordinate") and the vertical position (hereinafter referred to as the "Y coordinate") in the XY coordinate system whose origin is taken at the upper left corner of the skeleton 301. The skeleton selection unit 214 sets the X coordinate of the origin to 0 and the X coordinate of the right end of the skeleton 301 to 1, and calculates the X coordinate, which has a value in the range from 0 to 1, of the center of the text object whose type is specified as "title" in the metadata. Similarly, the skeleton selection unit 214 sets the Y coordinate of the origin to 0 and the Y coordinate of the lower end of the skeleton 301 to 1, and calculates the Y coordinate, which has a value in the range from 0 to 1, of the center of the text object whose type is specified as "title" in the metadata. In a case where there are a plurality of text objects whose type is specified in the metadata as "title", the average coordinates of the central coordinates of the plurality of text objects are calculated. This skeleton feature value represents the feature of where the title exists on the skeleton 301.

The skeleton selection unit 214 calculates the area ratio of the text object on the skeleton 301. More specifically, the skeleton selection unit 214 sets the area of the entire skeleton 301 to 1, and calculates the total area occupied by all the text objects on the skeleton 301 that falls in the range from 0 and 1. This skeleton feature value represents the total amount of characters that can be placed on the skeleton 301.

The skeleton selection unit 214 acquires the largest font size among all text objects (hereinafter referred to as the "largest font size"). This skeleton feature value represents the largest size of the character among characters displayed on the skeleton 301.

The skeleton selection unit 214 acquires the smallest font size among all text objects (hereinafter referred to as the "smallest font size"), and calculates the ratio of the smallest font size to the largest font size (hereinafter referred to as the "font size jump ratio"). This skeleton feature value represents the conspicuity of a text object having the largest font size. Note that the method for calculating the font size jump rate is not limited to this example. For example, in a case where the type of "title" is specified in the metadata for the text object having largest font size, the font size ratio among the text objects may be calculated. Alternatively, the ratio of the average font size of all text objects to the font size of a text object whose type is specified as "title" in metadata may be calculated.

The skeleton selection unit 214 calculates the average area ratio of the image objects on the skeleton 301. More specifically, the skeleton selection unit 214 sets the area of the entire skeleton 301 to 1, and calculates the total area occupied by all the image objects on the skeleton 301 that falls within the range from 0 and 1, and divides the resultant total area by the number of image objects. This skeleton feature value represents the average size of images that can be placed on the skeleton 301.

Although not used in the present embodiment, the skeleton feature values may include feature values representing the placement angle of a text object, the shape of an image object, and/or the like. Any feature value representing the feature of the skeleton may be used.

In S2202, the skeleton selection unit 214 standardizes each skeleton feature value acquired in S2201. More specifically, each skeleton feature value calculated in S2201 is standardized according to equation 3.

$$f_{standardized} = \frac{f - f_{average}}{\sigma} \quad (3)$$

In equation 3, f is the skeleton feature value calculated in S2201, $f_{average}$ is the average value of the skeleton feature values fin the skeleton group acquired in S2201, σ is the standard deviation of the skeleton feature values fin the skeleton group acquired in S2201, and $f_{standardized}$ is the standardized skeleton feature value f. The standardization makes it possible to compare the sizes between different skeleton features.

In S2203, the skeleton selection unit 214 puts together the skeleton feature values standardized in S2202 and generates a feature value vector representing the features of the skeleton (hereinafter referred to as the "skeleton feature vector").

In S2204, the skeleton selection unit 214 selects as many skeletons having various features as the number of posters specified to be created by the poster creation condition specification unit 201, based on the skeleton feature vectors generated in S2203. More specifically, first, one skeleton is randomly selected from the skeletons acquired in S904. Next, the skeleton selection unit 214 selects a skeleton having a skeleton feature vector with the largest distance from the skeleton feature vector of the previously selected skeleton. Furthermore, the skeleton selection unit 214 selects a skeleton having the largest value in the average of the distances from the skeleton feature vectors of the respective already selected skeletons. This selection is performed repeatedly until the number of selected skeletons reaches the specified number of posters to be created. As a result, a combination of skeletons having different features is selected from the skeleton group acquired in S904. Note that the method of selecting skeletons is not limited to this. For example, skeletons may be selected by repeatedly performing the process of randomly obtaining as many skeletons as the number of skeletons to be created from the skeleton group obtained in S904, and then randomly obtaining skeletons again when the distance between each skeleton feature vector is equal to or less than a threshold value. Any process may be used as long as it can select a combination of skeletons with "skeleton variations".

Thus, the skeleton selection process in S905 shown in FIG. 22 is completed.

In the example described above, the skeletons are selected based on the skeleton feature vector representing the features of the skeletons, but the method of selecting the skeletons is not limited to this. For example, fixed characters or images may be applied to skeletons and may be rendered into images, and further the similarity between skeletons may be calculated by performing pattern matching between images using machine learning, and the resultant similarity may be used for the skeleton selection. In this case, by using the degree of similarity between skeletons instead of the distance between skeleton feature vectors, it is possible to select a combination of skeletons with different skeleton features.

In a case where there is a poster that has come into a selected state before the skeleton selection process in S905 as in the example described above, the skeleton associated with this poster may be excluded from the selection candidates, and then the skeleton selection process may be performed. This makes it possible to create a poster with a layout different from the specified poster.

In S906, the color scheme pattern selection unit 215 selects a color scheme pattern that matches the secondary target impression set in S1909. In the present embodiment, a color scheme pattern is selected by a method similar to that in S906. In a case where there is a poster that has come into a selected state before the color scheme pattern selection process in S906 as in the example described above, the color scheme pattern associated with this poster may be excluded from the selection candidates, and then the color scheme pattern selection process may be performed. This makes it possible to create a poster with a color scheme pattern different from the specified poster.

In S907, the font selection unit 216 selects a font that matches the secondary target impression selected in S1909. In the present embodiment, a font is selected by a method similar to that in S907. In a case where there is a poster that has come into a selected state before the font selection process in S907 as in the example described above, the font associated with this poster may be excluded from the selection candidates, and then the font selection process may be performed. This makes it possible to create a poster with a font different from the specified poster.

S908 and S909 in the secondary poster creation process are the same as S908 and S909 in the primary poster creation process, and therefore a duplicate description thereof is omitted.

In S910, the poster selection unit 219 selects a poster to be presented to the user based on the poster data and the estimated impression acquired from the impression estimation unit 218. In the present embodiment, posters are selected in ascending order of the distance between the target impression and the estimated impression of the poster.

Thus, the poster creation process in S1910 shown in FIG. 9 is completed. Referring again to FIG. 19, the following processing is described.

In S1911, the poster display unit 205 renders all the created secondary posters and the primary posters selected on the primary poster preview screen 601 and outputs the resultant poster images to the display 105. More specifically, in the present example, the secondary preview screen 1801 shown in FIG. 18 is displayed. Here, the selection of the poster image having the target skeleton intended by the user is accepted from the one or more displayed poster images having the target impression intended by the user. Further, an instruction to print the poster image selected by pressing a print button 1804 is accepted.

The above is a description of the flow of the poster creation process including creating posters based on a plurality of impressions and presenting them to the user, and then creating posters that express impressions similar to the impression of a poster selected by the user and have skeleton variations.

As described above, according to the present embodiment, it is possible to provide a wide variety of poster candidates that express the impression intended by the user. More specifically, in the present embodiment, a plurality of poster candidates that hold the target impression can be created and provided to the user. As a result, poster candidates expressing various impressions can be provided, and thus even when the target impression intended by the user is ambiguous, the target impression can be clarified. Furthermore, based on the poster selected by the user, it is possible to create a plurality of poster candidates having a plurality of different skeletons and having impressions similar to the impression expressed by the selected poster, and it is possible to provide the created poster candidates. The elements that make up a poster, such as color schemes and fonts, vary depending on the target impression. Therefore, if after the impression intended by the user is determined, the combination of constituent elements is determined based on the intended impression, it is possible to more effectively provide the poster the user wants.

In the present embodiment, only one poster image can be selected on the primary poster preview screen 601, but a plurality of poster images may be selected. In this case, in S1909, the target impression setting unit 220 acquires a plurality of estimated impressions from the poster specification unit 221 and sets a new target impression based on the plurality of estimated impressions. More specifically, the average of a plurality of estimated impressions is calculated and set as a new target impression. As a result, when there are a plurality of impressions desired by the user, it is possible to create a poster that expresses an intermediate impression between the plurality of impressions. Alternatively, the target impression setting unit 220 may directly set the plurality of acquired estimated impressions as the plurality of target impressions. In this case, the secondary poster creation process in S1910 may be performed for each of the plurality of set target impressions, and all the obtained posters may be displayed in S1911. If all the posters obtained in S1910 are displayed, the number of posters displayed may exceed the number of posters specified to be created on the application start screen 501. Therefore, in S1911, the poster display unit 205 may select as many posters to be displayed as the number of posters specified to be created. The selection may be made by randomly selecting posters, or by selecting posters such that the number of selected posters is as equal as possible among the target impressions, or the like.

Modifications of First Embodiment

In the first embodiment, a plurality of poster candidates having a plurality of different impressions are created based on the impression expressed by a selected poster. However, an additional processing step may be provided to refine the impression intended by the user based on the impression expressed by the selected poster. More specifically, a plurality of target impressions similar to the impression expressed by the selected poster are set, and a poster having each target impression is created again.

Examples of Display Screens

Figure 23:
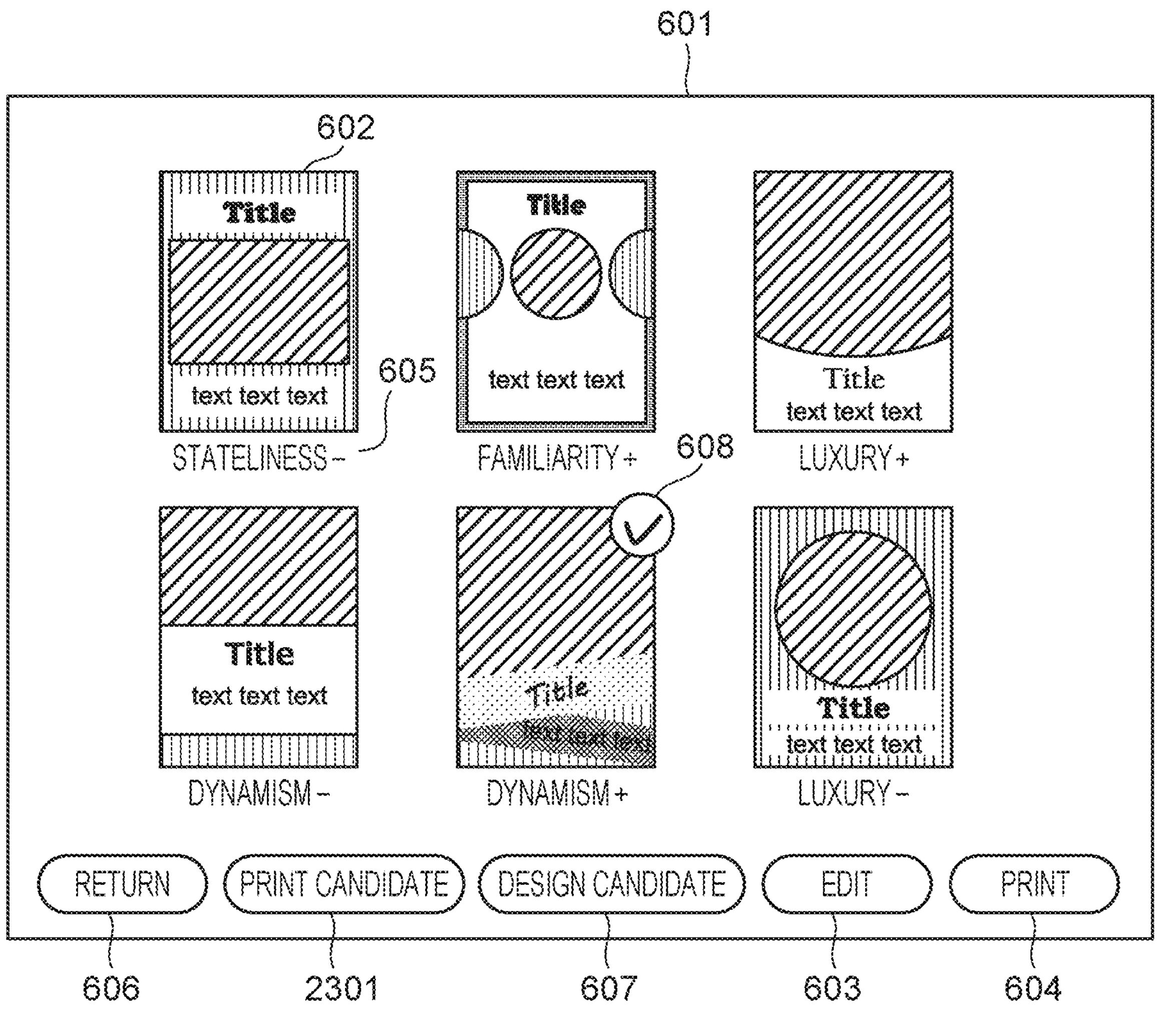
FIG. 23 is a diagram illustrating a display screen provided by a poster creation application.

FIG. 23 is a diagram showing an example of a primary poster preview screen according to the present modification. The elements denoted by the same reference numbers as those shown in FIG. 6 are similar to those described above according to the first embodiment, and therefore a duplicate description thereof is omitted.

When the user presses an impression candidate button 2301, a poster image, an impression label, and a check mark on the primary poster preview screen 601 disappear. After the poster creation unit 210 creates a poster again, the created poster and an impression label corresponding to the poster are displayed on the primary poster preview screen 601. Like the design candidate button 607, the impression candidate button 2301 is enabled only when there is a poster in the selected state.

Processing Flow

Figure 24:
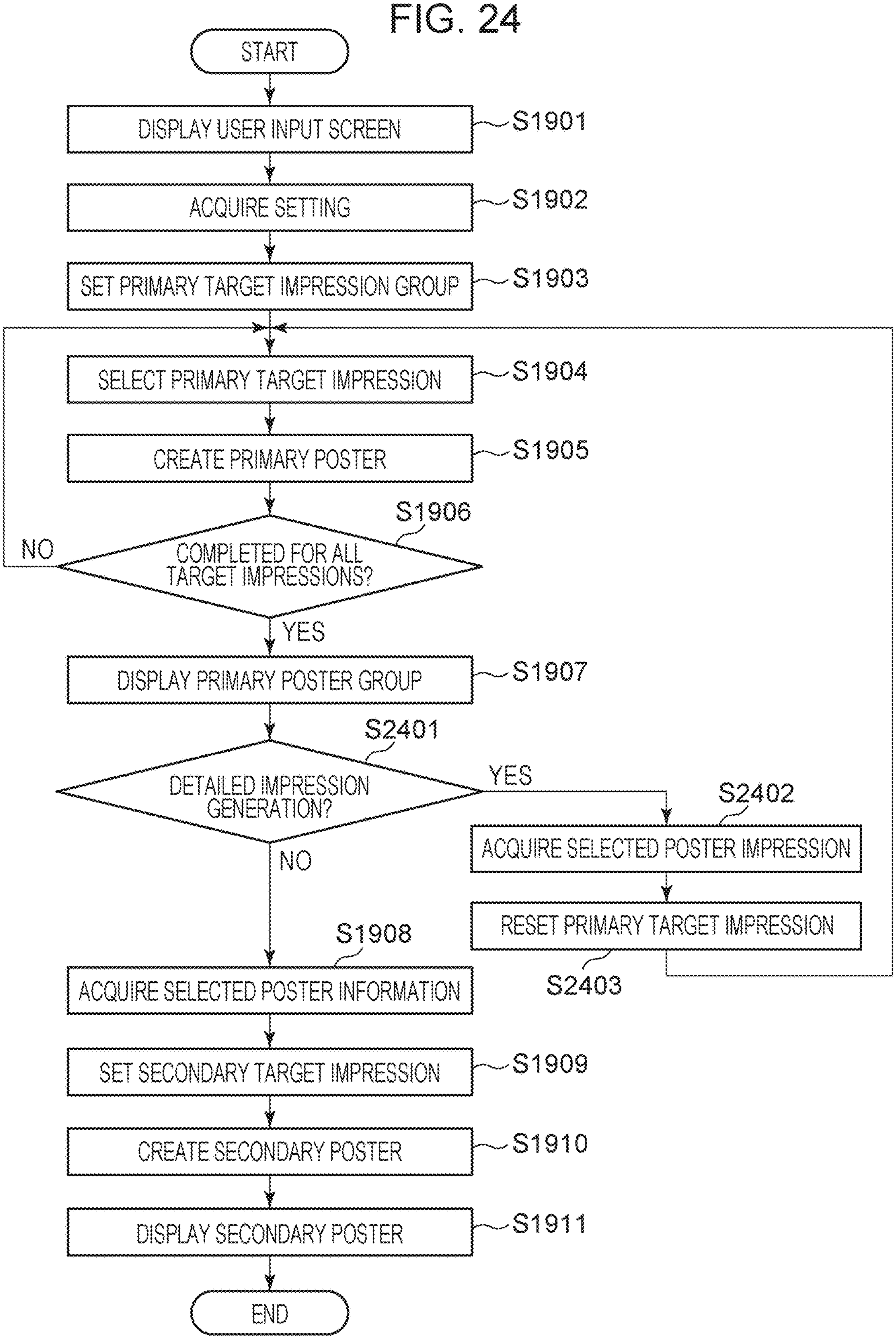
FIG. 24 is a flowchart illustrating a poster creation process.

FIG. 24 is a flowchart illustrating a poster creation process performed by the poster creation application according to the present example. The processes assigned the same processing step numbers as those in FIG. 19 perform the same processing as the processing according to the first embodiment described above, and therefore a further duplicate description thereof is omitted.

In S2401, the poster specification unit 221 determines whether the impression candidate button 2301 or the design candidate button 607 is pressed on the primary poster preview screen 601. In a case where the poster specification unit 221 determines that the impression candidate button 2301 is pressed, the process proceeds to S2402, but in a case where it determined that the design candidate button 607 is pressed, the process proceeds to S1908.

In S2402, the poster specification unit 221 outputs, to the poster selection unit 219, information identifying a poster that is in the selected state when the impression candidate button 2301 is pressed on the primary poster preview screen 601. In response, the poster selection unit 219 acquires an estimated impression associated with the selected poster. More specifically, the poster selection unit 219 acquires an estimated impression calculated by the impression estimation unit 218 for this poster.

In S2403, the target impression setting unit 220 sets a new primary target impression group based on the estimated impression of the selected poster acquired in S2402. The processing flow then returns to S1904 to again perform the processes from S1904 to S1907. In the present modification, the target impression setting unit 220 acquires impressions whose distance from the estimated impression of the selected poster is equal to or less than a threshold value from the target impressions included in a target impression table, and again sets the acquired target impressions as the primary target impression group. Note that the method of setting the primary target impression is not limited to this. For example, the primary target impression may be reset by adding a value within a specific range to the estimated impression of the selected poster. More specifically, a value within a range from −1 to +1 is randomly added to each of luxury, familiarity, dynamism, and stateliness that constitute the target impression. Any method may be used as long as it is possible to generate a target impression similar to the estimated impression of the selected poster.

As described above, according to the present example, it is possible to create poster candidates that express impressions similar to that expressed by the poster selected by the user. This makes it possible for the user to further refine the impression intended by the user.

In a case where the user does not find a desired poster in the primary poster group, the user may recreate the primary posters based on a different primary target impression group. More specifically, when a recreation button (not shown) is pressed on the primary poster preview screen 601, the target impression setting unit 220 resets the primary target impression group to a primary target impression group different from the current primary target impression group, and again creates the posters. As a result, when there is no poster that has a desired impression in the poster images 602, the posters can be replaced with posters that have different impressions.

Second Embodiment

In the first embodiment, by way of example, a plurality of target impressions are automatically set, and posters representing the respective target impressions are created. A second embodiment, described below, discloses an example in which a poster expressing the impression intended by the user is created more efficiently by accepting the specification of a target impression from the user. More specifically, a plurality of target impressions similar to the target impression specified by the user (hereinafter also referred to as the "user-specified target impression") are automatically set, and a poster expressing each target impression is created and proposed. Thereafter, in a similar manner to the process described in the first embodiment, a plurality of variations of poster candidates having similar impressions to the impression expressed by the poster selected by the user are created and presented to the user. This makes it possible to more clearly grasp the impression intended by the user and provide poster candidates with a wide range of variations.

Figure 25:
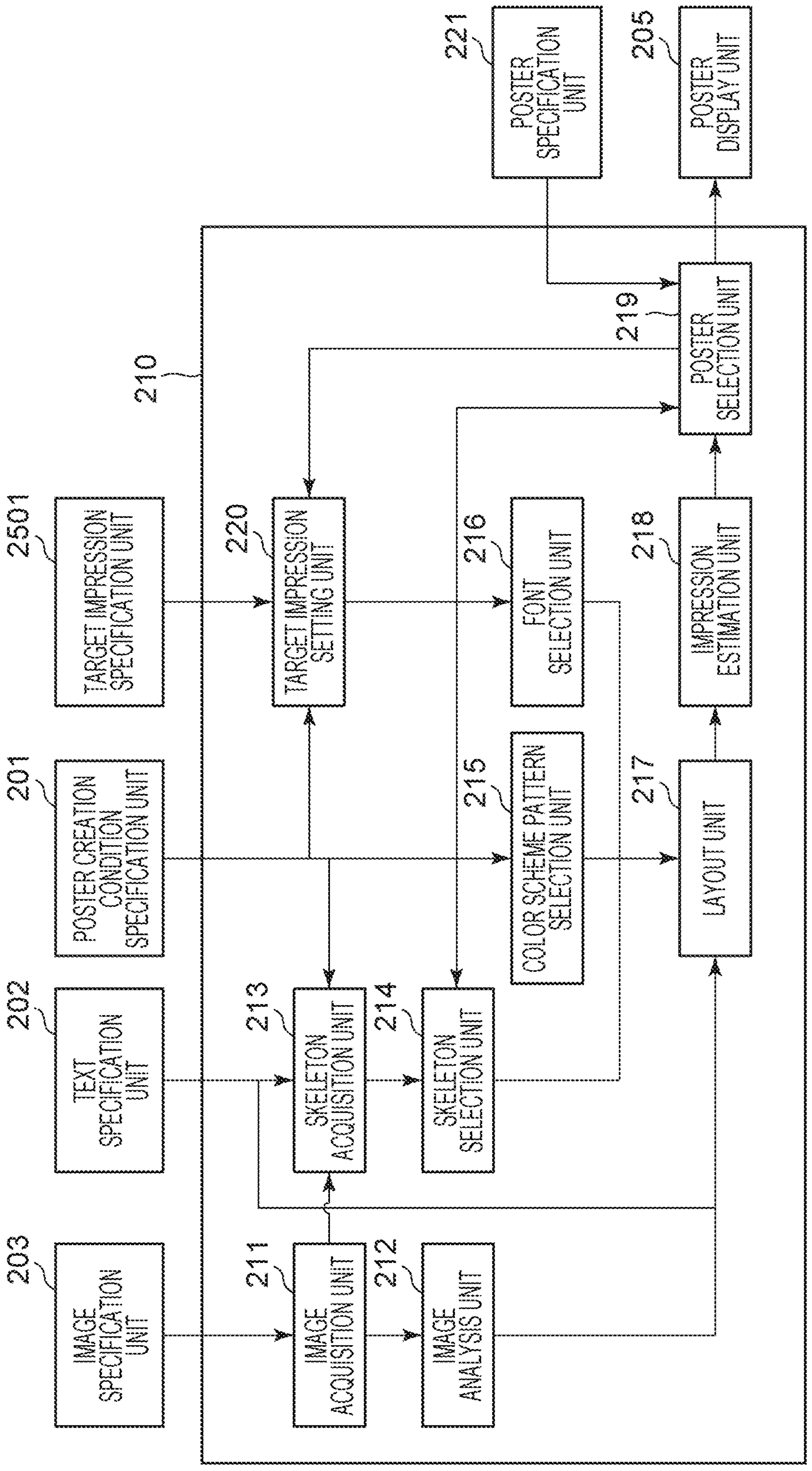
FIG. 25 is a software block diagram of a poster creation application.

FIG. 25 is a software block diagram of a poster creation application according to the second embodiment. The constituent elements assigned the same reference numerals as those in FIG. 2 perform processes similar to those according to the first embodiment described above, and therefore a duplicate description thereof is only different.

A target impression specification unit 2501 specifies a target impression of a poster to be created. In the present embodiment, a degree of strength to be expressed on a word expressing an impression is specified by performing a UI operation using the pointing device 107.

The target impression setting unit 220 sets the target impression of the poster to be created based on the target impression specified by the target impression specification unit 2501.

Examples of Display Screens

Figure 26:
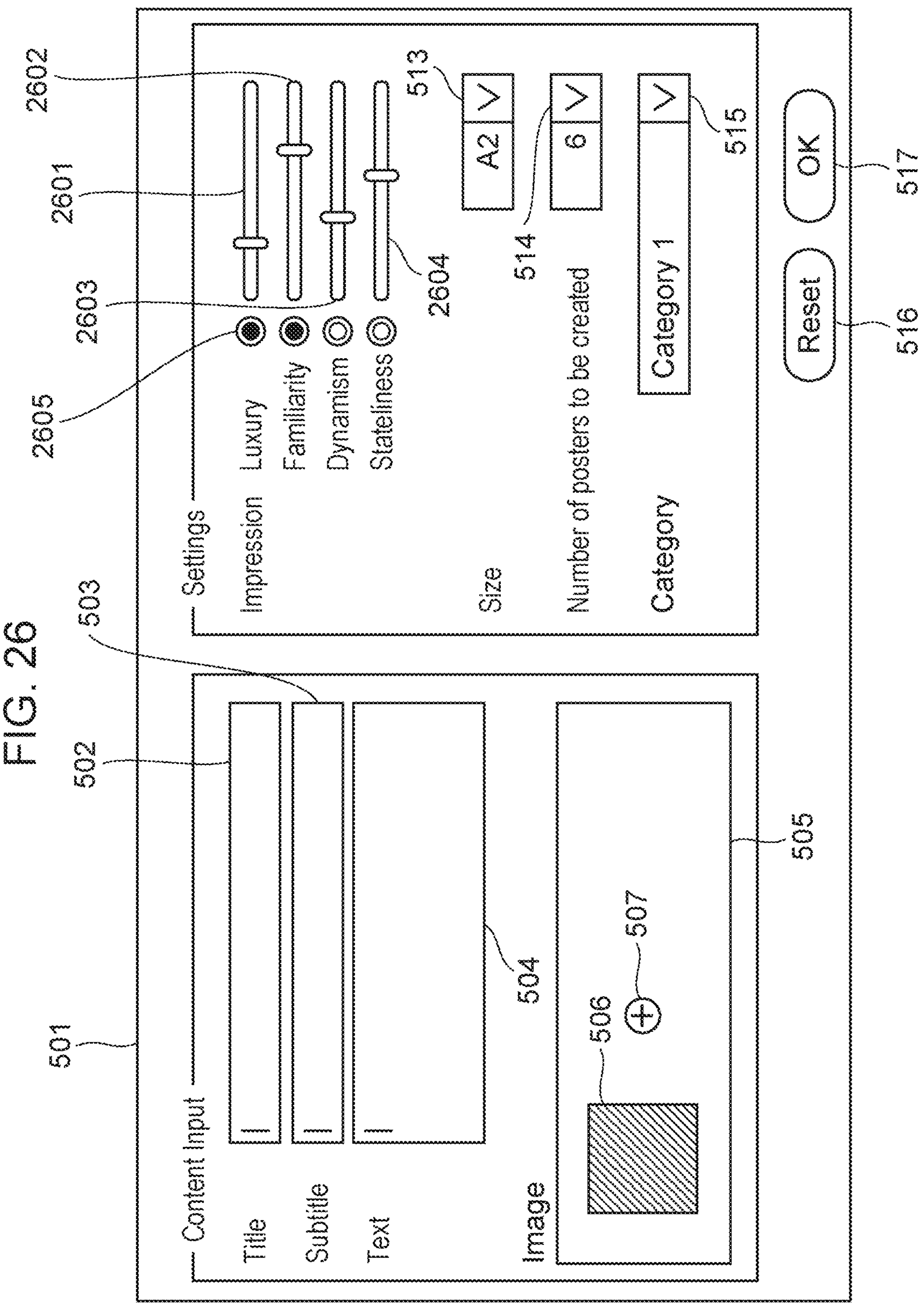
FIG. 26 is a diagram illustrating a display screen provided by a poster creation application.

FIG. 26 is a diagram showing an example of an application start screen 501 according to the present embodiment. The elements assigned the same reference numerals as those in FIG. 5 are similar in function to the elements in the first embodiment described above, and therefore only different elements are described below.

Impression sliders (slider bars) 2601 to 2604 are objects for setting the factors of the target impression of the poster to be created, and are set by the user's operation on the screen of the poster creation application. For example, the impression slider 2601 is used to set the target impression in terms of luxury. As the slider is moved to the right, the target impression in terms of luxury of the poster increases, and as the slider is moved to the left, the target impression of the poster in terms of luxury decreases (becomes cheap). By combining the factors of the target impression set by the respective sliders, not only the factor of the target impression set by one slider, but also the factors of the target impression set by the other sliders are reflected in the target impression. In a case where the user performs a user operation to set the impression slider 2601 to the right of the center of the slider and the impression slider 2604 to the left of the center of the slider, a poster with an impression of high luxury and low stateliness, that is, with an elegant impression is created. In a case where the user performs a user operation to set the impression slider 2601 to the right of the center of the slider and the impression slider 2604 to the right of the center of the slider, a poster with an impression of high luxury and high stateliness, that is, a poster with a gorgeous impression is created. As described above, by combining the target impression factors indicated by a plurality of impression sliders, even if a target impression factor such as "luxury" is set in common, it is possible to combine with it various target impression factors such as "elegant" and/or "gorgeous". That is, the target impression determined by a plurality of factors indicating impressions, but may be determined by one factor indicating an impression. In the present embodiment, it is assumed that when the slider is set to the leftmost position, the impression has a value of −2, and when it is set to the rightmost position, the impression has a value of +2, and the value is corrected to an integer value in the range from −2 to +2. The values correspond to impressions such that −2 corresponds to "low", −1 to "rather low", 0 to "neutral", +1 to "rather high", and +2 to "high". It should be noted that the reason why the values are corrected to integer values in the range from −2 to +2 is to match the scale of the estimated impression described below thereby facilitating the distance calculation. The correction is not limited to the above manner. For example, the values may be standardized to values between 0 to 1.

Radio buttons 2605 control enabling and disabling of the setting of respective corresponding target impressions. The user can set whether to enable or disable the setting of each target impression by pressing the corresponding radio button 2605. For example, when the radio button 512 is set to be disabled, the control of the corresponding impression is not performed. For example, when a user wants to create a calm poster with low dynamism but does not care about any other impressions, he/she can turn off the radio buttons 2605 except for the radio button for the dynamism to create a poster with an impression of low dynamism. In the example shown in FIG. 26, luxury and familiarity are set to be enabled, and dynamism and stateliness are set to be disabled. Thus, it is allowed to control all target impressions or a part of the target impressions to be used in the poster creation. That is, it is possible to flexibly control the target impressions in the poster creation. Note that when each slider is set to the leftmost position, the target impression is set to the same value as when the target impression is disabled (for example, when the slider 2601 is set to the leftmost position, the impression of luxury is set to 0), the radio button 2605 may be removed. In this case, the user can disable the setting of each target impression by setting the corresponding slider to the leftmost position.

When the user presses an OK button 517, the target impression specification unit 2501 outputs the contents of the settings made on the application start screen 501 to the poster creation unit 210. In the process, the target impression specification unit 2501 acquires the target impression for the poster to be created based on the settings of the impression sliders 2601 to 2604 and the radio buttons 2605. Note that the target impression specification unit 2501 may modify the values set on the application start screen 501. For example, the target impression specification unit 2501 may shape the values specified by the impression sliders 2601 to 2604. In the present embodiment, it is assumed that when the slider is set to the leftmost position, the impression has a value of −2, and when it is set to the rightmost position, the impression has a value of +2, and the value is shaped to an integer value in the range from −2 to +2. The shaped values correspond to impressions such that −2 corresponds to "low", −1 to "rather low", 0 to "neutral", +1 to "rather high", and +2 to "high". It should be noted that the reason why the values are shaped to −2 to +2 is to match the scale of the estimated impression thereby facilitating the distance calculation. The shaping is not limited to the above. For example, the values may be normalized to 0 to 1.

Processing Flow

The poster creation process performed by the poster creation application according to the present embodiment can be illustrated by a flowchart similar to the flowchart shown in FIG. 19. However, there are some differences, as described below.

In S1902, the target impression specification unit 2501 acquires information on the user-specified impression specified on the application start screen 501.

Figure 27:
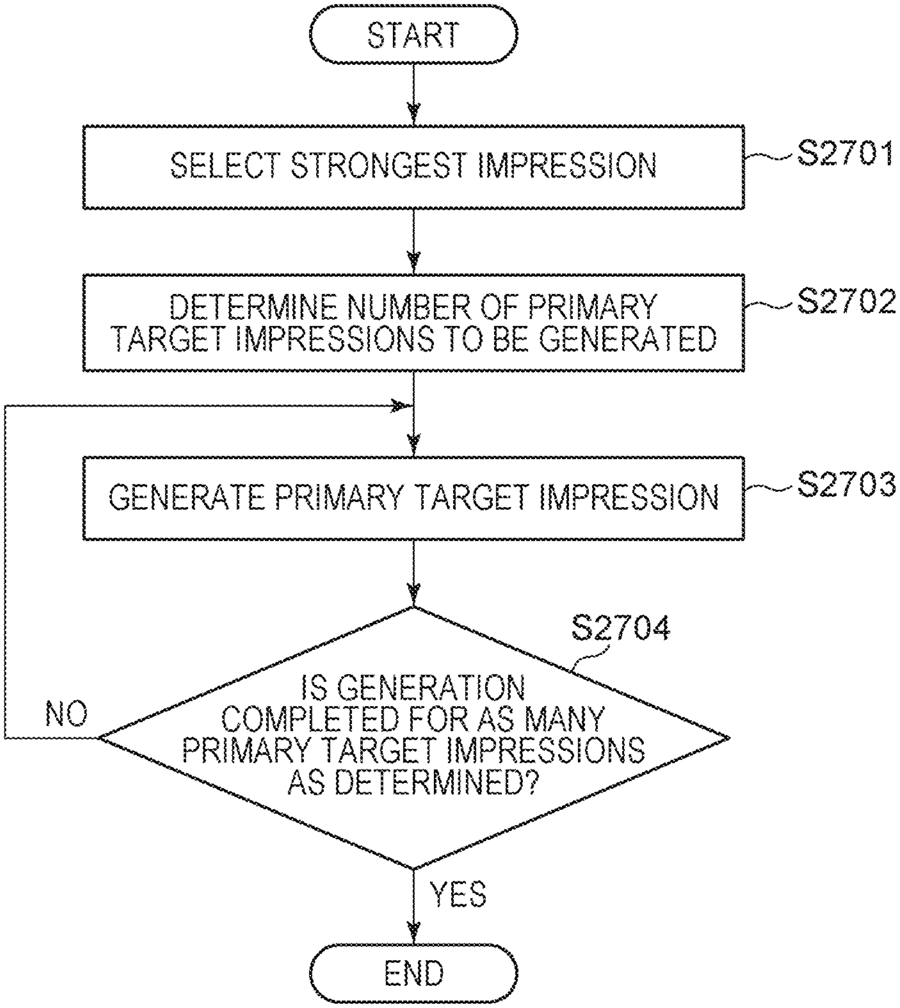
FIG. 27 is a flowchart illustrating a target impression setting process.

In S1903, the target impression setting unit 220 sets a plurality of target impressions similar to the target impression acquired in S1902 as a primary target impression group. FIG. 27 is a flowchart illustrating in detail the process of setting the primary target impression group according to the present embodiment.

In S2701, the target impression setting unit 220 selects the strongest impression among the impressions specified by the user. More specifically, the impression with the largest absolute value is selected. For example, if the user specifies the target impression such that +0.8 is for luxury, +1.1 for familiarity, −0.1 for dynamism, −0.7 for stateliness, then familiarity is selected because it has the largest absolute value. This makes it possible to select an impression that the user intends to express more strongly than other impressions.

In S2702, the target impression setting unit 220 acquires the number of posters to be created from the poster creation condition specification unit 201, and sets this acquired value to the number of primary target impressions to be generated.

In S2703, the target impression setting unit 220 processes the user-specified target impression to generate primary target impressions close to the user-specified target impression. In the present embodiment, a value within the range of −1 to +1 is randomly added to each impression other than that selected in S2701. For example, suppose that the target impression is specified by the user such that luxury is +0.8, familiarity is +1.1, dynamism is −0.1, and stateliness is −0.7. For example, the target impression setting unit 220 adds +0.2, −0.5, and −0.1, which are obtained randomly within the range from −1 to +1, to the respective impressions of luxury, dynamism, and stateliness, which are impressions other than familiarity selected in S2701. As a result, primary target impressions are generated such that luxury is +1.0, familiarity is +1.1, dynamism is −0.6, and stateliness is −0.8. In a case where the impression with the largest absolute value among the generated primary target impressions is different from the impression selected in S2701, the process in S2703 may be repeated. Note that the method of setting the primary target impression is not limited to the above. For example, target impressions whose distance from the user-specified target impression is equal to or less than 1 may be randomly generated. Any method may be used as long as it is possible to generate target impressions similar to the user-specified target impression.

In S2704, the target impression setting unit 220 determines whether or not as many primary target impressions as determined in S2702 has been generated. In a case where it is determined that as many primary target impressions as determined in S2702 have been generated, the process of setting the primary target impression in FIG. 27 is ended. However, in a case where it is determined that as many primary target impressions as determined in S2702 have not been generated, the processing flow returns to S2703 to repeat the process.

As described above, according to the present embodiment, it is possible to create poster candidates that express impressions similar to that expressed by the poster specified by the user. This makes it possible for the user to further refine the impression intended by the user.

Modifications of Second Embodiment

In the second embodiment described above, the target impression is set using the impression setting sliders 2601 to 2604 on the application start screen 501, but the method for setting the target impression is not limited to this.

Referring to FIGS. 16A to 16D, examples of UIs for setting a target impression are described. FIG. 16A illustrates an example of setting a target impression with a UI on a radar chart. By operating a handle 1601 on the radar chart in FIG. 16A, the target impression can be set along each axis. The target impression specification unit 204 acquires a target impression, for example, such that −2 is obtained when the handle 1601 is at the center of the UI, and +2 is obtained when it is at an outermost position. In the example shown in FIG. 16A, the target impressions are specified such that luxury=+0.8, familiarity=+1.1, dynamism=−0.1, and stateliness=−0.7. As in this example, the target impression may be expressed as a decimal fraction. FIG. 16B shows an example of a radar chart in which some target impressions are disabled. For example, if the user double-clicks the handle 1601 with the pointing device 107, the target impression of the axis on which the handle 1601 is located is disabled and hidden. When the user clicks again the axis 1602 of the radar chart with the pointing device 107, the target impression is enabled and is displayed. In the example in FIG. 16B, although dynamism is disabled, the target impression is the same as that in FIG. 16A, except for dynamism.

FIG. 16C shows an example of a UI for setting a target impression based on images instead of words. In a sample poster display area 1603, poster images 1604 to 1607 are arranged that differ greatly from each other with respect to an impression factor. A check box 1608 is displayed for each poster image. If the user turns on a check box 1608 by clicking a poster that is close to a poster the user wants to create by using the pointing device 107, the poster is selected. The target impression specification unit 204 determines the target impression by referring to the impression corresponding to the selected poster image.

FIG. 16D illustrates a table representing impressions corresponding to the poster images 1604 to 1607 shown in FIG. 16C and final target impressions. The luxury, familiarity, dynamism, and stateliness columns describe numerical values that indicate the degree to which the poster image contributes to each impression. For example, assume that poster images 1604 and 1607 are selected as shown in FIG. 16C. In this case, the target impression specification unit 204 determines, as the target impression, an impression obtained as a result of synthesizing the impressions of the poster images 1604 and 1607. In this example, among the factors corresponding to the selected poster images, the value having the maximum absolute value is taken as the value of each factor of the target impression. Although the example described above presents a poster image with a maximum impression value, this is by way of example and not limitation. For example, a poster image may be used in which a plurality of impressions have large values, or a greater number of poster images may be presented than the number of impressions. This allows the user to intuitively specify the target impression based on the actual posters instead of using words.

Third Embodiment

In the first and second embodiments, after determining the target impression intended by the user, candidate posters with variations in the skeleton are created. In a third embodiment, after the user determines a favorite skeleton, poster candidates with a wide range of impressions are created. More specifically, poster candidates with variations in the skeleton are created, and the user selects a favorite poster. Thereafter, using a skeleton having a structure similar to that of the selected poster, poster candidates expressing a plurality of impressions are created. According to the present embodiment, it is easier for a user who wants to decide on a poster design from the point of view of the layout and the amount of information represented by the skeleton rather than from the point of view of the impression, to select the poster that the user intends.

Figure 28:
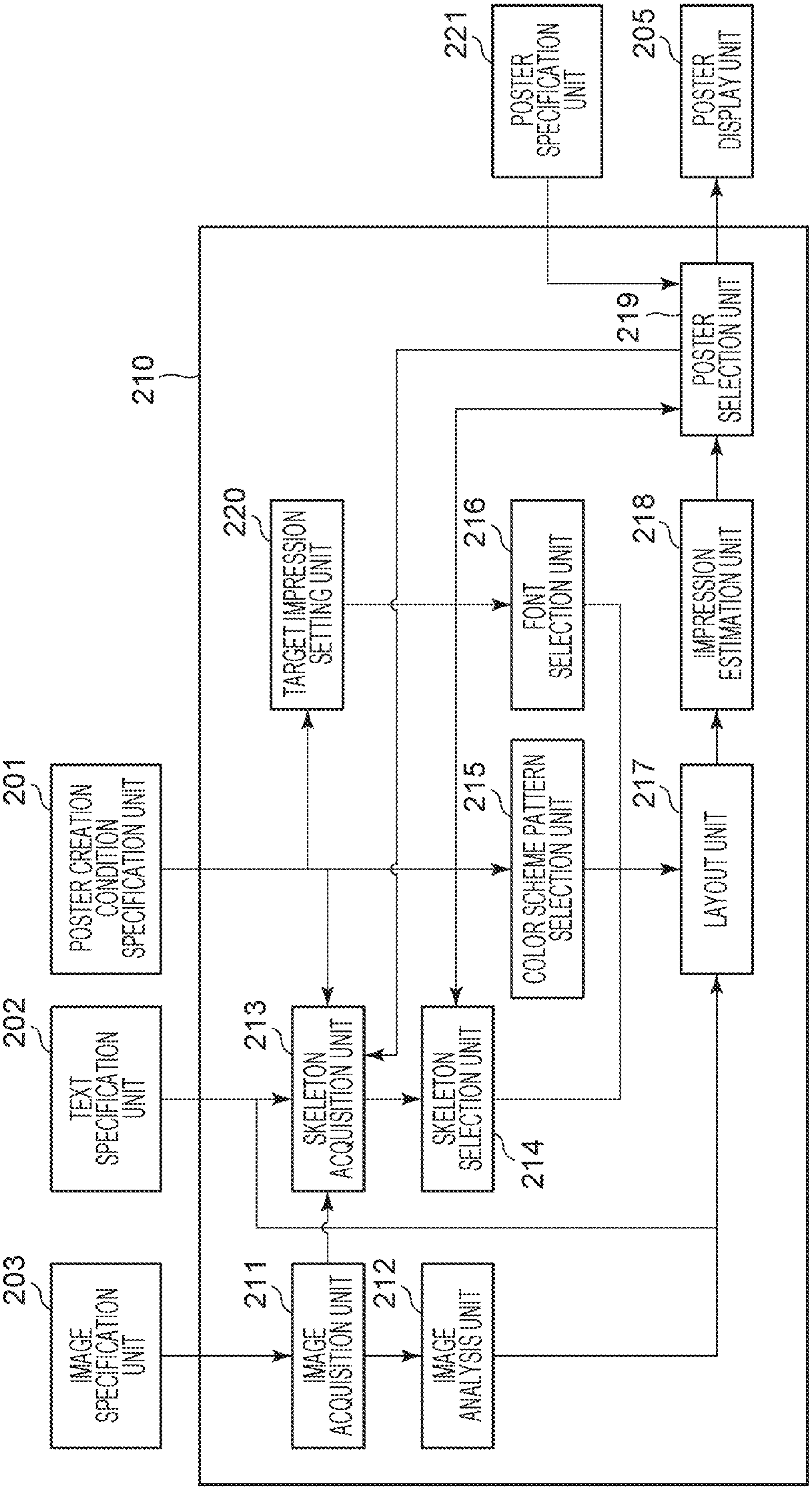
FIG. 28 is a software block diagram of a poster creation application.

FIG. 28 is a software block diagram of a poster creation application according to the second embodiment. The constituent elements assigned the same reference numbers as those in FIG. 2 perform the same processing as the processing according to the first embodiment described above, and therefore a duplicate description thereof is omitted.

The skeleton selection unit 214 acquires, from the poster selection unit 219, the skeleton ID associated with the poster specified by the poster specification unit 221.

Examples of Display Screens

Figure 29:
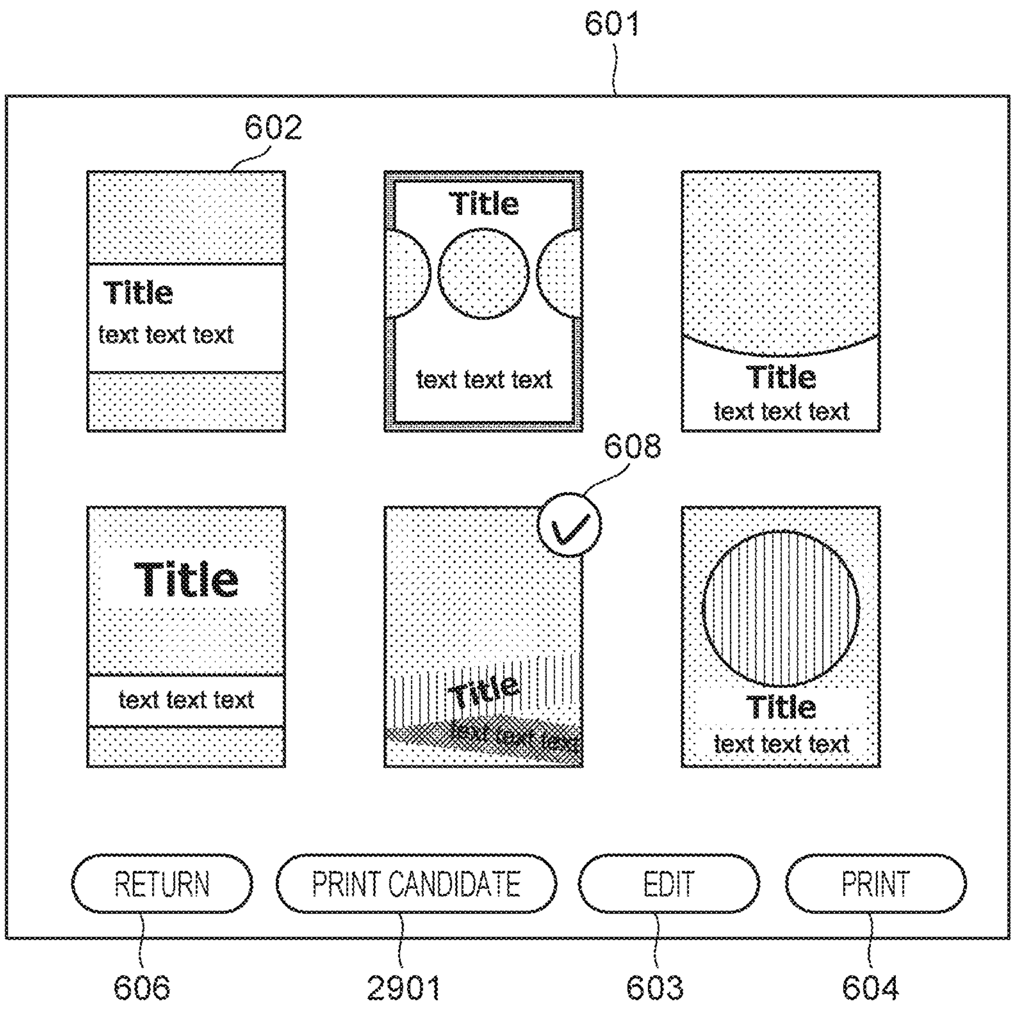
FIG. 29 is a diagram illustrating a display screen provided by a poster creation application.

FIG. 29 is a diagram showing an example of a primary poster preview screen according to the present embodiment. The elements denoted by the same reference numbers as those shown in FIG. 6 are similar to those described above according to the first embodiment, and therefore a duplicate description thereof is omitted.

When an impression candidate button 2901 is pressed by the user, information associated with the poster selected on the primary poster preview screen 601 is output to the poster creation unit 210. As a result, the skeleton acquisition unit 213 acquires the skeleton ID associated with the selected poster Like the edit button 603, the impression candidate button 2901 is enabled only when there is a poster being in the selected state.

Figure 30:
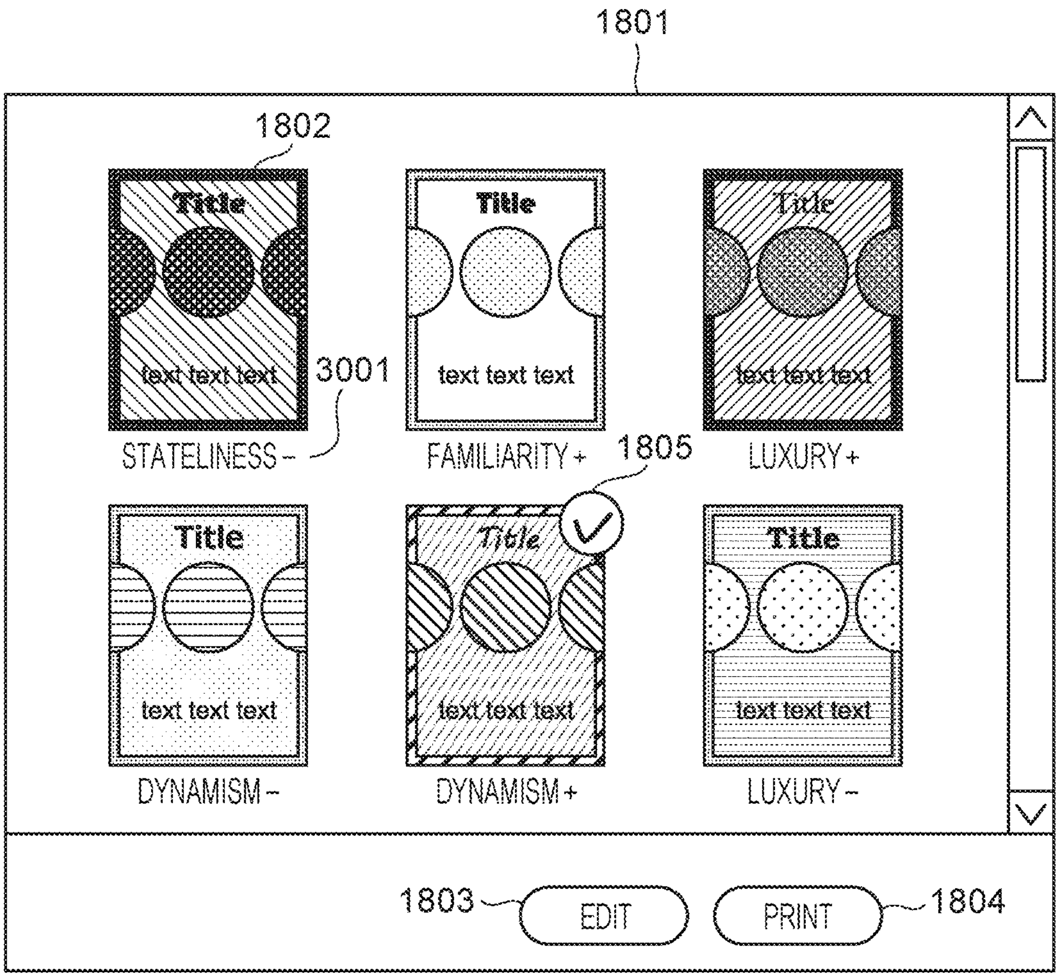
FIG. 30 is a diagram illustrating a display screen provided by a poster creation application.

FIG. 30 is a diagram showing an example of a secondary poster preview screen according to the present embodiment. The elements assigned the same reference numerals as those in FIG. 18 are similar to the elements described in the first embodiment, and therefore a further duplicate description thereof is omitted.

An impression label 3001 is a label that expresses an estimated impression associated with the corresponding poster.

More specifically, the impression label 3001 expresses an estimated impression associated with the poster image 1802. As with the impression label 605 on the primary poster preview screen 601 according to the first embodiment, the form the impression label 3001 is not limited to that used in this example, or it may even be omitted.

Processing Flow

Figure 31:
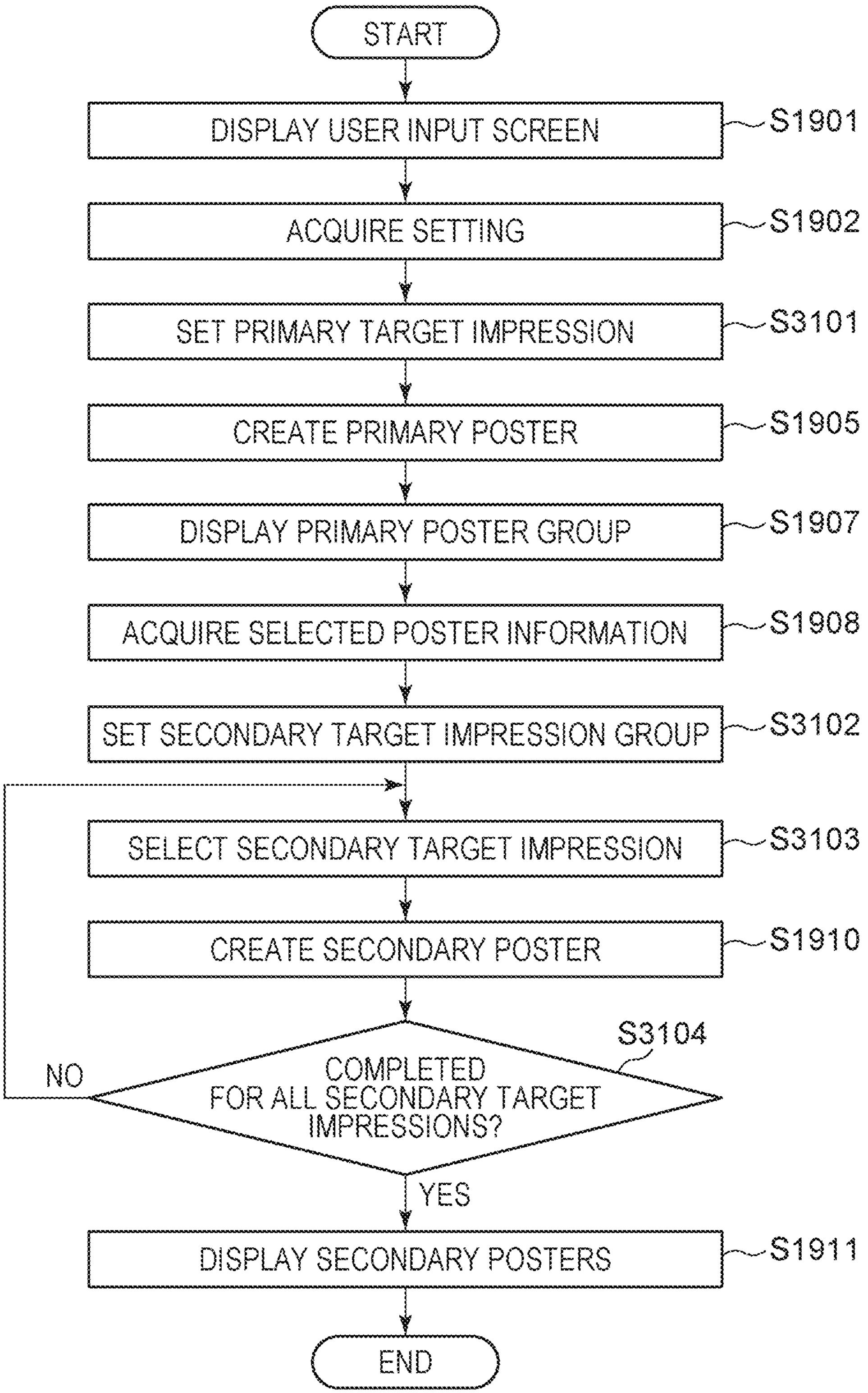
FIG. 31 is a flowchart illustrating a poster creation process.

FIG. 31 is a flowchart illustrating a process performed by the poster creation unit 210 of the poster creation application according to the present embodiment. The processing steps assigned the same step numbers as those in FIG. 19 are similar to the processing according to the first embodiment described above, and therefore only differences are explained below.

In S3101, the target impression setting unit 220 sets one target impression used for the poster creation (hereinafter, in the present embodiment, referred to as the "primary target impression"). In the present embodiment, the primary target impression is set to 0 for all luxury, familiarity, dynamism, and stateliness factors. However, the method of setting the primary target impression is not limited to this. For example, no target impression may be set. This means that the control based on the target impression is not performed. For example, when a color scheme pattern is selected, the selection is not based on the impression.

In S1905, the poster creation unit 210 creates a poster having the primary target impression set in S3101 (hereinafter, in the present embodiment, referred to as the "primary poster"). That is, a poster with a primary target impression set to 0 is created. Referring to FIG. 9 showing the flowchart of the poster creation process in S1905, the steps different from the first embodiment will be described.

In S901, the skeleton selection unit 214, the color scheme pattern selection unit 215, and the font selection unit 216 respectively determine the number of skeletons, the number of color scheme patterns, and the number of fonts, to be selected.

In this example, the number of skeletons is set to the same value as the number of posters to be created, and the number of color scheme patterns and the number of fonts are set according to equation 2 described above.

In S905, the skeleton selection unit 214 selects skeletons having skeleton variations according to the skeleton selection processing flow shown in FIG. 22 described above.

Thus, the poster creation process in S1905 shown in FIG. 9 is completed. Referring again to FIG. 31, the following process is described below.

In S1907, the poster display unit 205 performs rendering on all the created primary posters and outputs poster images to the display 105. More specifically, in the present example, the primary poster preview screen 601 shown in FIG. 29 is displayed.

In S1908, the poster specification unit 221 outputs, to the poster selection unit 219, information identifying a poster that is in the selected state when the impression candidate button 2901 is pressed on the primary poster preview screen 601. The poster selection unit 219 outputs the skeleton ID associated with the selected poster to the skeleton acquisition unit 213.

In S3102, the target impression setting unit 220 sets a plurality of target impressions having impression variations (hereinafter, in the present embodiment, referred to as the "secondary target impression group") as in S1903 in the first embodiment.

In S3103, the target impression setting unit 220 selects one target impression from the secondary target impression group set in S3102.

In S1910, the poster creation unit 210 creates a poster having the secondary target impression set in S3103 (hereinafter, in the present embodiment, referred to as the "secondary poster"). The poster creation process executed in S1910 by the poster creation unit 210 is similar to the poster creation process executed in S1905, the details of which are described above with reference to FIG. 9 except for some differences, and therefore, only the differences are described below.

In S904, the skeleton acquisition unit 213 acquires the skeleton corresponding to the skeleton ID of the selected poster acquired in S1908.

In S905, the skeleton selection unit 214 selects the skeleton acquired in S904.

In S906, the color scheme pattern selection unit 215 selects a color scheme pattern that matches the secondary target impression set in S3103.

In S907, the font selection unit 216 selects a font that matches the secondary target impression set in S3103.

In S910, the poster selection unit 219 selects a poster to be presented to the user based on the poster data and the estimated impression acquired from the impression estimation unit 218. In the present embodiment, the poster selection unit 219 selects one poster that has the smallest distance between the target impression and the estimated impression of the poster.

Thus, the poster creation process in S1910 shown in FIG. 9 is completed, and the process returns to S3104 in FIG. 31.

In S3104, the target impression setting unit 220 determines whether posters corresponding to all target impressions included in the secondary target impression group have been created. In a case where the target impression setting unit 220 determines that posters have been created for all target impressions, the processing flow proceeds to S1911. However in a case it is determined that posters have not been created for all target impressions, the processing flow returns to S3103 to create poster data for unused target impressions.

In S1911, the poster display unit 205 performs rendering on all the created secondary posters and outputs poster images to the display 105. More specifically, in the present example, the secondary preview screen 1801 shown in FIG. 30 is displayed. Here, the selection of the poster image having the target impression intended by the user from the one or more poster images having the target skeleton intended by the user is accepted. Further, an instruction to print the poster image selected by pressing a print button 1804 is accepted.

As described above, according to the present embodiment, poster candidates with a wide variety of skeletons are created, and poster candidates expressing a plurality of impressions can be created using skeletons similar to the skeleton of the poster specified by the user. Different color scheme patterns and fonts give different overall impressions of the poster. Therefore, even with a fixed skeleton, different impressions can be expressed. That is, it is possible to clarify the skeleton with the features the user likes and to provide a poster that expresses the impression intended by the user.

Note that in the present embodiment, in S904 in S1910, only the skeleton same as the skeleton of the poster selected by the user is acquired, but this is merely by way of example and not limitation. For example, a skeleton having a skeleton feature vector whose distance from the skeleton feature vector of the skeleton of the poster selected by the user is equal to or less than a threshold value may be acquired. As a result, poster candidates can be created using a skeleton having features similar to those of the skeleton of the poster selected by the user.

In the present embodiment, in a case where the user does not find a desired poster in a plurality of primary posters, primary posters may be recreated using different skeletons. More specifically, when a recreation button (not shown) on the primary poster preview screen 601 is pressed, the skeleton selection unit 214 selects a skeleton different from the already selected skeleton, and recreates the poster. That is, when the poster images 602 do not include a poster created with a preferred skeleton, the poster images 602 may be updated to include posters created with different skeletons.

Alternatively, as in the modification of the first embodiment, an additional processing step may be provided to refine the impression intended by the user based on the impression expressed by the poster selected on the secondary poster preview screen 1801. More specifically, as in the modification of the first embodiment, a plurality of target impressions similar to the impression expressed by the selected poster are set, and posters are created again such that they have the respective target impressions. This makes it possible for the user to further refine the impression intended by the user.

In the present embodiment, only one poster can be selected on the primary poster preview screen 601, but a plurality of posters may be selected. In this case, in S905 of S1910, the skeleton selection unit 214 selects skeletons based on a plurality of skeleton feature vectors. More specifically, the average vector of a plurality of skeleton feature vectors is calculated, and a skeleton having the skeleton feature vector with the smallest distance from the average vector is selected. As a result, when there are a plurality of skeleton features desired by the user, it is possible to create a poster that expresses a feature of an intermediate skeleton of the plurality of skeletons. Alternatively, the skeleton selection unit 214 may directly select the acquired skeletons. In this case, the secondary poster creation process in S1910 may be performed for each of the plurality of selected skeletons, and all the obtained posters may be displayed in S1911. If all the posters obtained in S1910 are displayed, the number of posters displayed may exceed the number of posters specified to be created on the application start screen 501. Therefore, in S1911, the poster display unit 205 may select as many posters to be displayed as the number of posters specified to be created. The selection may be made by randomly selecting posters, or by selecting posters such that the number of selected posters is as equal as possible among the skeletons, or the like.

Further, an additional mechanism for accepting specifying of a target impression from the user as described in the second embodiment may be provided, and the specified target impression may be set as the primary target impression.

Modifications of Third Embodiment

In the third embodiment, poster candidates having a wide variety of skeletons are created, and a skeleton having features that the user likes is determined. However, the user may determine a skeleton on which only the information that the user wants to put for the poster is automatically arranged. More specifically, poster candidates with different skeletons are created, and the user selects a desired poster. Thereafter, using a skeleton having a structure similar to the skeleton associated with the selected poster, poster candidates expressing a plurality of impressions are created.

The effects of this example will be described. In the first embodiment and the second embodiment, the skeleton acquisition unit 213 acquires a skeleton that meets various setting conditions input by the user on the application start screen 501. More specifically, it is determined in S2104 whether the type of the text information specified by the text specification unit 202 exists on the skeleton. For example, assume that character strings are specified in the title box 502 and the main text box 504 on the application start screen 501, and a blank is specified in the subtitle box 503. In this case, a skeleton including both an object with "title" or "body" set as the type of text information of metadata is obtained, but the presence or absence of objects specified as "subtitle" does not matter. As a result, it is possible to acquire more skeleton candidates, including skeletons with "subtitles" and skeletons without "subtitles," such that poster candidates using skeletons more suitable for the target impression can be presented to the user. In contrast, in the present example, a plurality of poster candidates with different skeletons are created, and the user selects a poster with a skeleton the user likes thereby clarifying the combination of information that the user wants to put on the poster. For example, assume that the user selects either one of the skeleton candidate to which "subtitle" is set and the skeleton to which "subtitle" is not set. In this case, poster candidates expressing a plurality of impressions are generated using either one of the skeletons having a structure similar to that of the selected skeleton, As a result, it is possible to create a poster on which only information the user wants is put and which expresses the impression intended by the user.

Examples of Display Screens

Figure 32:
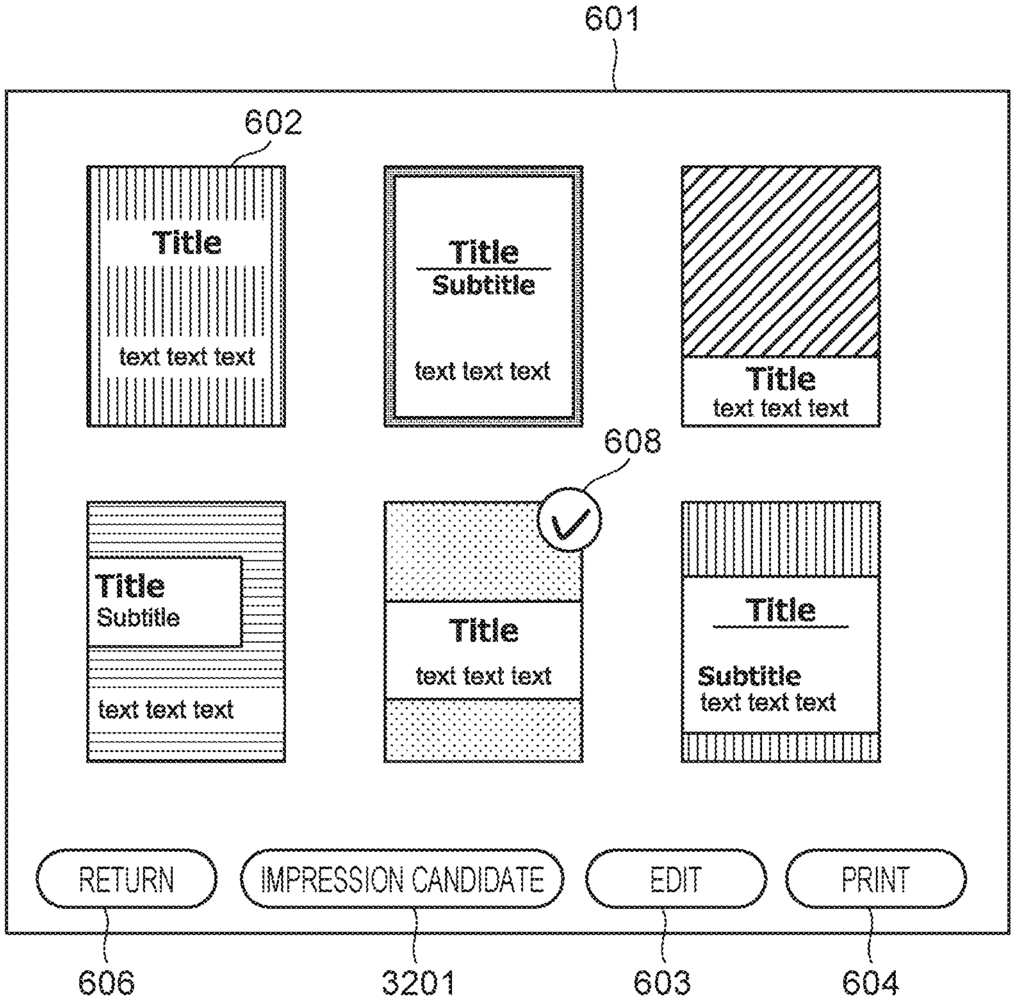
FIG. 32 is a diagram illustrating a display screen provided by a poster creation application.

FIG. 32 is a diagram showing an example of a primary poster preview screen according to the present modification. The elements assigned the same reference numerals as those in FIG. 29 are similar to the elements described in the third embodiment, and therefore a further duplicate description thereof is omitted. In FIG. 32, skeleton candidates including skeletons to which "subtitle" is set and skeleton candidates including skeletons to which "subtitle" is not set are displayed as poster images 602.

In the present embodiment, when an impression candidate button 3201 is operated, poster images are recreated based on skeletons that do not include arrangement information of objects that are not specified by the user.

Figure 33:
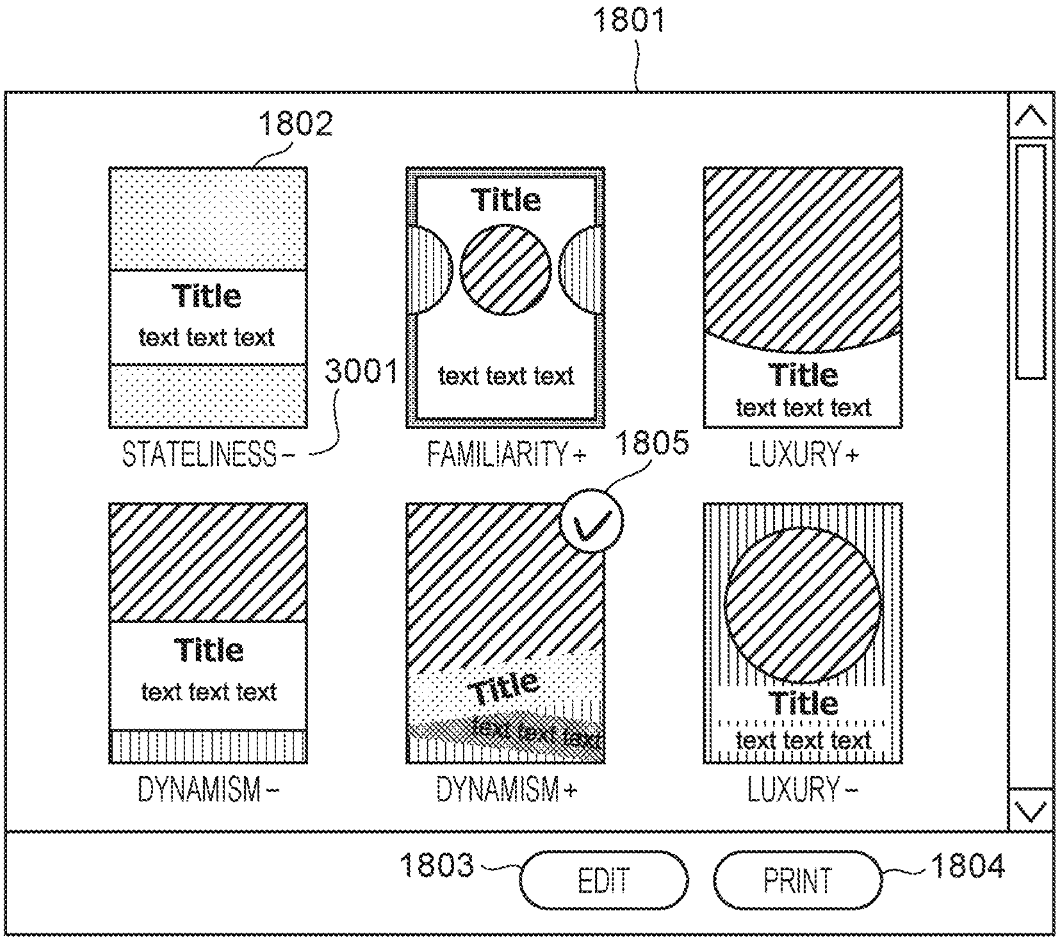
FIG. 33 is a diagram illustrating a display screen provided by a poster creation application.

FIG. 33 is a diagram showing an example of a secondary poster preview screen according to the present modification. The elements assigned the same reference numerals as those in FIG. 30 are similar to the elements described in the third embodiment, and therefore a further duplicate description thereof is omitted. In FIG. 33, only skeleton candidates to which "subtitle" is not set are displayed as poster images 602.

Processing Flow

FIG. 31 is a flowchart illustrating a process performed by the poster creation unit 210 of the poster creation application according to the present modification. The processing steps assigned the same step numbers as those in FIG. 19 are similar to the processing according to the first embodiment described above, and therefore only differences are explained below.

In S1905, the poster creation unit 210 creates a primary poster. Referring to FIG. 9 showing the flowchart of the poster creation process in S1905, the steps different from the first embodiment will be described.

In S905, the skeleton selection unit 214 randomly selects N skeletons from all the skeletons acquired in S904 regardless of the primary target impression set in S901.

The processing flow then returns to S1907 shown in FIG. 31.

In S1907, the poster display unit 205 performs rendering on all the created primary posters and outputs poster images to the display 105. More specifically, the primary poster preview screen 601 shown in FIG. 32 is displayed.

In S1910, the poster creation unit 210 creates a secondary poster. The poster creation process executed in S1910 by the poster creation unit 210 is similar to the poster creation process executed in S1905, the details of which are described above with reference to FIG. 9 except for some differences, and therefore, only the differences are described below.

Figure 34:
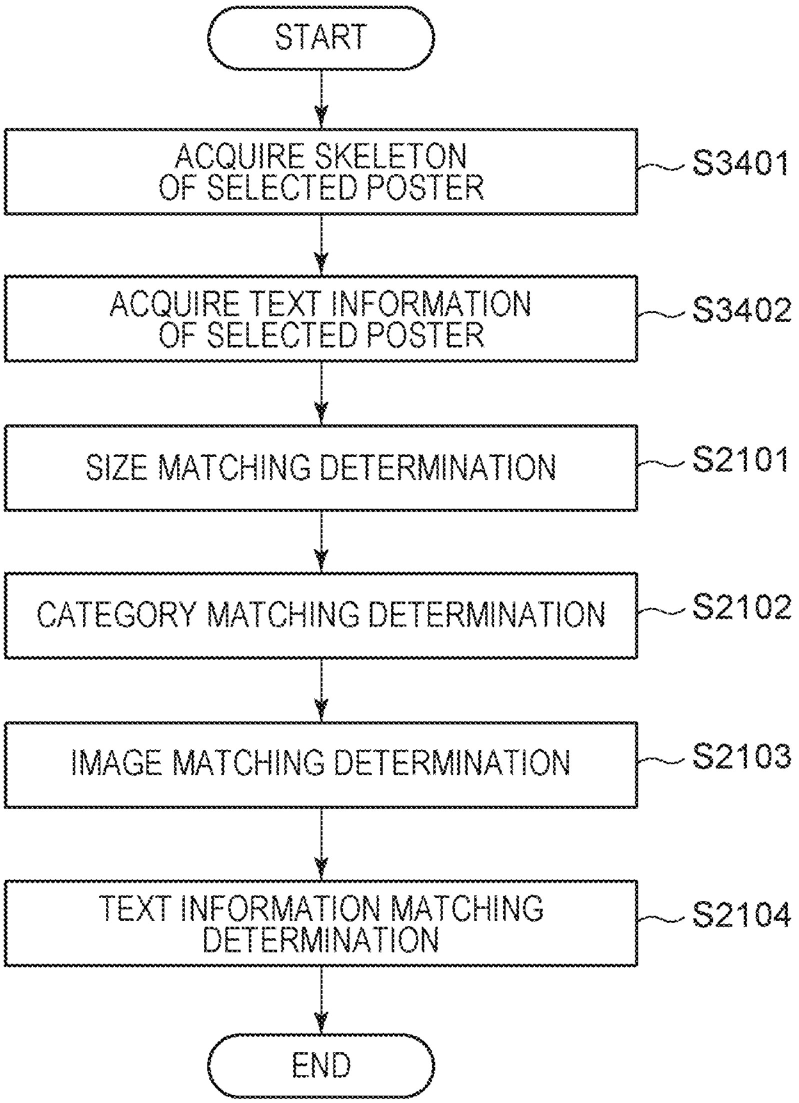
FIG. 34 is a flowchart illustrating a skeleton acquisition process.

In S904, the skeleton acquisition unit 213 acquires skeletons that meet various setting conditions. Referring to FIG. 34, the details of S904 according to the present modification are described below. FIG. 34 is a flowchart illustrating the details of the process in S904. The processing steps assigned the same step numbers as those in FIG. 21 are similar to the processing according to the first embodiment described above, and therefore only differences are explained below.

In S3401, the skeleton acquisition unit 213 acquires the skeleton corresponding to the skeleton ID of the selected poster acquired in S1908.

In S3402, the skeleton acquisition unit 213 acquires the type defined in metadata possessed by each text object for all text objects included in the skeletons acquired in S3401. More specifically, the acquisition is made in terms of a combination of various types of text objects such as "title", "subtitle", and "text" included in each skeleton acquired in S3401.

In S2104, the skeleton acquisition unit 213 determines whether or not the combination of text information acquired in S3402 matches combinations of text information of text objects of skeletons that meet various setting conditions and are stored in the RAM 103. For example, assume that the combination of text information acquired in S3402 includes "title" and "text", and does not include "subtitle". In this case, all text objects in the skeletons are searched, and if a skeleton is found which includes both a text object whose text information type is defined in metadata as "title" and a text object whose type is defined as "text", then it is determined that the skeleton is a match (suitable), but otherwise it is determined that the skeleton is a mismatch (unsuitable). The skeleton acquisition unit 213 then acquires only skeletons that match perfectly in terms of the combination of text information. In the present modification, only skeletons with completely matching combinations of text information are acquired. As a result, posters are created using only skeletons on which only the information that the user wants to place is placed.

Note that in a case where the allowable object types include "map", "barcode", and/or the like, the determination may be performed as to whether there are objects of such types. For example, if the skeleton acquired in S3402 includes a map object, only the skeletons including map objects may be acquired. Alternatively, the determination may be made based on the number of text objects. For example, if the skeleton acquired in S3402 includes four text objects, only the skeletons including four text objects may be acquired.

In a case where no purpose category is set on the application start screen 501, the determination may be made as to the match of the purpose category set in the skeleton. More specifically, only skeletons to which the same purpose category is set as the purpose category set in the metadata of the skeleton acquired in S3402 may be acquired.

Alternatively, the determination may be made based on the similarity of the amount of text information that can be placed on the skeleton. More specifically, the determination may be made based on whether or not the difference in the total text object area is equal to or less than a threshold value. For example, the total text object area of each skeleton may be calculated, and only skeletons with a total text object area whose difference from the total text object area of the skeleton acquired in S3402 is equal to or less than a threshold value may be acquired.

As described above, the skeleton acquisition unit 213 acquires skeletons determined to be suitable by the determination processing in S2104 shown in FIG. 34. Referring again to FIG. 9, the following processing is described below.

In S905, the skeleton selection unit 214 selects a skeleton based on the secondary target impression set in S3103.

Thus, the poster creation process in S1910 shown in FIG. 9 is completed. Referring again to FIG. 19, the following processing is described.

In S1911, the poster display unit 205 performs rendering on all the created secondary posters and outputs poster images to the display 105. More specifically, the secondary preview screen 1801 shown in FIG. 33 is displayed. For example, only skeleton candidates to which "subtitle" is not set are displayed as the poster images 602.

As described above, according to the present modification, it is possible to create poster candidates expressing a plurality of impressions using skeletons on which object information similar to that of the poster specified by the user can be placed. That is, it is possible to clarify the combination of information the user wants to place on a poster and to provide the poster that expresses the impression intended by the user.

In the present modification, the skeleton acquisition unit 213 acquires a skeleton that allows it to place thereon text information similar to the text information of the poster selected in S1910 on the primary poster preview screen 601, but this is by way of example and not limitation. More specifically, only the same skeleton as that of the selected poster may be acquired, and a secondary poster may be created using the acquired skeleton. This makes it possible to provide poster candidates that express different impressions with the same layout as that of the poster selected by the user. In this case, it is possible to express different impressions even with a fixed skeleton by bringing the overall impression of the poster closer to the target impression by means of color schemes and fonts.

In the present modification, only one poster image is allowed to be selected on the primary poster preview screen 601, but a plurality of poster images may be selected. In this case, in S2104, the skeleton acquisition unit 213 acquires a combination of text information possessed by text objects for each of a plurality of skeletons stored in the RAM 103 that satisfy various setting conditions. Thereafter, it is determined whether or not the combination of text information acquired in S3402 matches any of the acquired combinations of text information. Thus, when there are a plurality of combinations of information that the user wants to place, posters can be created using skeletons on which the respective combinations can be placed.

Fourth Embodiment

In the first and second embodiments, after poster candidates with variations of impressions are created and the target impression intended by the user is determined, poster candidates with variations of skeletons are created. In the third embodiment, after poster candidates with variations of skeletons are created and the user determines a skeleton with features that the user likes, poster candidates with variations of impressions are created. In a fourth embodiment described below, based on conditions set by the user, switching is performed as to which of the poster candidates with variations of impressions and poster candidates with variations of skeletons are to be created first. This makes it possible to more efficiently create a poster intended by the user.

The effects of the present embodiment are described below. As the number of types of text information input by the user on the application start screen 501 decreases, the number of skeletons acquired by the skeleton acquisition unit 213 increases, and thus the number of usable skeleton candidates also increases. In this case, by adopting a processing flow in which poster candidates with variations of skeletons are first created, it is possible to create poster candidates that express various impressions after narrowing down the candidates for skeletons to be used, and thus it is possible to efficiently create a poster that reflects the intention of the user. On the other hand, as the number of types of input text information increases, the number of skeletons acquired by the skeleton acquisition unit 213 decreases, and thus it is possible to narrow down the usable skeleton candidates. In this case, by adopting a processing flow in which poster candidates with variations of impression are first created, it is possible to create poster candidates that express various impressions while narrowing down the candidates for skeletons to be used, and thus it is possible to efficiently create a poster that reflects the intention of the user. In the present embodiment, based on conditions set by the user, switching is performed as to which of the poster candidates with variations of impressions and poster candidates with variations of skeletons are to be created first, which makes it possible to more efficiently create a poster intended by the user.

Figure 35:
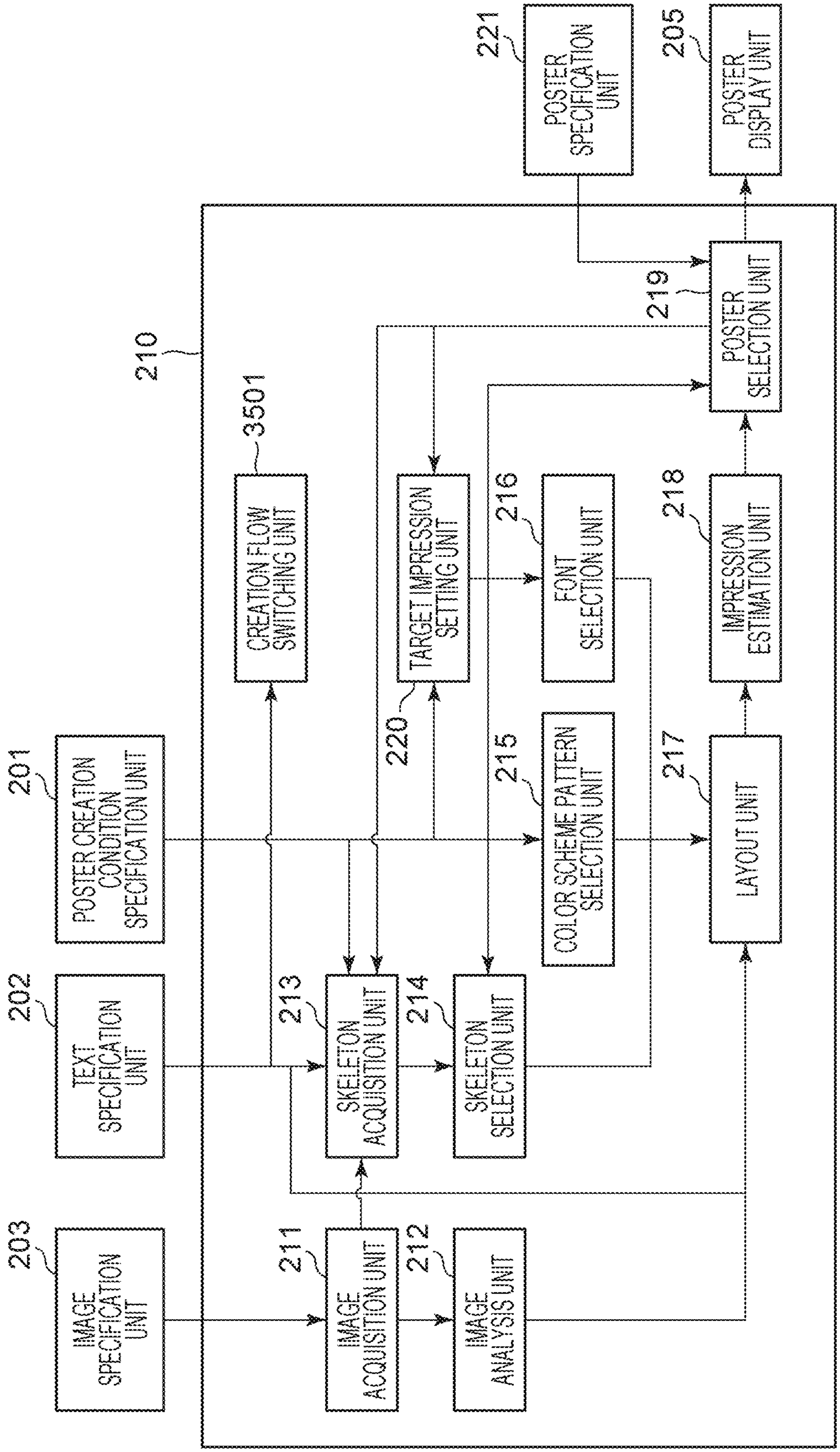
FIG. 35 is a software block diagram of a poster creation application.

FIG. 35 is a software block diagram of a poster creation application according to the fourth embodiment. The constituent elements assigned the same reference numerals as those in FIG. 2 or in FIG. 28 perform processing similar to the processing according to the first embodiment or the third embodiment described above, and therefore a duplicate description thereof is omitted.

A creation flow switching unit 3501 acquires the conditions specified by the text specification unit 202 and switches the poster creation processing flow.

Processing Flow

Figure 36:
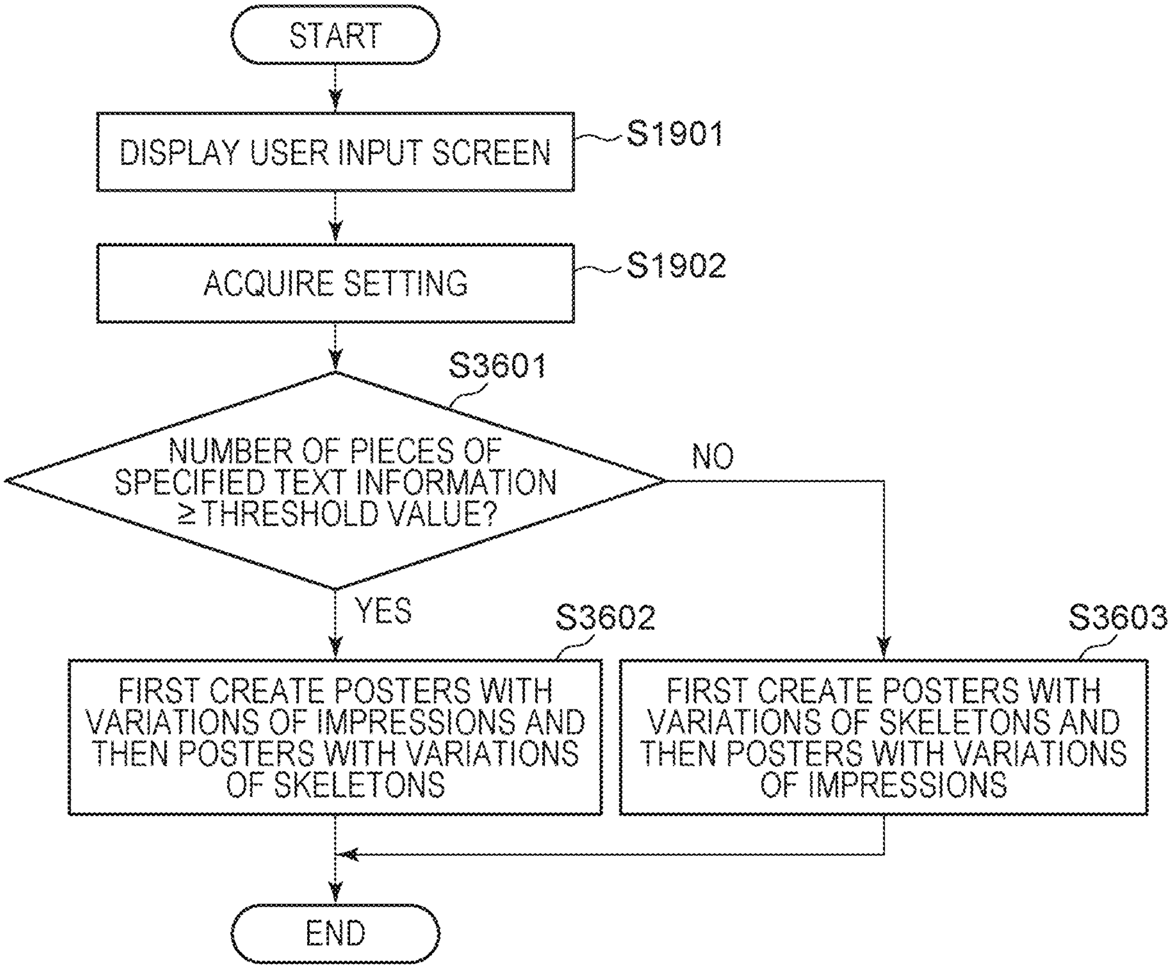
FIG. 36 is a flowchart illustrating a poster creation process.

FIG. 36 is a flowchart illustrating a process performed by the poster creation unit 210 of the poster creation application according to the present embodiment. The processing steps assigned the same step numbers as those in FIG. 19 are similar to the processing according to the first embodiment described above, and therefore only differences are explained below.

In S1902, the creation flow switching unit 3501 acquires the settings from the application start screen 501.

In S3601, the creation flow switching unit 3501 determines whether or not the number of pieces of text information specified by the text specification unit 202 is equal to or greater than a predetermined threshold. In a case where it is determined that the number of pieces of specified text information is equal to or greater than the predetermined threshold value, the process proceeds to S3602, but in a case where it is determined that the number of pieces of specified text information is not either equal to or greater than the predetermined threshold value, the process proceeds to S3603. In the present embodiment, the predetermined threshold value is set to the half the number of pieces of text information that can be set. For example, when three types of text information “title”, “subtitle”, and “test” are allowed to be set on the application start screen 501, if two types of text information “title” and “text” are set, the process proceeds to S3602.

In S3602, the poster creation unit 210 executes the processing from S1903 to S1911 in the poster creation processing shown in FIG. 19.

In S3603, the poster creation unit 210 executes the processing from S3101 to S1911 in the poster creation processing shown in FIG. 31.

As described above, in the present embodiment, based on conditions set by the user, switching is performed as to which of the poster candidates with variations of impressions and poster candidates with variations of skeletons are to be created first. This makes it possible to more efficiently create a poster intended by the user.

Modifications of Fourth Embodiment

In the fourth embodiment, the poster creation processing flow is switched based on the number of types of text information input by the user. However, the poster creation processing flow may be switched based on the number of input images. An image has various impressions depending on the contents and colors thereof. Therefore, as the number of images used in the poster increases, the number of variations of overall impressions expressed by the poster increases. In this case, by adopting the poster creation flow described in the first embodiment, after the target impression intended by the user is determined, it is possible to create poster candidates with a wide variety of variations, which makes it possible to efficiently create a poster that expresses the impression intended by the user.

Processing Flow

Figure 37:
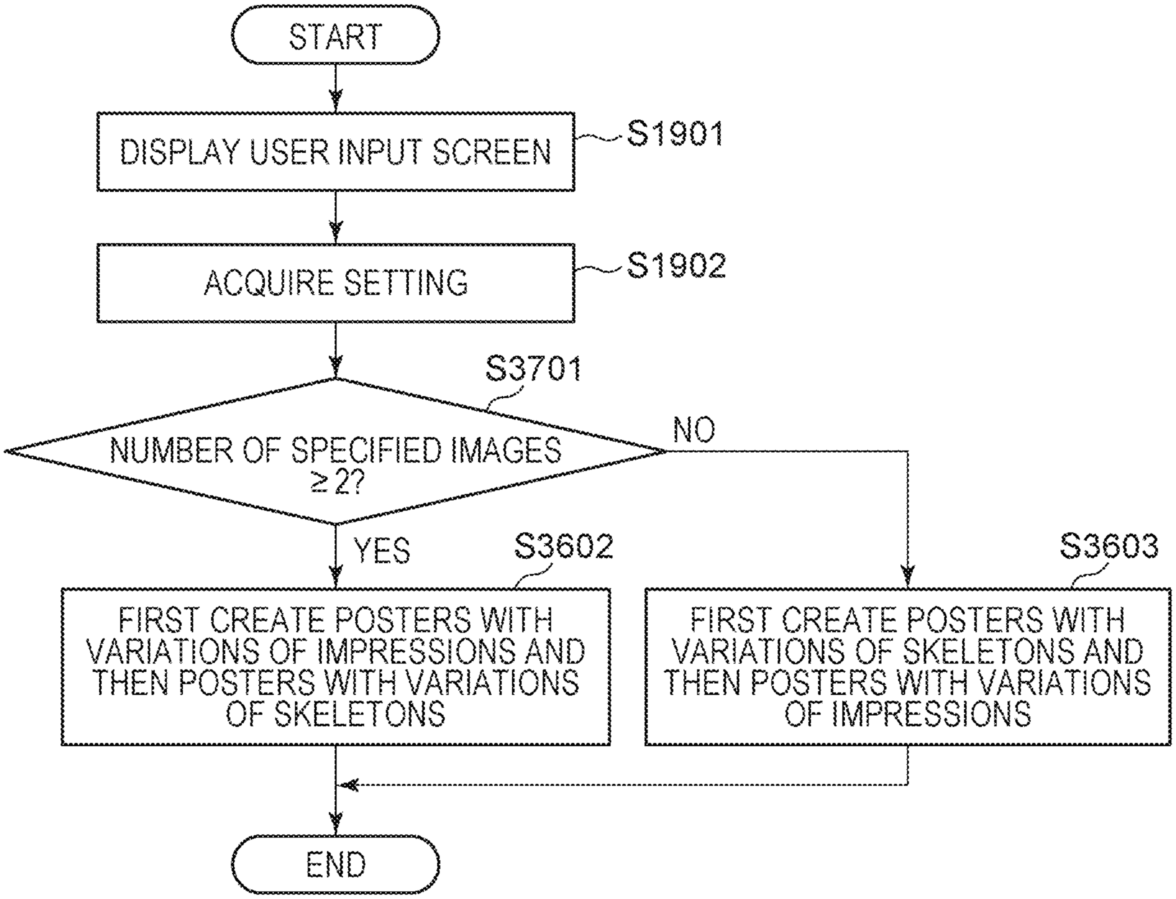
FIG. 37 is a flowchart illustrating a poster creation process.

FIG. 37 is a flowchart illustrating a process performed by the poster creation unit 210 of the poster creation application according to the present example. The processing steps assigned the same step numbers as those in FIG. 36 are similar to the processing according to the fourth embodiment described above, and therefore only differences are explained below.

In 53701, the creation flow switching unit 3501 determines whether or not the number of images specified by the image specification unit 203 is equal to or greater than a predetermined threshold value. In a case where it is determined that the number of specified images is equal to or greater than the predetermined threshold value, the process proceeds to S3602, but otherwise, the process proceeds to S3603. In the present embodiment, the predetermined threshold value is set to the half the number of images that can be set. For example, when the number of images that can be specified on the application start screen 501 is four, the threshold value is set to two.

As described above, according to the present modification, based on the number of images specified by the user, switching is performed as to which of the poster candidates with variations of impressions and poster candidates with variations of skeletons are to be created first. This makes it possible to more efficiently create a poster that expresses the impression intended by the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-113842 filed Jul. 15, 2022, which is hereby incorporated by reference herein in its entirety.

What is claimed is:

1. An information processing apparatus, comprising:
one or more memories storing programs; and
one or more processors that execute the stored programs, which cause the one or more processors to:
display a plurality of poster images having different impressions in a first display area;
accept specifying a poster image from the plurality of poster images having different impressions displayed in the first display area;
wherein an impression is determined based on a combination of a plurality of elements expressing the impression,
display a plurality of poster images having differently arranged one or more objects in a second display area;
accept specifying a poster image from the plurality of poster images having differently arranged objects displayed in the second display area;
set a skeleton, which is information indicating an arrangement of one or more objects in each of the plurality of poster images displayed in the second display area;
create the plurality of poster images with different skeletons based on the skeletons set;
display, in the first display area, the plurality of poster images based on the arrangement of the objects of the poster image selected from the plurality of poster images having different impressions displayed in the first display area; and determine, based on a condition specified by a user regarding creation of the poster image, which of the first display area and the second display area is to be displayed first.

2. The information processing apparatus according to claim 1, wherein the one or more objects are at least one of an image, a character, and a figure.

3. The information processing apparatus according to claim 1, wherein the one or more processors that execute the stored programs further cause the one or more processors to:
set the impressions held by the plurality of poster images displayed on the first display area, and
create the plurality of poster images having different impressions based on the impressions set.

4. The information processing apparatus according to claim 3, wherein the impression held by the poster image is set to be created based on the impression specified by a user.

5. The information processing apparatus according to claim 4, wherein the impression held by the poster image is set to be created, based on the impression specified by the user operating a slider, which is an object for specifying the impression.

6. The information processing apparatus according to claim 4, wherein the impression held by the poster image is set to be created, based on the impression specified by the user operating a radar chart, which is an object for specifying the impression.

7. The information processing apparatus according to claim 3, wherein information indicating a difference between the impression held by the poster image created and the impression set is smaller than a predetermined threshold value.

8. The information processing apparatus according to claim 1, wherein
the first display area displays the plurality of poster images with the different impressions, accepts specifying a poster image with the impression from the plurality of poster images with the different impressions displayed on the first display area, the second display area displays the plurality of poster images with different skeletons, each of which is information indicating an arrangement of one or more objects in the corresponding poster image, based on the impression held by the poster image accepted, and accepts specifying a specific poster image from the plurality of poster images with different skeletons displayed on the second display area.

9. The information processing apparatus according to claim 1, wherein the impression held by each poster image displayed on the second display area is the impression held by the poster image specified by a user.

10. The information processing apparatus according to claim 1, wherein information indicating the impression held by each of the plurality of poster images is displayed on the first display area in association with corresponding one of the poster images.

11. The information processing apparatus according to claim 1, wherein the first display area displays an object for recreating the plurality of poster images with different impressions, and the plurality of poster images with the different impressions are recreated in response to an operation on the object.

12. The information processing apparatus according to claim 1, wherein the second display area displays the impression held by the poster image specified.

13. The information processing apparatus according to claim 1, wherein an instruction to print the specified poster image is accepted.

14. The information processing apparatus according to claim 1, wherein the second display area displays the plurality of poster images with different skeletons, accepts specifying a poster image with a specific skeleton among skeletons, each of which is information indicating an arrangement of one or more objects in the corresponding poster image, from the plurality of poster images with different skeletons displayed on the second display area, the first display area displays the plurality of poster images with the different impressions based on the specific skeleton of the poster image accepted, and accepts specifying a poster image with the impression from the plurality of poster images with the different impressions displayed on the first display area.

15. The information processing apparatus according to claim 1, wherein a skeleton, which is information indicating the arrangement of the one or more objects in the poster image displayed on the first display area, is a specific skeleton of the poster image specified by a user.

16. The information processing apparatus according to claim 1, wherein the second display area displays an object for recreating the plurality of poster images with different skeletons, and the plurality of poster images with the different skeletons are recreated in response to an operation on the object.

17. The information processing apparatus according to claim 1, wherein an instruction to print the specified poster image is accepted.

18. The information processing apparatus according to claim 1, wherein the impression is determined by a combination of factors indicating the impression.

19. The information processing apparatus according to claim 1, wherein the one or more processors that execute the stored programs further cause the one or more processors to:

calculate a value for each skeleton from the different skeletons, wherein the value indicates how close an estimated impression is to a target impression of a user.

20. The information processing apparatus according to claim 1, wherein the condition regarding creation of the poster image is the condition regarding a number of pieces of text information specified by the user.

21. The information processing apparatus according to claim 20, wherein, in a case where the specified number of pieces of text information is equal to or greater than a predetermined threshold value, the information processing apparatus determines that the first display area is to be displayed first.

22. The information processing apparatus according to claim 1, wherein the condition regarding the creation of the poster image is the condition regarding a number of pieces of image information specified by the user.

23. The information processing apparatus according to claim 22, wherein, in a case where the specified number of pieces of image information is equal to or greater than a predetermined threshold value, the information processing apparatus determines that the first display area is to be displayed first.

24. A control method for an information processing apparatus, comprising:

performing a first display process to display a plurality of poster images with different impressions in a first display area;

performing a first acceptance process to accept specifying a poster image from the plurality of poster images with the different impressions displayed in the first display area;

wherein an impression is determined based on a combination of a plurality of elements expressing the impression, performing a second display process to display a plurality of poster images with differently arranged one or more objects in a second display area;

performing a second acceptance process to accept specifying a poster image from the plurality of poster images with the differently arranged one or more objects displayed in the second display area;

setting a skeleton, which is information indicating an arrangement of one or more objects in each of the plurality of poster images displayed on in the second display area;

creating the plurality of poster images with different skeletons based on the skeletons set;

display, in the first display area the plurality of poster images based on the arrangement of the objects of the poster image selected from the plurality of poster images having differently arranged objects displayed in the second display area, or display, in the second display area the plurality of poster images based on the impression of the poster image selected from the plurality of poster images having different impressions displayed in the first display area; and determine, based on a condition specified by a user regarding creation of the poster image, which of the first display area and the second display area is to be displayed first.

25. A non-transitory computer-readable storage medium storing a program for causing a computer to execute a control method for an information processing apparatus, comprising:

performing a first display process to display a plurality of poster images with different impressions in a first display area;

performing a first acceptance process to accept specifying a poster image from the plurality of poster images with the different impressions displayed in the first display area;

wherein an impression is determined based on a combination of a plurality of elements expressing the impression, performing a second display process to display a plurality of poster images with differently arranged one or more objects in a second display area;

performing a second acceptance process to accept specifying a poster image from the plurality of poster images with the differently arranged one or more objects displayed in the second display area;

setting a skeleton, which is information indicating an arrangement of one or more objects in each of the plurality of poster images displayed in the second display area;

creating the plurality of poster images with different skeletons based on the skeletons set;

display, in the first display area the plurality of poster images based on the arrangement of the objects of the poster image selected from the plurality of poster images having differently arranged objects displayed in the second display area, or display, in the second display area the plurality of poster images based on the impression of the poster image selected from the plurality of poster images having different impressions displayed in the first display area; and determine, based on a condition specified by a user regarding creation of the poster image, which of the first display area and the second display area is to be displayed first.

* * * * *